US006568969B2

(12) United States Patent
Bernier et al.

(10) Patent No.: US 6,568,969 B2
(45) Date of Patent: May 27, 2003

(54) CONTROLLED THRUST STEERING SYSTEM FOR WATERCRAFT

(75) Inventors: Fred H. Bernier, St. Hilaire, MN (US); Herman P. Christopherson, Prior Lake, MN (US); Frank Hazard, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/277,926

(22) Filed: Oct. 21, 2002

(65) Prior Publication Data

US 2003/0054711 A1 Mar. 20, 2003

Related U.S. Application Data

(63) Continuation of application No. 09/819,064, filed on May 14, 2001, now Pat. No. 6,520,815, which is a continuation of application No. 09/447,783, filed on Nov. 23, 1999, now Pat. No. 6,231,410, which is a continuation-in-part of application No. 09/431,444, filed on Nov. 1, 1999, now Pat. No. 6,159,059.

(51) Int. Cl.[7] ........ B60K 41/00
(52) U.S. Cl. ........ 440/87; 440/38; 440/42
(58) Field of Search ........ 440/1, 2, 38, 40–43, 440/87; 114/144 R

(56) References Cited

U.S. PATENT DOCUMENTS

| | | | | |
|---|---|---|---|---|
| 6,124,809 A | * | 9/2000 | Boudriau | 340/984 |
| 6,336,833 B1 | * | 1/2002 | Rheault et al. | 440/1 |

* cited by examiner

*Primary Examiner*—Jesus D. Sotelo
(74) *Attorney, Agent, or Firm*—Jenner & Block, LLC

(57) ABSTRACT

A watercraft of the jet propulsion type comprising a steering mechanism, a throttle control mechanism, a thrust mechanism, a throttle regulator and a controlled thrust steering system. The steering mechanism has a straight-ahead position. The steering mechanism is able to rotate in a clockwise direction from the straight-ahead position to a clockwise position and in a counter-clockwise direction from the straight-ahead position to a counter-clockwise position. The throttle control mechanism is biased toward an idle position. The thrust mechanism provides jet propulsion thrust for the watercraft. The throttle regulator regulates thrust provided by the thrust mechanism. The controlled thrust steering system causes the throttle regulator to increase thrust upon the steering mechanism rotating from the straight-ahead position to the clockwise position or the counter-clockwise position. The controlled thrust steering system also causes the throttle regulator to decrease thrust upon the steering mechanism rotating from the clockwise position or the counter-clockwise position to the straight-ahead position.

35 Claims, 41 Drawing Sheets

CONTROLLED THRUST STEERING SYSTEM FOR WATERCRAFT

This application is a continuation of co-pending application Ser. No. 09/819,064 filed on May 14, 2001, now U.S. Pat. No. 6,520,815, which is a continuation of application Ser. No. 09/447,783, filed on Nov. 23, 1999, now U.S. Pat. No. 6,231,410, which is a continuation-in-part of application Ser. No. 09/431,444, filed on Nov. 1, 1999, now U.S. Pat. No. 6,159,059. The present invention relates to a controlled thrust steering system for a watercraft, and more particularly to a controlled thrust steering system for a watercraft of the jet propulsion type.

THE FIELD OF THE INVENTION

One type of watercraft is the jet propelled type that is designed to be operated by a rider that is seated on the watercraft in a straddle-like fashion. This type of watercraft is propelled by discharging water out of a discharge nozzle located at the rear of the watercraft.

To provide steering for the watercraft, a steering nozzle is pivotably connected to the end of the discharge nozzle. The input for the pivot of the steering nozzle is provided by a steering handle pivotably mounted on the top of the watercraft. To steer the watercraft to the right, the rider turns the steering handle clockwise causing the steering nozzle to pivot counter-clockwise. The discharge of water out of the steering nozzle with the nozzle pivoted counter-clockwise causes the watercraft to yaw clockwise and turn to the right. A similar but opposite sequence is used to steer the watercraft to the left. Therefore, for a watercraft of the jet propulsion type to steer properly, a sufficient amount of thrust out of the steering nozzle is required.

The thrust of the watercraft is controlled by the rider through the use of a finger operated throttle lever pivotably mounted on the steering handle. The throttle lever is biased toward an idle position. To increase thrust of water out of the discharge nozzle, the rider presses down on the throttle lever with his finger. This pivots the throttle lever toward the wide open throttle position. To decrease thrust of water out of the discharge nozzle, the rider releases the throttle lever. Since the throttle lever is biased toward the idle position, without a force countering the bias, the throttle lever pivots toward the idle position. As the throttle lever pivots toward the idle position, the thrust of the water out of the discharge decreases.

While the decrease in thrust of water out of the discharge nozzle is desirable for slowing down the watercraft, the decrease in thrust of the water out of the discharge nozzle also decreases the steering capability of the watercraft since the thrust provides the steering for the watercraft.

This quick decrease in steering capability is partly problematic in situations in which an inexperienced rider attempts to avoid an obstacle directly in front of the watercraft. To properly avoid the obstacle, the rider should apply a constant pressure on the throttle lever while simultaneously turning the steering handle. However, an inexperienced rider may release the throttle lever to slow the watercraft quickly while simultaneously turning the steering handle in an attempt to maneuver around the obstacle. In such a situation, the rider may not be able to maneuver around the obstacle since steering capability has been decreased.

This decrease in steering capability is also problematic for the rider to maneuver the watercraft for docking the watercraft. Since the docking procedure usually occurs with the watercraft traveling at a low speed, the rider may release the throttle lever while attempting to dock the watercraft. However, with only idle thrust provided to steer the watercraft, steering capability may not be adequate to dock the watercraft.

SUMMARY OF THE INVENTION

The present invention is directed toward a thrust system for a watercraft of the jet propulsion type comprising a steering mechanism, a throttle control mechanism, a thrust mechanism and a controlled thrust steering system. The steering mechanism has a straight-ahead position. The steering mechanism is able to rotate in a clockwise direction from the straight-ahead position and in a counter-clockwise direction from the straight-ahead position. The throttle control mechanism is mounted on a steering handle of the steering mechanism. The throttle control mechanism moves toward an idle position after the throttle control mechanism is released. The thrust mechanism provides jet propulsion thrust for the watercraft. The controlled thrust steering system causes the thrust mechanism to increase thrust or inhibits the thrust from decreasing below a steerable thrust upon rotating the steering mechanism in the clockwise direction or the counter-clockwise direction. The controlled thrust steering system also causes the throttle regulator to decrease thrust upon rotating the steering mechanism toward the straight-ahead position.

DESCRIPTION OF THE PREFERRED EMBODIMENT

Figure 1:
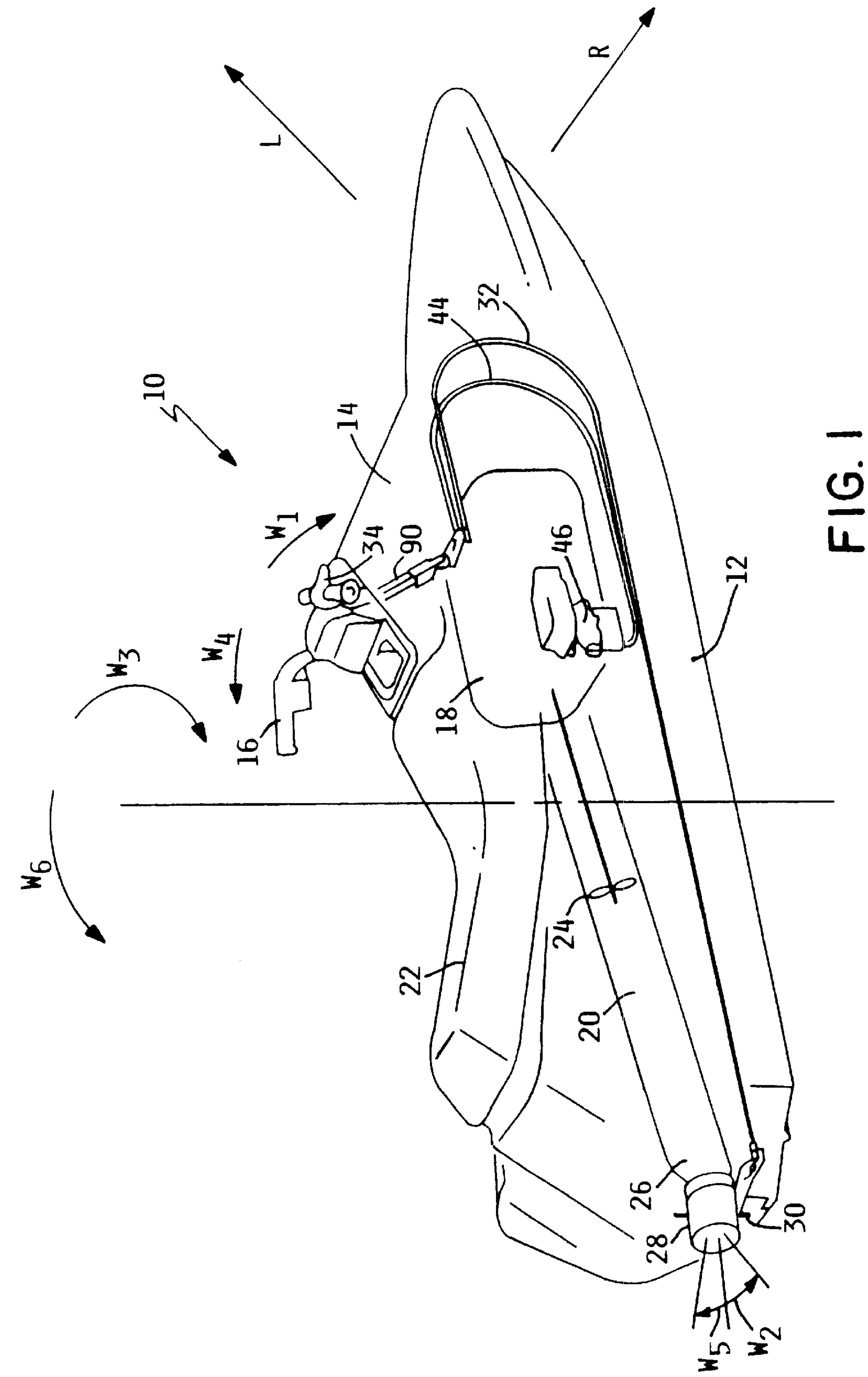
FIG. 1 is a perspective view of a watercraft in accordance to the present invention.

FIG. 1. illustrates a watercraft 10 constructed in accordance to the present invention. The watercraft comprises a hull 12 that has a bow portion 14. A steering handle 16 is pivotably mounted to the rear of the bow 14 and is part of a steering mechanism for steering the watercraft. The steering mechanism includes the steering handle 16 and a steering post 90 in which the steering handle 16 is fixed to the ring post 90 such that the steering post 90 pivots the steering handle 16.

The watercraft 10 is powered by an internal combustion engine 18 that is contained beneath the bow 14 and which drives a jet propulsion unit 20 that is disposed centrally of the hull and beneath the seat 22. The jet propulsion unit 20 includes an impeller 24 which draws water from a water inlet (not shown) and discharges the water through a discharge nozzle 26 and steering nozzle 28. The steering nozzle 28 is supported for pivotal movement about a generally vertical extending axis 30 relative to the discharge nozzle 26 for steering the watercraft 10. By pivoting the steering nozzle 28 about the vertical extending axis 30, a turning force is created on the watercraft.

The steering post 90 is mechanically linked through a steering cable 32 to the steering nozzle 28 such that a rotational movement of the steering handle 16 will cause a pivotal movement of the steering nozzle 28. For the rider to turn the watercraft 10 toward the right R, the rider would rotate the steering handle 16 clockwise $W_1$. The clockwise rotation $W_1$ of the steering handle 16 causes the steering nozzle 28 to pivot counter-clockwise $W_2$. The thrust of water out of the steering nozzle 28 with the steering nozzle 28 pivoted counter-clockwise $W_2$ causes the watercraft 10 to yaw clockwise $W_3$, thus pivoting the front of the watercraft 10 to the right R.

Similarly for the rider to turn the watercraft 10 toward the left L, the rider would rotate the steering handle 16 counter-clockwise $W_4$. The counter-clockwise $W_4$ rotation of the steering handle 16 causes the steering nozzle 28 to pivot clockwise $W_5$. The thrust of water out of the steering nozzle 28 with the steering nozzle pivoted clockwise $W_5$ causes the watercraft 10 to yaw counter-clockwise $W_6$ thus pointing the front of the watercraft 10 to the left L.

Hence, the turning capability for this type of watercraft is created from the yaw of the watercraft caused by the thrust of water out the steering nozzle with the steering nozzle pivoted toward at a certain direction. The amount of yaw is a function of both the pivot of the steering nozzle and the thrust of the water out of the steering nozzle. Therefore, even if the steering nozzle is pivoted, without sufficient thrust of water out of the steering nozzle, the watercraft is not able to yaw and turn.

Figure 3:
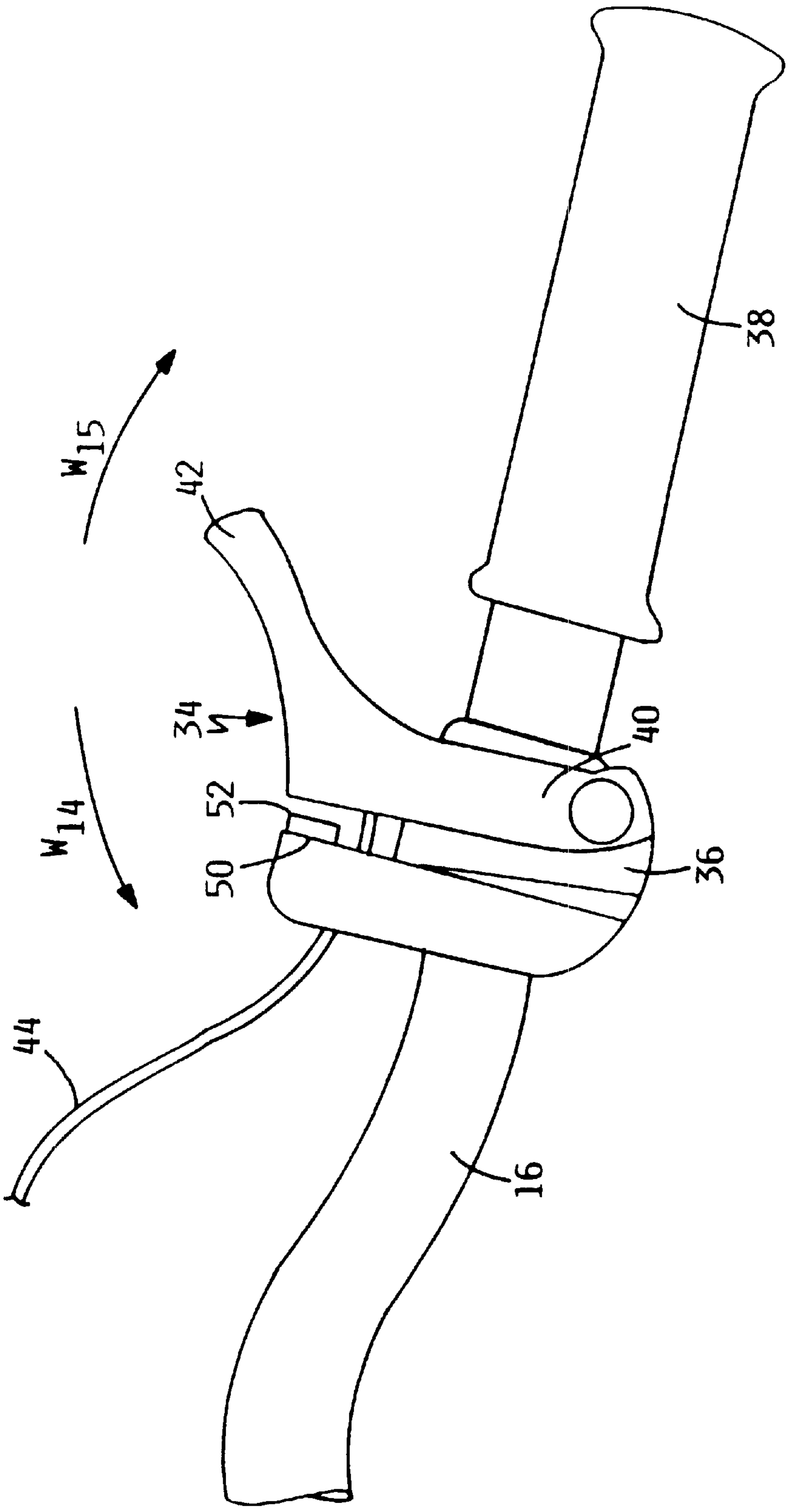
FIG. 3 is an enlarged view of the right steering handle showing a first embodiment of a controlled thrust steering system.
Figure 4:
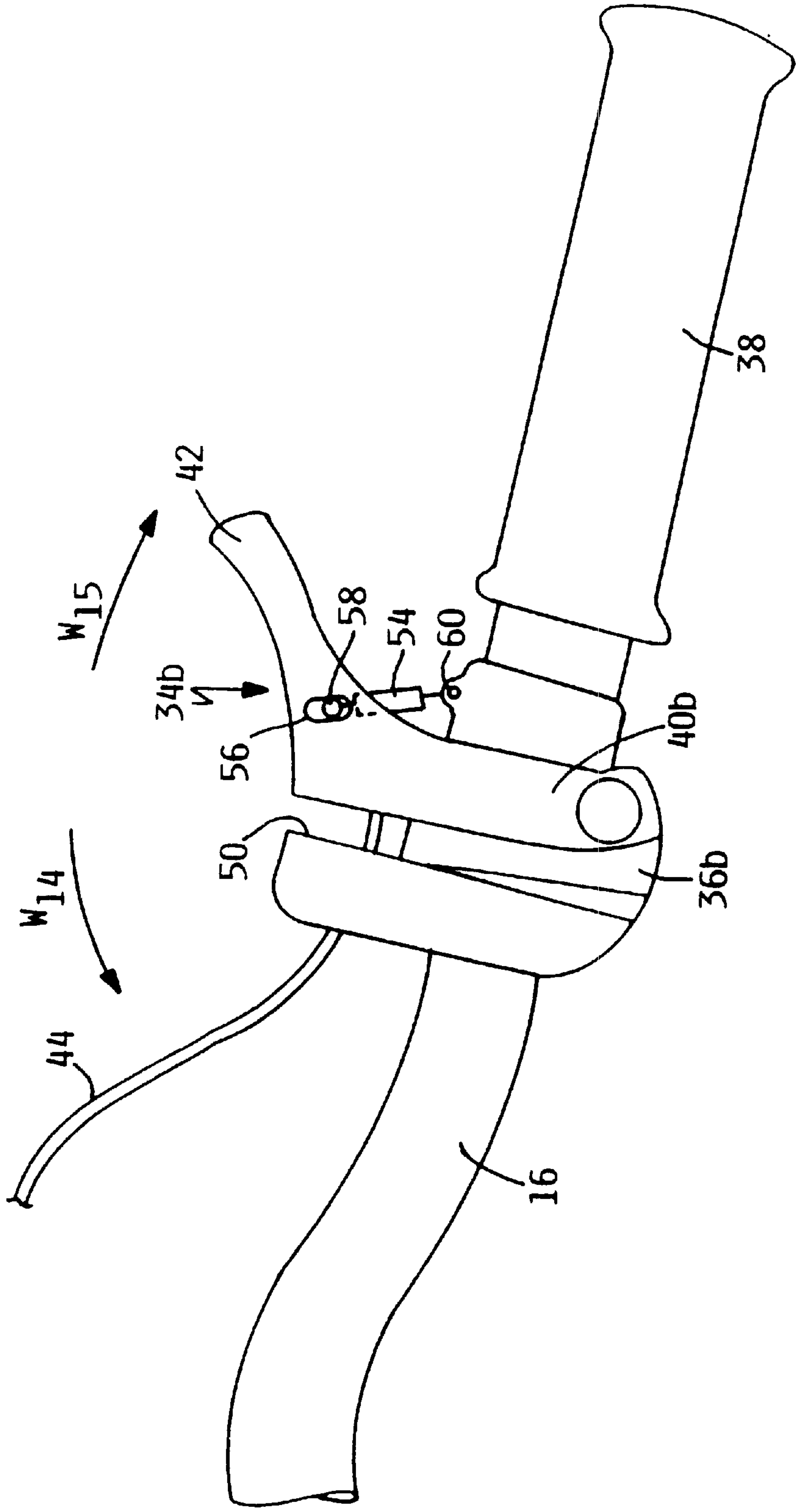
FIG. 4 is an enlarged view of the right steering handle showing a second embodiment of a controlled thrust steering system.

As illustrated in detail in FIGS. 3 and 4, the rider controls the thrust of water out of the discharge nozzle through the use of a throttle lever 34 pivotably mounted to throttle lever bracket 36 attached to the circumferentially outer surface of the right portion of the steering handle 16 adjacent to a right handle grip 38. The throttle lever 34 and the throttle lever bracket 36 are mounted to the steering handle 16 with the pivot end 40 axially away from the right hand grip 38 and the lever end 42 axially toward to right hand grip 38. The right handle grip 38 and the throttle lever 34 are designed such that the rider's palm and fingers rest on the hand grip 38 and the rider's finger is positioned over the lever end 42 of the throttle lever 34.

Figure 2:
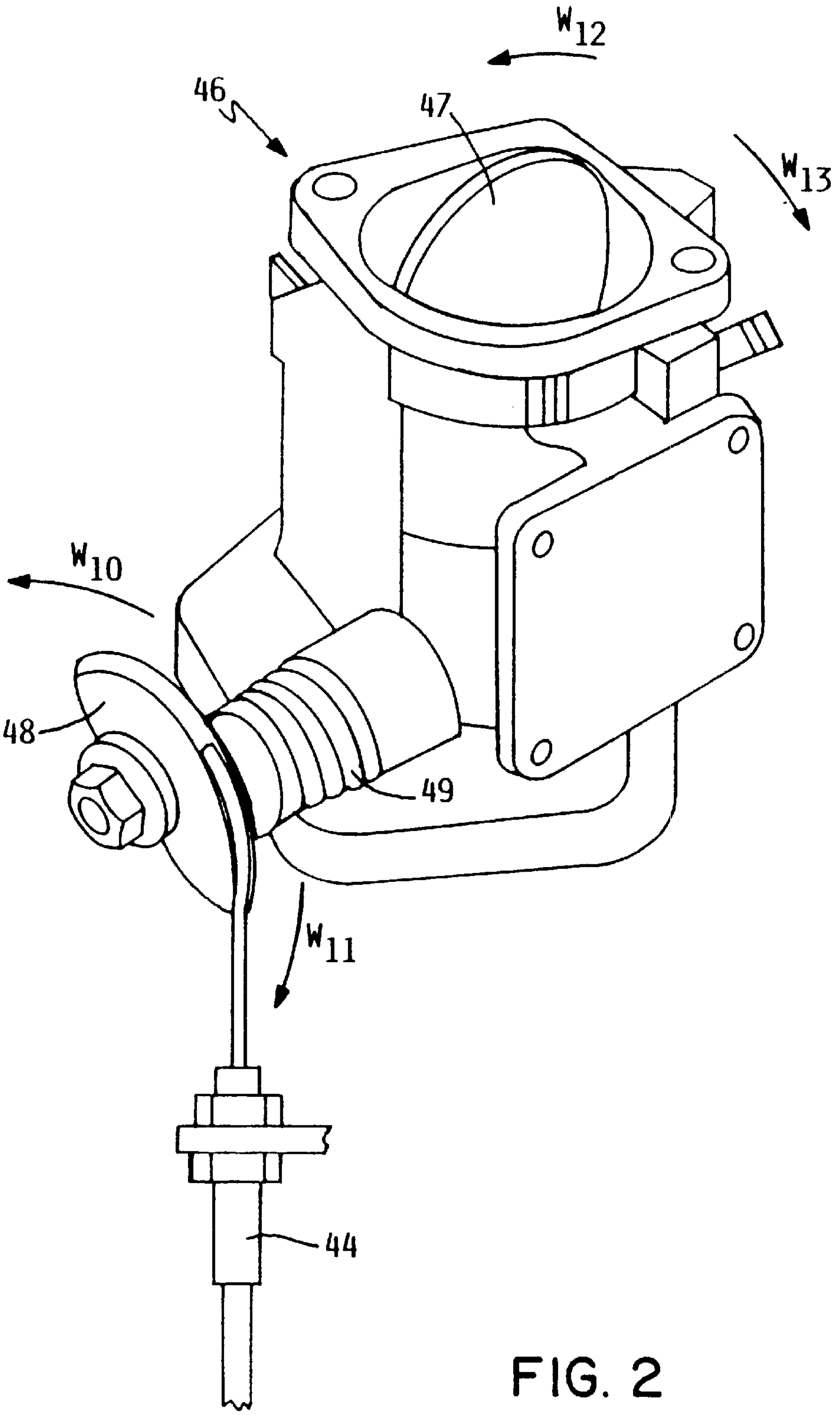
FIG. 2 is an enlarge view of a thrust control mechanism of FIG. 1.

As illustrated in FIG. 1, the throttle lever 34 is mechanically linked through a throttle cable 44 to a throttle regulator 46. The throttle regulator can be a carburetor for a carbureted internal combustion engine or a throttle body for a fuel injected internal combustion engine. As illustrated in detail in FIG. 2, the end of the throttle cable 44 is attached to a throttle control pulley 48 which is attached to a throttle plate 47 which regulates the amount of fuel and air provided to the combustion chamber of the internal combustion engine 18. A throttle return spring 49 is attached to the throttle control pulley 48 to bias the throttle plate 47 toward an idle position. Since the throttle lever 34 is mechanically linked to the throttle control pulley 48 of the throttle regulator, the throttle return spring 49 likewise bias the throttle lever 34 toward an idle position.

To increase the thrust of water out of the discharge nozzle 26, the rider would press down on the throttle lever 34 with his finger, this downward force counters the bias by the throttle return spring 49 and pivots the throttle lever 34 away from the idle position $W_{14}$ toward a wide open throttle position $W_{15}$. The rider can vary the amount of thrust out of the discharge nozzle by varying the amount of force applied on the throttle lever 34. The more force applied on the throttle lever 34, the more the throttle lever pivots from the idle position $W_{14}$ toward the wide open throttle position $W_{15}$ and pulls the throttle plate 47 of the throttle regulator toward the wide open throttle position.

To reduce the thrust of water out of the discharge nozzle 26, the rider would apply a pressure on the throttle lever less than the bias caused by the throttle return spring 49. This allows the throttle lever 34 to pivot toward the idle position $W_{14}$ and likewise the throttle plate 47 of the throttle regulator toward the idle position $W_{12}$. The quickest way to reduce the thrust of water out of the discharge nozzle 26 is for the rider to totally release the throttle lever 34 thus allowing the throttle return spring 49 to quickly bias the throttle lever 34 and the throttle plate 47 of the throttle regulator toward the idle positions $W_{14}$ and $W_{12}$.

However, by quickly reducing the thrust of the water out of the discharge nozzle 26 by totally releasing the throttle lever 34 also quickly reduces the ability for the rider to steer the watercraft. As discussed earlier, the steering of the watercraft 10 is caused by a thrust of water out of the steering nozzle 28 with the steering nozzle pivoted toward one direction thus creating a yaw to the watercraft 10. As the amount of thrust is decreased, the amount of yaw is also decreased. This is particularly problematic when an inexperienced rider seeks to avoid hitting an obstacle directly in front of the watercraft.

To avoid the obstacle directly in front of the watercraft, the rider should turn the steering handle toward one direction while simultaneously applying pressure on the throttle lever. This procedure provides sufficient thrust out of the steering nozzle for creating an adequate yaw of the watercraft to steer clear of the obstacle. However, an inexperienced rider may panic and quickly release the throttle lever to reduce the thrust of water out of the discharge nozzle. While the velocity of the watercraft is reduced, the reduction of thrust of water out of the steering nozzle also reduces the yaw of the watercraft therefore reducing the steering capability of the watercraft. Without adequate steering capability, the momentum of the watercraft could force the watercraft into the obstacle.

FIG. 3 illustrates a first embodiment of the present invention. The first embodiment includes a controlled thrust steering system to increase the time period for the thrust of water to decrease upon the rider releasing the throttle lever, thus providing the rider with a longer period of steering capability. The controlled thru steering system of the first embodiment is a compressible material 52 located between the back of the throttle lever 34 and an abutment surface 50 upon which the throttle lever abuts when the throttle lever at the idle position. The compressible material 52 can be a foamed material or any other material which is compressible.

The first embodiment functions as follows. Upon the rider releasing the throttle lever 34, the bias by the throttle return spring 49 causes the throttle lever 34 to quickly pivot toward the idle position until the back of the throttle lever contacts the compressible material 52. As the compressible material 52 is compressed, it provides resistance against the bias by the throttle return spring 49, thus extending the time period for the throttle lever 34 to pivot from the point the throttle lever first contacts the compressible material to the point the throttle lever abuts the abutment surface compared to the time period for the throttle lever to pivot through the same range if the compressible material was not present. The compression of the foamed material increases the time period for the throttle lever to pivot toward the idle position and allows for a longer time period for the thrust of water to continue thus providing steering capability to the watercraft for a longer period of time.

FIG. 4 illustrates a second embodiment of the present invention. The second embodiment includes a controlled thrust steering system to increase the time period for the thrust to decrease upon the rider releasing the throttle lever. The controlled thrust steering system of the second embodiment is a shock 54 connecting the lever portion of the throttle lever to the throttle bracket 36*b* fixed on the steering handle 16. Formed in the throttle lever is a slot 56 aligned with the pivot of the throttle lever. A pin 58, perpendicular to the slot 56, is pivotably and slidably retained in the slot 56. The pin 58 is connected to one end of the shock 54. The other end of the shock 54 is pivotably mounted to the wall defining an aperture 60 formed in the throttle lever bracket 36*b*.

The second embodiment functions as follows. Upon the rider releasing the throttle lever 34*b*, the bias by the throttle return spring 49 causes the throttle lever 34*b* to quickly pivot toward the idle position and the pin 58 to slide within the slot 56 until the pin 58 contacts the end of the slot 56. Thereafter, the shock 54 extends until the back of the throttle lever abuts the abutment surface 50. As the shock extends, it provides resistance against the bias by the throttle return spring 49, thus extending the time period for the throttle lever to pivot from the point the shock first starts to extend to the point the throttle lever abuts the abutment surface compare to the time period for the throttle lever to pivot through the same range if the shock was not present. Therefore, similar to the first embodiment, the shock 54 provides the rider with a longer period of steering control.

Figure 5:
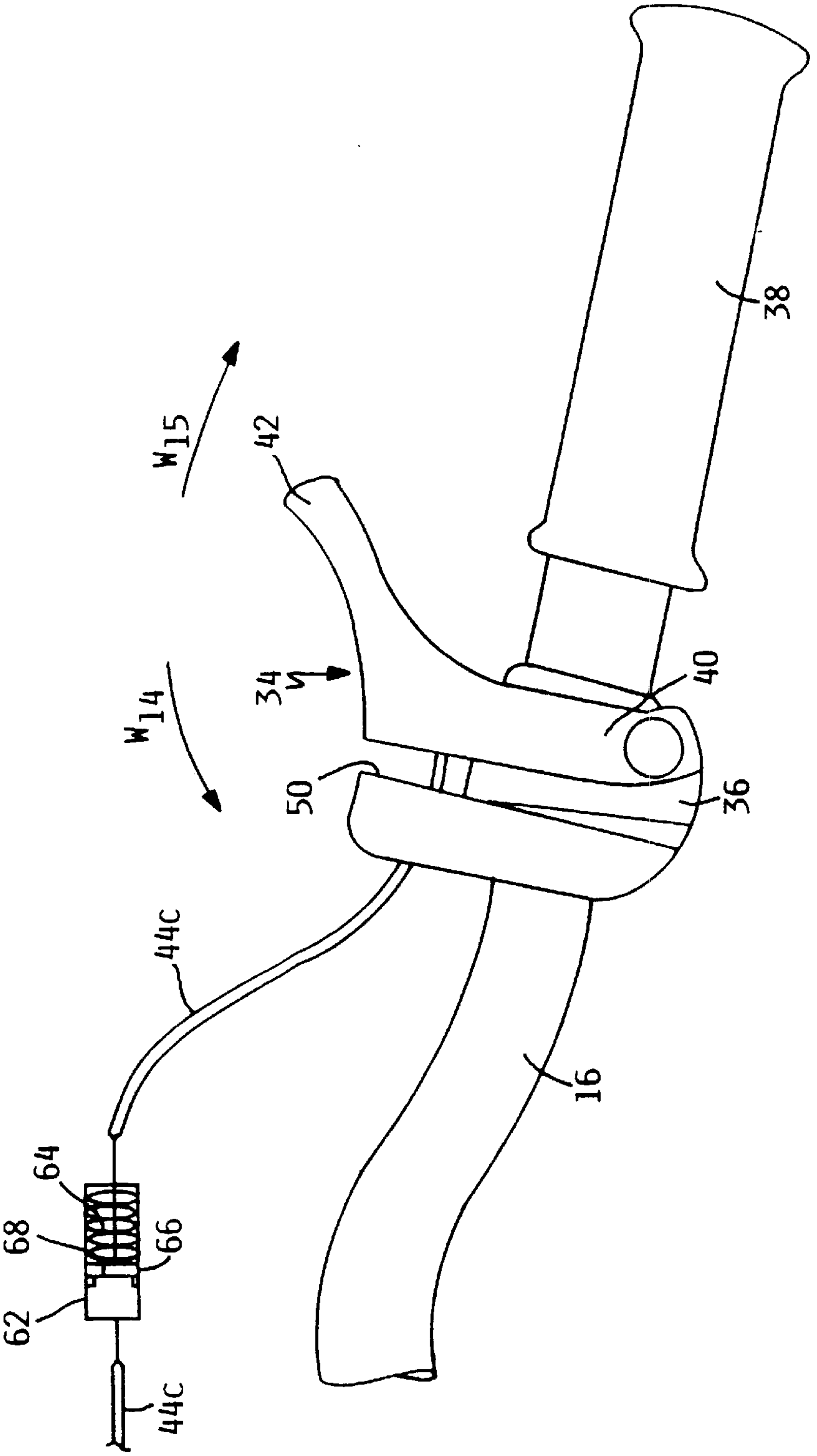
FIG. 5 is an enlarged view of the right steering handle showing a third embodiment of a controlled thrust steering system.

FIG. 5 illustrates a third embodiment of the present invention. The third embodiment includes a controlled thrust steering system to increase the time period for the thrust to decrease upon the rider releasing the throttle lever. The controlled thrust steering system of the second embodiment is a shock 62 and a shock spring 64 biasing the shock 62 toward a compressed position. The shock and spring assembly is located along a spliced portion of the throttle cable 44*c* to be in series with the remainder of the throttle cable 44*c*. The shock and spring assembly can be located anywhere along the throttle cable 44*c* between the throttle regulator 46 and the throttle lever 34.

The third embodiment functions as follows. Upon the rider pressing down on the throttle lever 34 toward the wide open throttle position, the throttle lever 34 pulls on the throttle cable 44*c* and rotates the throttle plate 47 from the idle position toward the wide open throttle. The tension created in the throttle cable 44*c* counters the bias by the shock spring 64 thus extending the shock 62.

Upon the rider releasing the throttle lever 34, the tension in the throttle cable 44*c* is relaxed allowing the bias caused by the throe return spring 49 to quickly pivot the throttle plate 47 toward the idle position and to some position wherein the bias by the throttle return spring 49 is less than the bias by the shock spring 64. Therefore, the shock spring 64 compresses the shock 62 toward a compressed position. During the compression of the shock 62, fluid is pushed from one end of the piston 66 to the other end of the piston through a small aperture 68 in the piston providing resistance for the shock to be compressed. The shock 62 thus extends the time period for the throttle plate 47 to pivot to the idle position from the time the shock 62 first starts to be compressed to the time the shock 62 is fully compressed compare to the time period for the throttle plate 47 to pivot through the same range if the shock 62 was not present. Therefore, similar to the first and second embodiments, the shock 62 provides the rider with a longer time period of steering control.

Figure 6:
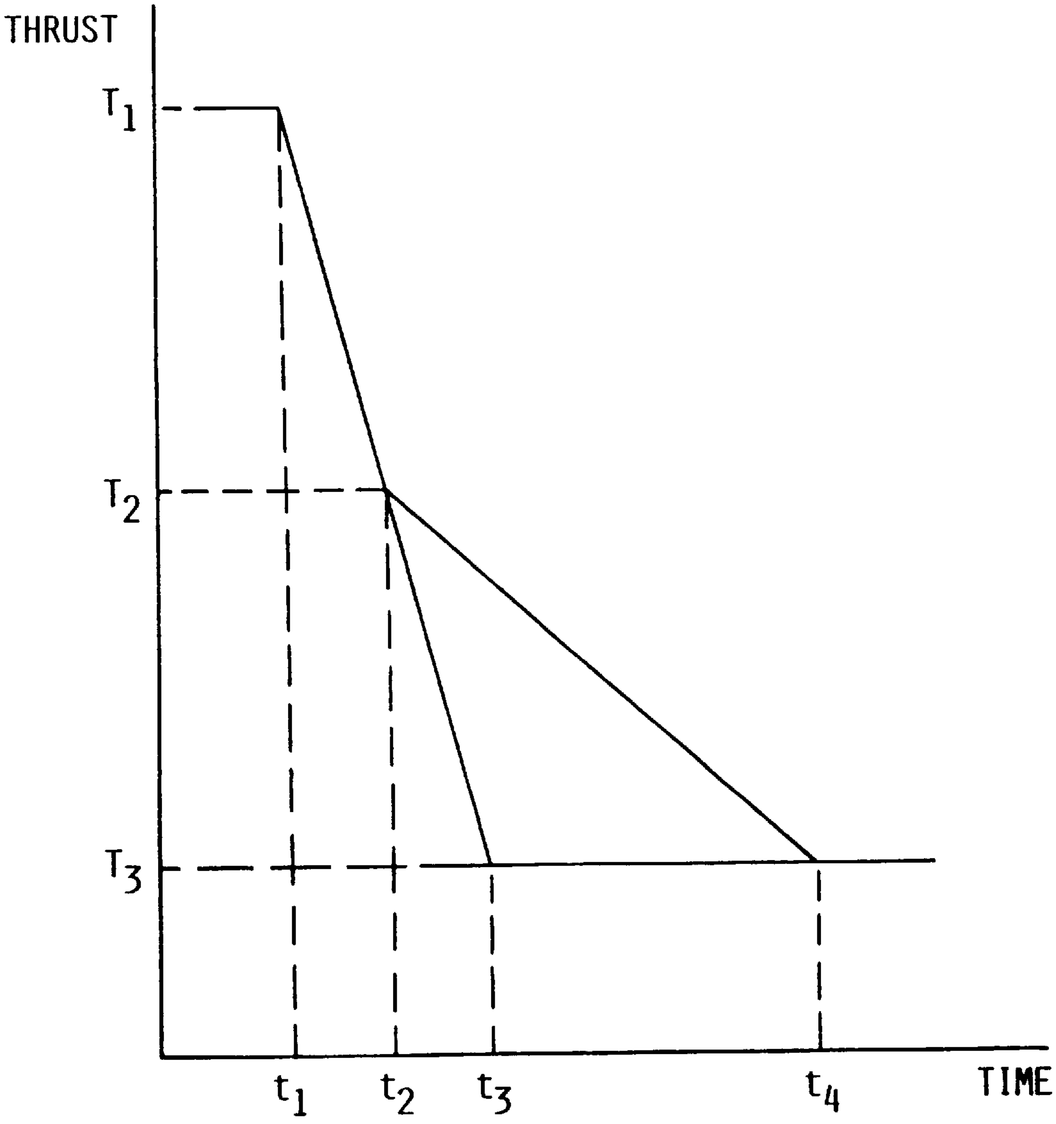
FIG. 6 is a diagram showing the effect of the controlled thrust steering systems in accordance to the first, second and third embodiments.

FIG. 6 diagrams the effect of a controlled thrust steering system in accordance to the first, second and third embodiments. Upon the rider releasing the throttle lever with the thrust $T_1$ out of the steering nozzle, the thrust quickly drops from $T_1$ to a thrust $T_2$ during a time period from $t_1$ to $t_2$. If the controlled thrust steering system was not present, the thrust will continue to drop from $T_2$ to idle thrust $T_3$ during a time period from $t_2$ to $t_3$. Since only idle thrust $T_3$ of water is exhausted out the steering nozzle, very little steering capability is provided to the rider at this thrust level. With the controlled thrust ring system in place, the thrust will drop from $T_2$ to idle thrust $T_3$ during a time period from $t_2$ to $t_4$. Therefore, the controlled thrust steering system provides the rider with steering capability for an additional time of $(t_4-t_3)$. This additional time $(t_4-t_3)$ may provide the rider with the necessary time having adequate steering capability to steer around an obstacle directly in front of the watercraft.

Figure 7:
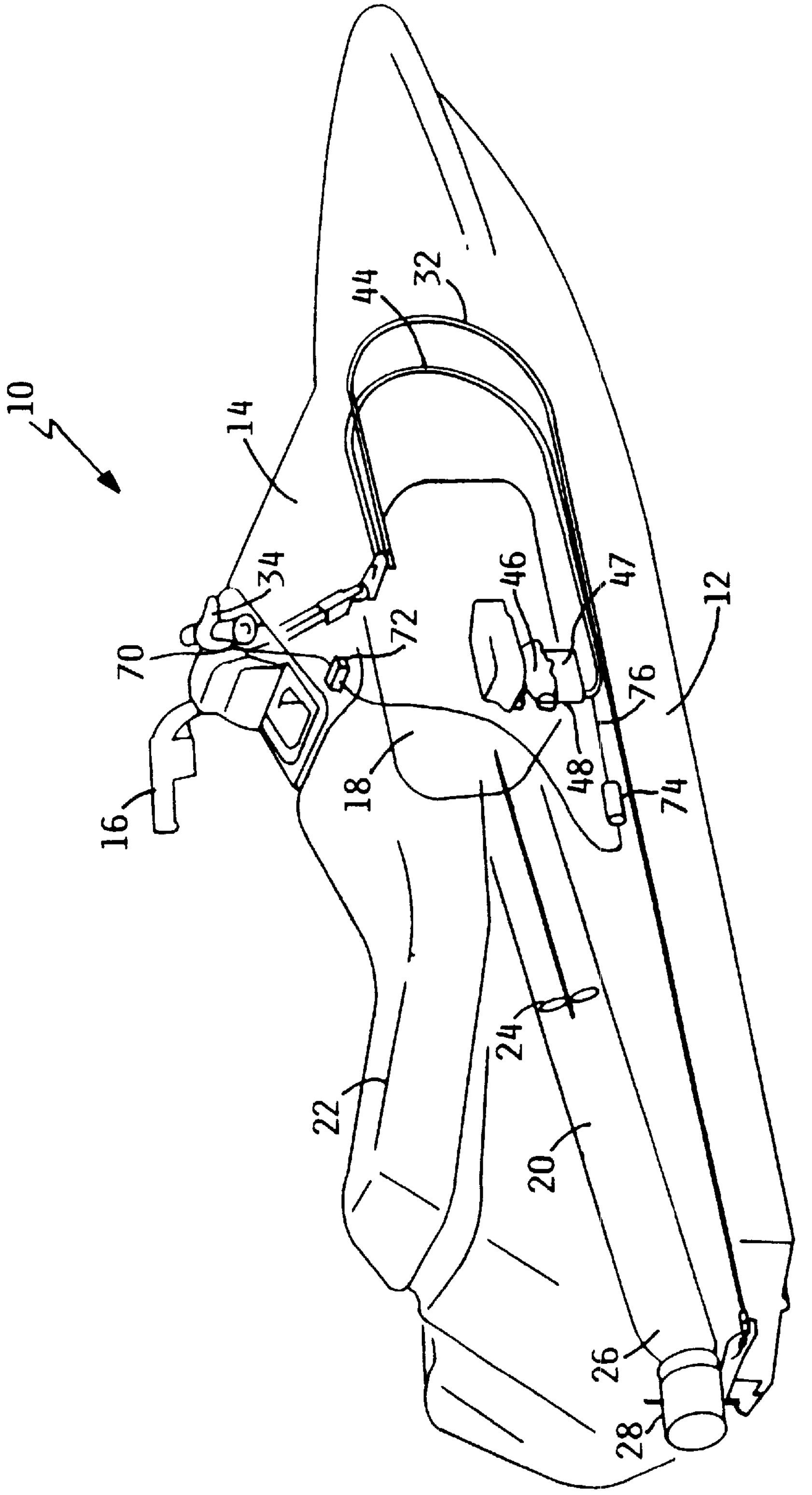
FIG. 7 is a perspective view of a watercraft showing a fourth embodiment of a controlled thrust steering system.

FIG. 7 illustrates a fourth embodiment of the present invention. The fourth embodiment includes a controlled thrust steering system with inputs provided by the throttle position. The controlled thrust steering system is attached to the throttle regulator to increase the time period for the thrust to decrease upon the rider releasing the throttle lever, thus providing the rider with a longer time period of steering capability to steer the watercraft.

The controlled thrust steering system of the fourth embodiment comprises a throttle closed switch 70, a timer 72, a solenoid 74 and an off-throttle cable 76. As illustrated in detail in FIG. 8, the throttle closed switch 70 is located between the back of the throttle lever 42 and the abutment surface 50 upon which the throttle lever abuts when the throttle lever is at the idle position. Upon the back of the throttle lever 42 contacting the throttle closed switch 70, the timer 72 located in the hull 12 of the watercraft 10 is triggered to activate the solenoid 74 for a given amount of time. The solenoid 74 is connected to the off-throttle cable 76 at one end of the off-throttle cable. As illustrated in detail in FIG. 9, the other end of the off-throttle cable 76 is connected to the throttle cable 44.

Figure 10:
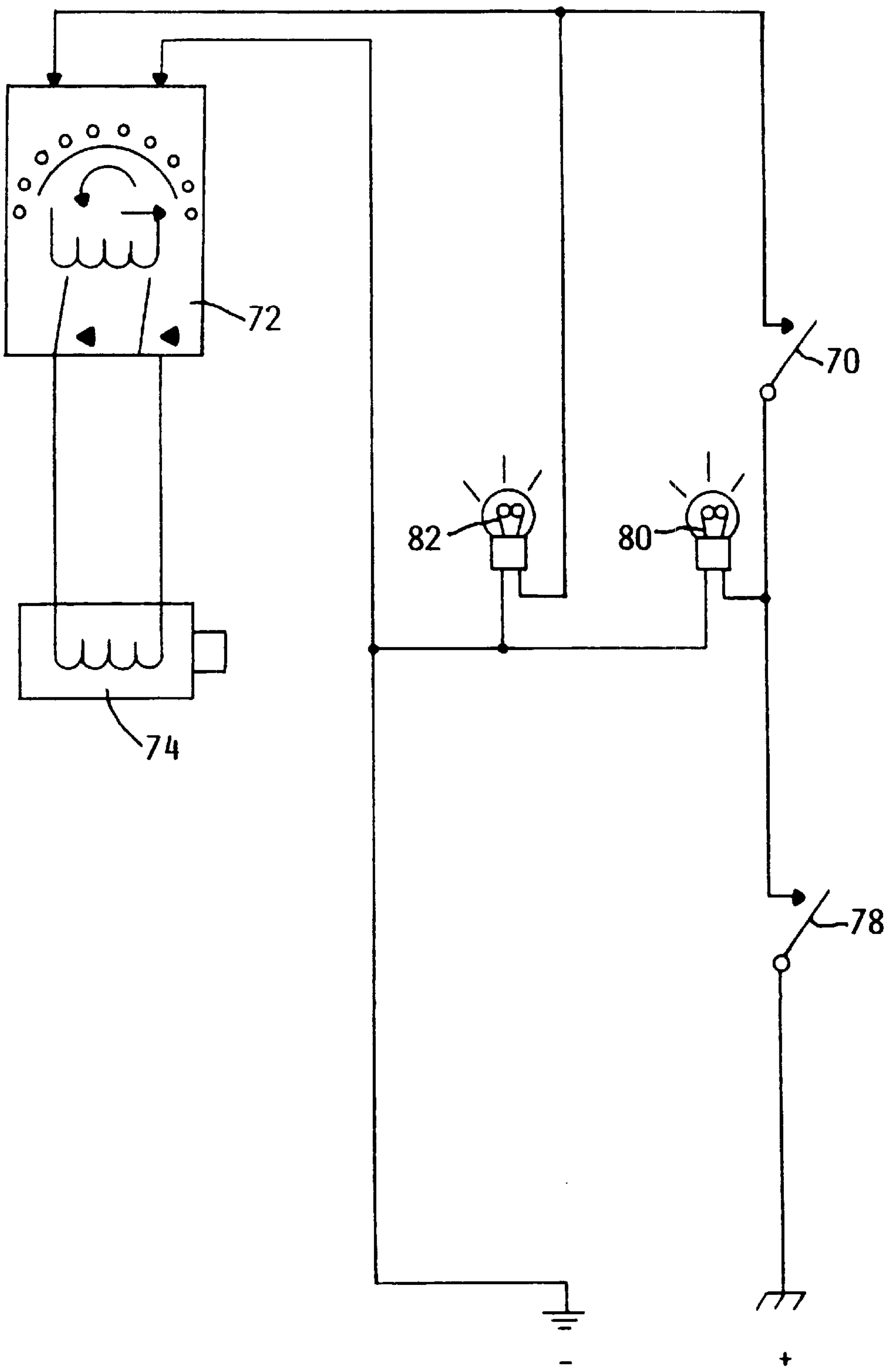
FIG. 10 is a circuit diagram of the fourth embodiment.

FIG. 10 is a circuit diagram of the fourth embodiment. The fourth embodiment functions as follows. Upon the rider releasing the throttle lever 34, the bias by the throttle return spring 49 causes the throttle lever 34 to pivot toward the idle position until the back of the throttle lever 42 contacts the throttle closed switch 70. Once the back of the throttle lever 42 contacts the throttle closed switch 70, further bias by the throttle return spring 49 causes the previously open circuit within the throttle closed switch 70 to close thus triggering the timer 72. The timer 72 then activates the solenoid 74 for a given amount of time. The given amount of time should provide the rider with sufficient time to steer the watercraft clear of the obstacle without over-steering the watercraft. The optimal given amount of time is between 0.5 to 3.0 seconds.

Once the solenoid 74 is activated, the solenoid 74 pulls on the off-throttle cable 76. The end of the off-throttle cable 76 is connected to the throttle cable 44 axially outward of the connection with the throttle control pulley 48. Without the solenoid 74 in place or activated, upon the rider releasing the throttle lever 34, the bias by the throttle return spring 49 causes the throttle plate 47 to pivot toward the idle position. With the solenoid 74 activated, upon the rider releasing the throttle lever 34, the off-throttle cable 76 pulls on the throttle cable 44 axially outwardly and retains the throttle plate 47 at a steerable thrust position. For the purpose of this application, the steerable thrust is a thrust above idle thrust which allows the rider to adequately steer the watercraft. The steerable thrust for a particular watercraft depends on the size of the watercraft and the shape of the hull; thus, the steerable thrust varies from one watercraft to another watercraft.

The solenoid 74 is activated for a given amount of time; thereafter, the timer 72 deactivates the solenoid 74. Once the solenoid 74 is deactivated, tension on the off-throttle cable 76 is relaxed allowing the throttle plate 47 to pivot toward the idle position.

As further diagramed in FIG. 10, additional features can be provided to the controlled thrust steering system. These additional features include a power on/off switch 78, a power on indicator light 80 and a controlled thrust indicator light 82. These additional features are provided for the convenience of the rider and are not necessary for the function of the controlled thrust steering system. The power on/off switch 78 can be provided to allow the rider to switch the controlled thrust steering system on or off. The power on indicator light 80 can be provided to indicate to the rider that the controlled thrust steering system has been turned on. The controlled thrust indicator light 82 can be provided to indicate to the rider that the controlled thrust steering system has been activated.

Figure 11:
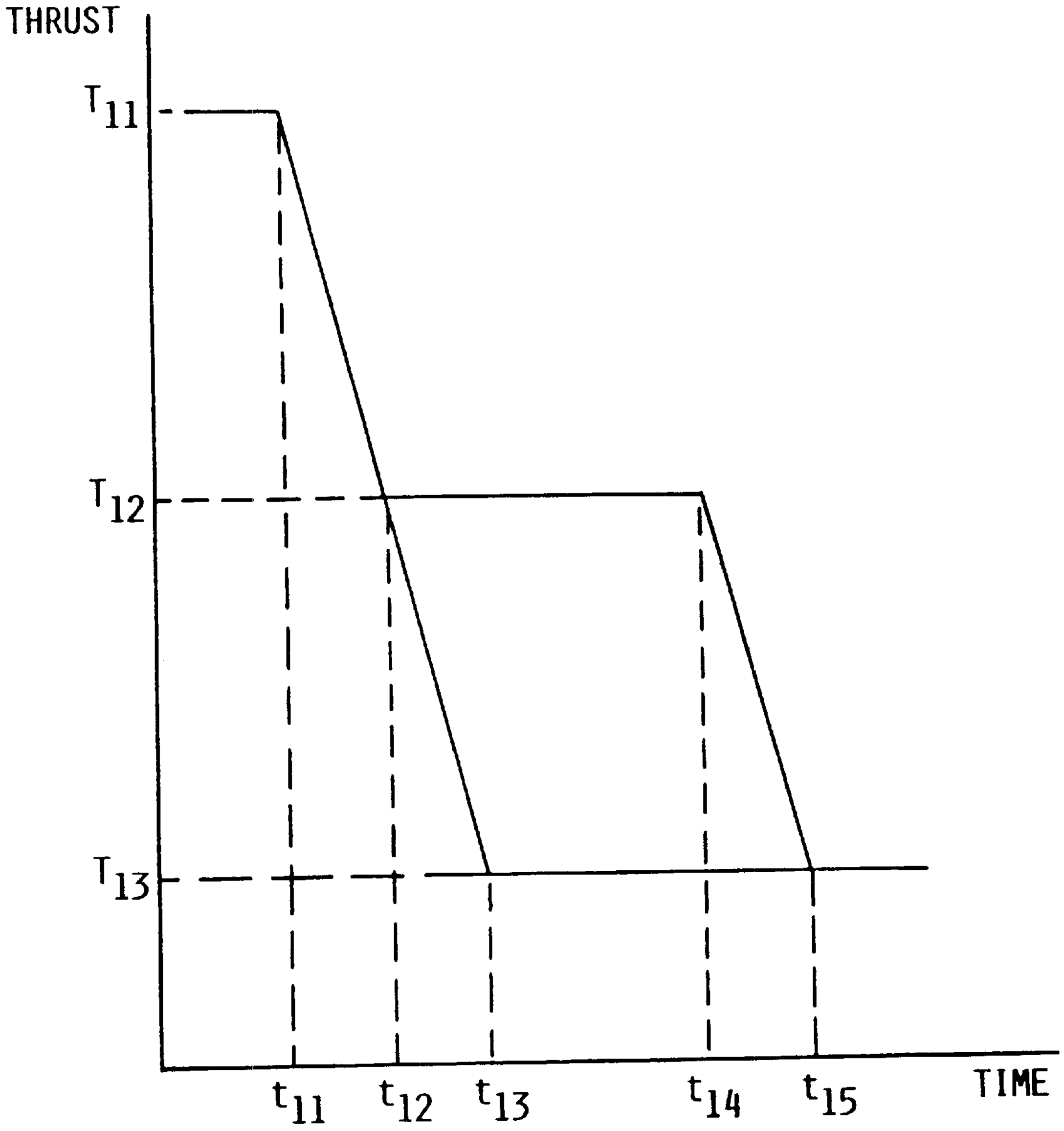
FIG. 11 is a diagram showing the effect of the controlled thrust steering system in accordance to the fourth embodiment.

FIG. 11 diagrams the effect of a controlled thrust steering system as identified in the fourth embodiment. Upon the rider releasing the throttle lever with the thrust $T_{11}$ out of the steering nozzle, the thrust quickly drops from $T_{11}$ to a steerable thrust $T_{12}$ during a time period from $t_{11}$ to $t_{12}$. If the controlled thrust steering system was not present, the thrust will continue to drop from $T_{12}$ to idle thrust $T_{13}$ during a time period from $t_{12}$ to $t_{13}$. Since only idle thrust $T_{13}$ of water is exhausted out the steering nozzle, very little steering capability is provided to the rider at this thrust level. With the controlled thrust steering system in place, the thrust remains approximately constant at steerable thrust $T_{12}$ during a given time period from $t_{12}$ to $t_{14}$.

For the purpose of this application and all embodiments disclosed in this application, the thrust remaining approximately constant is defined as the thrust not decreasing as quickly if the controlled thrust steering system was not in place. Due to the nature of an engine powering a jet propulsion, variance in thrust and a small amount of thrust drop-off during the time period from $t_{12}$ to $t_{14}$ can be expected. Furthermore, the diagram illustrates the thrust remaining approximately constant immediately at time $t_{12}$. In certain thrust systems, a time lag may occur between when the timer is activated and when the thrust to steerable thrust $T_{12}$ actually occur. The time lag may occur due to time delay in the mechanical or electrical system. The time lay may also occur due to the hydraulic nature of the jet propulsion. Hence, the thrust may drop slightly below steerable thrus $T_{12}$ for a short time period, then increase to steerable thrust $T_{12}$ where the thrust remains approximally constant for a given amount of time.

Thereafter, the thrust will drop from $T_{12}$ to idle thrust $T_{13}$ during a period from $t_{14}$ to $t_{15}$. Therefore, the controlled thrust steering system provides the rider with steering capability for an additional time of $(t_{14}-t_{13})$. This additional time $(t_{14}-t_{13})$ may provide the rider with the necessary time having adequate steering capability to steer around an obstacle directly in front of the watercraft.

Figure 12:
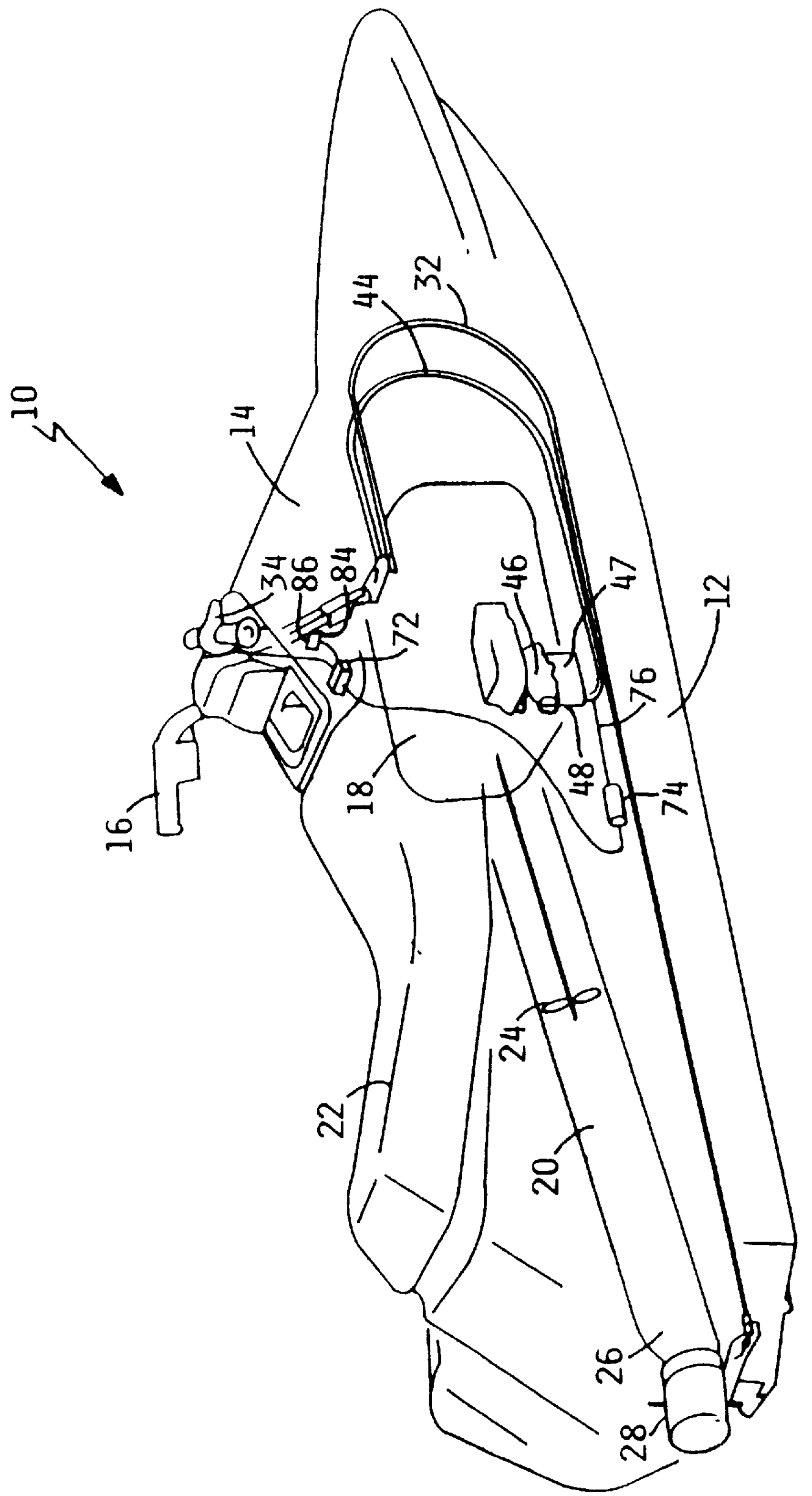
FIG. 12 is a perspective view of a watercraft showing a fifth embodiment of a controlled thrust steering system.

FIG. 12 illustrates a fifth embodiment of the present invention. The fifth embodiment includes a controlled thrust steering system with inputs provided by the throttle position and the steering position. The controlled thrust steering system is attached to the throttle regulator to increase the time period for the thrust to decrease upon the rider releasing the throttle lever, thus providing the rider with a longer time period of steering capability to steer the watercraft.

Figure 8:
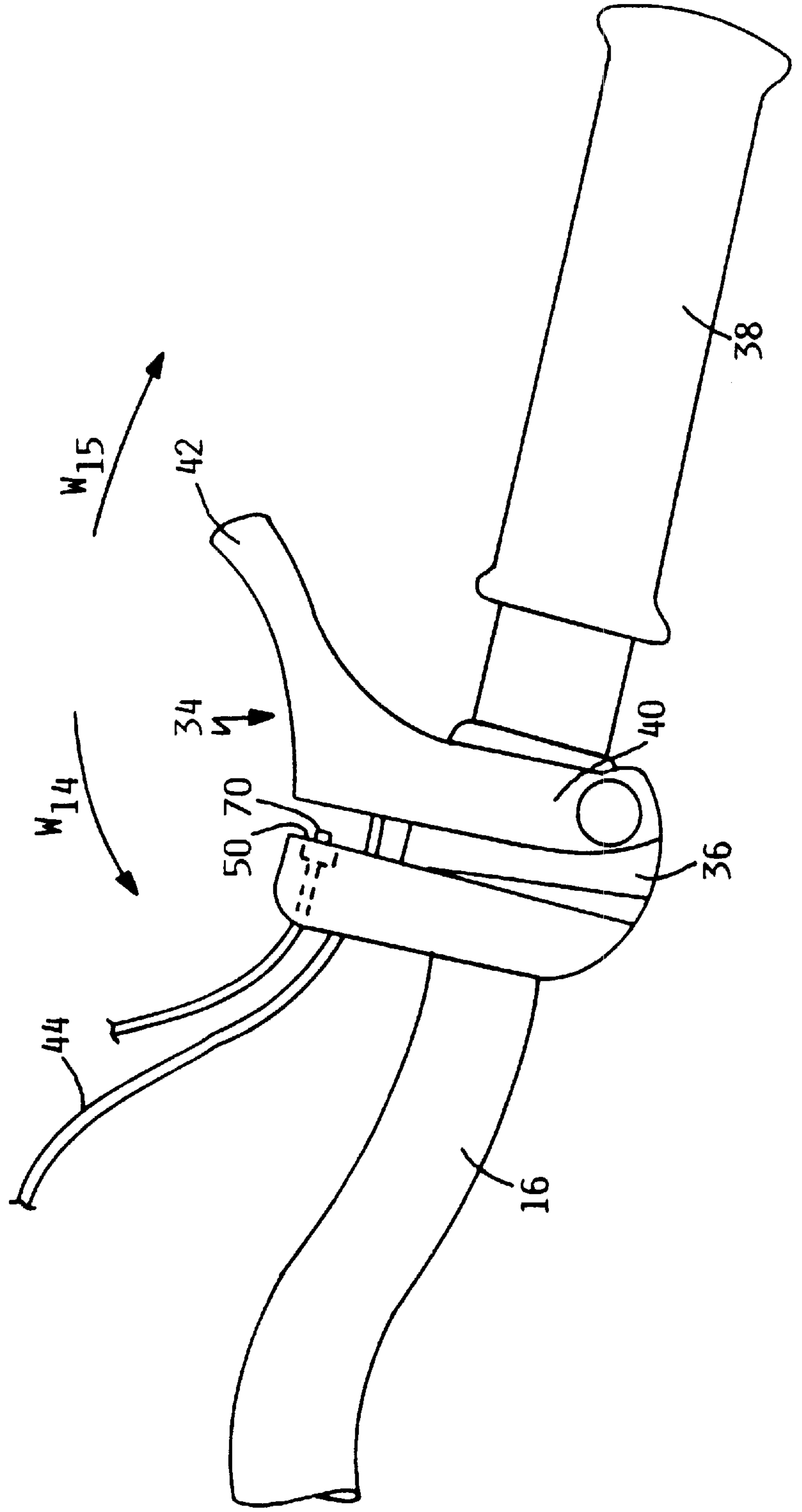
FIG. 8 is an enlarged view of the right steering handle showing a throttle closed switch.

The controlled thrust steering system of the fifth embodiment comprises a throttle closed switch 70, a proximity switch 84, a proximity switch triggering mechanism 86 and 87, a timer 72, a solenoid 74 and an off-throttle cable 76. The throttle closed switch 70 of the fifth embodiment is identical to the throttle closed switch 70 identified in the fourth embodiment and as illustrated in FIG. 8. The throttle closed switch 70 is located between the back of the throttle lever 34 and the abutment surface 50 upon which the throttle lever abuts when the throttle lever is at the idle position.

Figure 13:
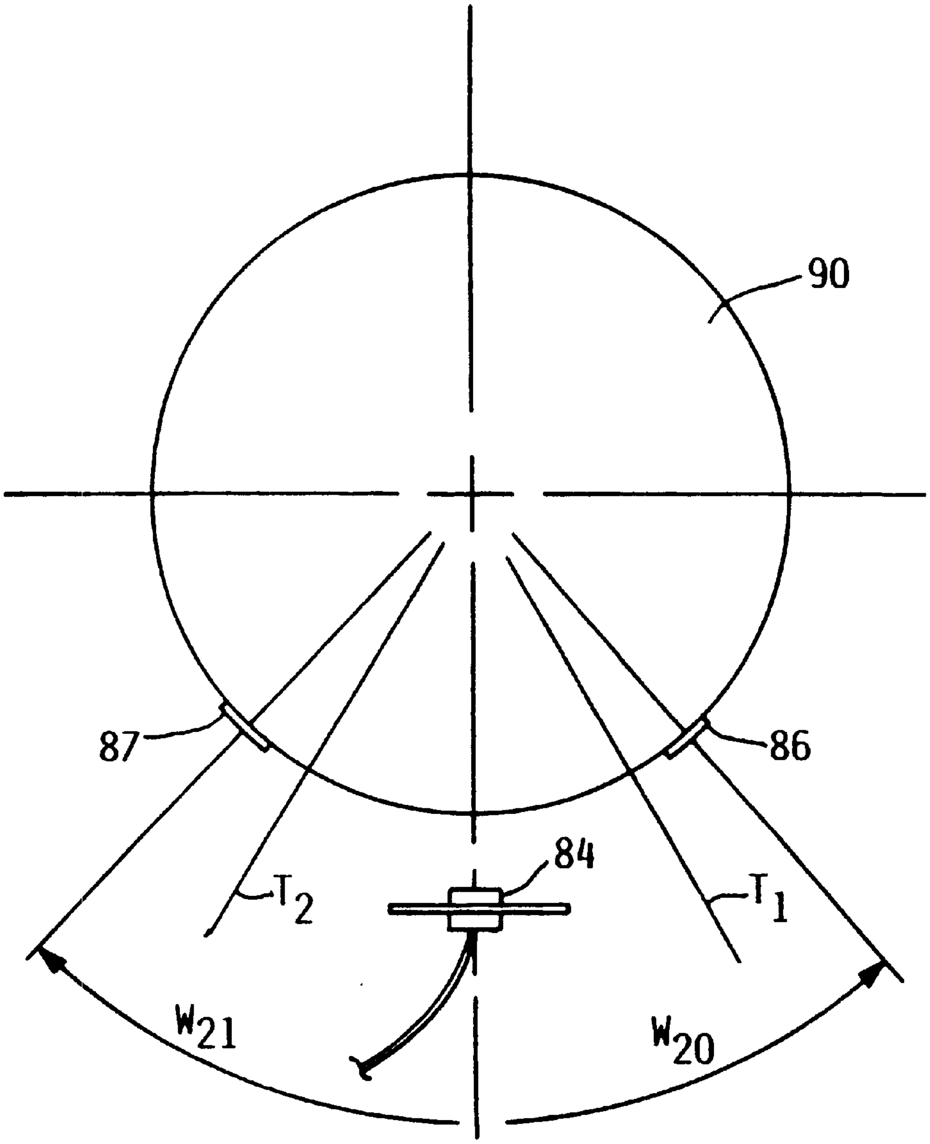
FIG. 13 is a top plan view of the steering post and proximity switch of FIG. 12.
Figure 14:
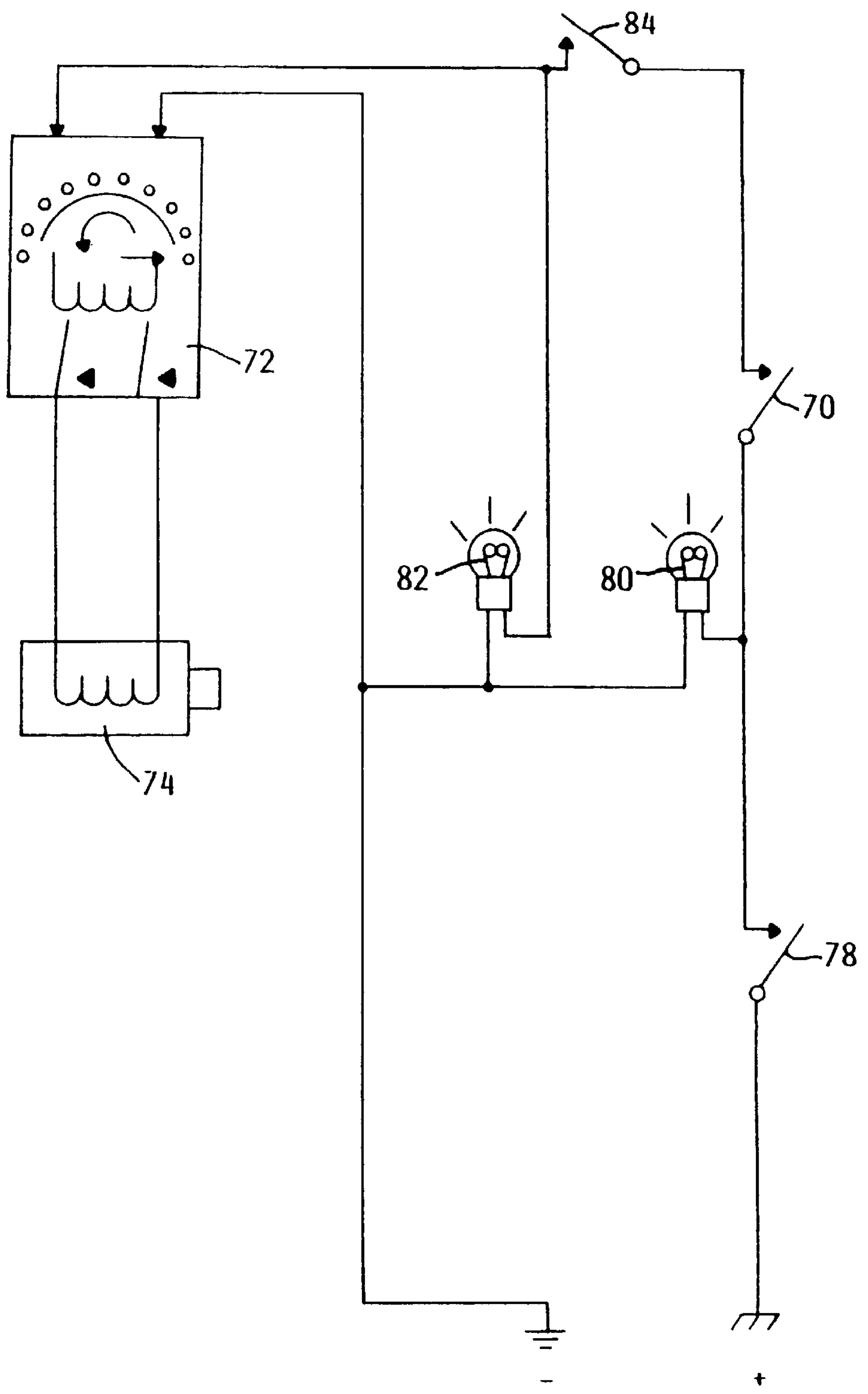
FIG. 14 is a circuit diagram of the fifth embodiment.

As illustrated in circuit diagram FIG. 14, the proximity switch 84 is in series with the throttle closed switch 70. Therefore both the proximity switch 84 and the throttle closed switch 70 must be closed to trigger the timer 72. As illustrates in FIGS. 12 and 13, the proximity switch 84 is mounted on a bracket located near the steering post 90 of the watercraft. Two magnets 86 and 87 acting as proximity triggering mechanisms are mounted on the steering post 90. The magnets 86 and 87 are mounted on the steering post 90 such that the proximity switch 84 is located at the circumferential center of the two magnets 86 and 87 when the position of the steering post 90 causes the watercraft to travel in a straight direction. In another word, when the watercraft is traveling in a straight direction the angle $W_{10}$ between the proximity switch 84 with one of the magnets 86 is approximately equal to the angle $W_{11}$, between the proximity switch 84 with the other magnet 87. The proximity switch 84 has a circuit which defaults to the open position. Once the proximity switch 84 is at a given trigger angular position $T_1$ or $T_2$, the proximity switch 84 is sufficiently close to one of the magnets 86 and 87 to close the proximity switch. Thus after the back of the throttle lever 34 contacts the throttle closed switch 70 and the proximity switch 84 surpasses the trigger position $T_1$ and $P_2$, the timer 72 located in the hull 12 of the watercraft is triggered to activate the solenoid 74 for a given amount of time. The solenoid 74 is connected to the off-throttle cable 76 at one end of the off-throttle cable. The other end of the off-throttle cable 76 is connected to the throttle cable 44.

FIG. 14 is a circuit diagram of the fifth embodiment. The fifth embodiment functions as follows. Upon the rider releasing the throttle lever 34, the bias by the throttle return spring 49 causes the throttle lever 34 to pivot toward the idle position until the back of the throttle lever 34 contacts the throttle closed switch 70. Once the back of the throttle lever 34 contacts the throttle closed switch 70, further bias by the throttle return spring 49 cause the previously open circuit within the throttle closed switch 70 to close.

Likewise, upon the rider turning the steering handle 16 and the associated steering post 90 to surpass the trigger position $T_1$ or $T_2$, the previously open circuit within the proximity switch closes.

Once both the throttle closed switch 70 and the proximity switch 84 close, the timer 72 is triggered. It should be noted that the timer 72 of the fifth embodiment is triggered only after both the throttle closed switch 70 and the proximity switch 84 are closed. Therefore, should the throttle closed switch 70 closes without the proximity switch 84 closed, the timer 72 is not triggered. Hence, the timer 72 is not triggered if the rider releases the throttle lever 34 without turning the steering handle 16 a sufficient amount.

Upon the timer 72 being triggered, the timer 72 activates the solenoid 74 for a given amount of time. The given amount of time should provide the rider with sufficient time to steer the watercraft clear of the obstacle without oversteering the watercraft. The optimal given amount of time is between 0.5 to 3.0 seconds.

Figure 9:
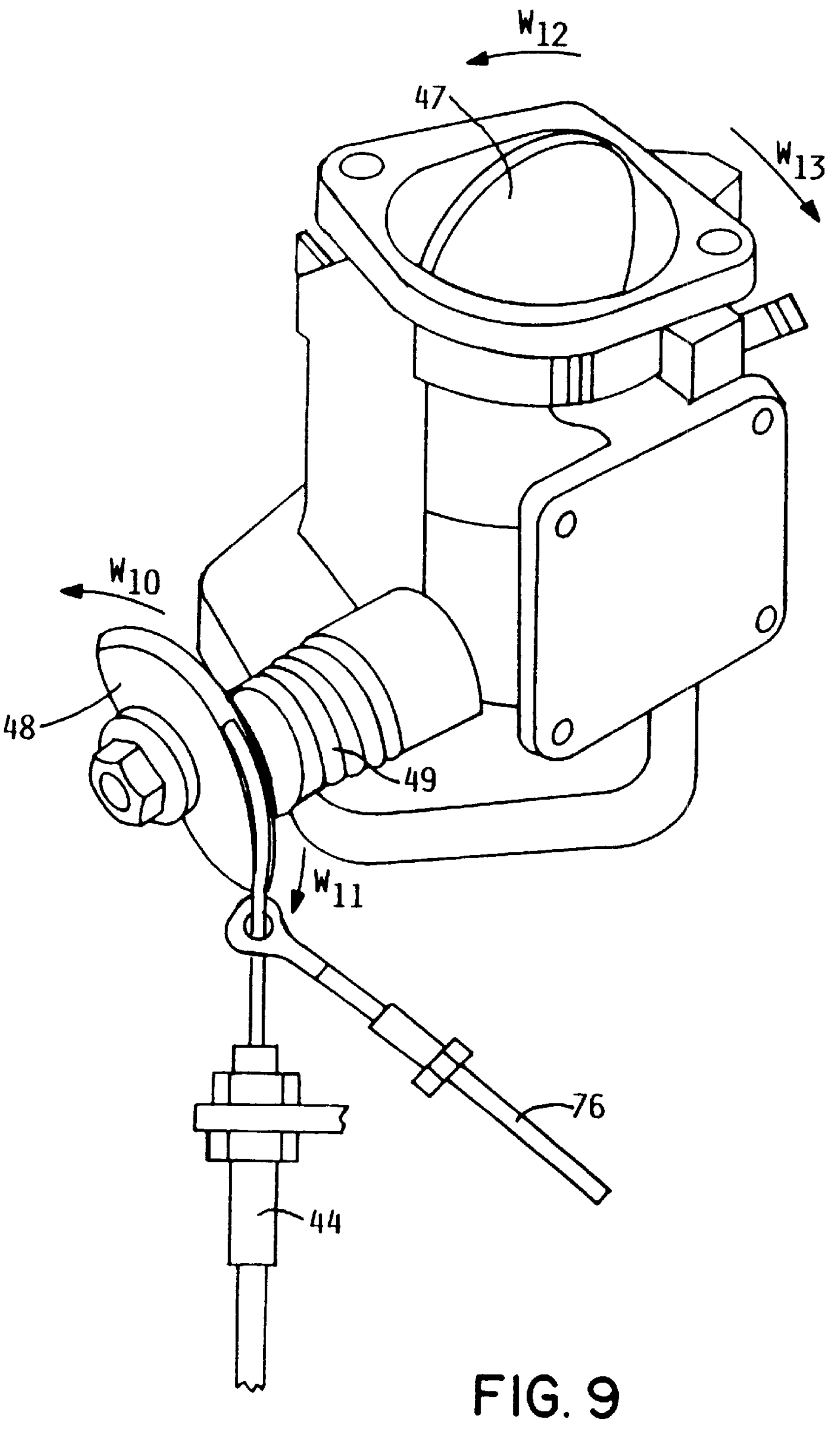
FIG. 9 is an enlarge view of the thrust control mechanism with an off-throttle control cable connected to the throttle cable.

Thereafter, the solenoid 74 pulls on the off-throttle cable 76. The end of the off-throttle cable 76 is connected to the throttle cable 44 axially outwardly of the connection with the throttle control pulley 48 as illustrated in FIG. 9. Without the solenoid 74 in place or activated, upon the rider releasing the throttle lever 34, the bias by the throttle return spring 49 causes the throttle plate 47 to pivot toward the idle position. With the solenoid 74 activated, upon the rider releasing the throttle lever 34, the off-throttle cable 76 pulls on the throttle cable 44 axially outwardly and retains the throttle plate 47 at a steerable thru position.

The solenoid 74 is activated for a given amount of time; thereafter, the timer 72 deactivates the solenoid 74. Once the solenoid 74 is deactivated, tension on the off-throttle cable 76 is relaxed allowing the throttle plate 47 to pivot toward the idle position.

As further diagramed in FIG. 14, additional features can be provided to the controlled thrust steering system. These additional features include a power on/off switch 78, a power on indicator light 80 and a controlled thrust indicator light 82. These additional features are provided for the convenience of the rider and are not necessary for the function of the controlled thrust ring system. The power on/off switch 78 can be provided to allow the rider to switch the controlled thrust steering system on or off. The power on indicator light 80 can be provided to indicate to the rider that the controlled thrust steering system has been turned on. The controlled thrust indicator light 82 can be provided to indicate to the rider that the controlled thrust steering system has been activated.

The sequence of the throttle closed switch 70 closing and the proximity switch 84 closing can occur in a variety of manners. One possible sequence is for the rider to first turn the steering handle 16 a sufficient amount to close the proximity switch 84. The rider then releases the throttle lever 34 to close the throttle closed switch 70. In such a sequence, the timer 72 is triggered as soon as the back of throttle lever 34 co and closes the throttle closed switch 70. The thrust deceases as soon as the rider releases the throttle lever 34 since only the proximity switch 84 is closed at this point. As soon as the back of the throttle lever 34 contacts the throttle closed switch 70, both the proximity switch 84 and the throttle closed switch 70 are closed. Thereafter, the timer 72 is triggered causing the thrust to remain approximately constant at the steerable thrust for a given amount of time before containing to decrease toward idle.

Figure 15:
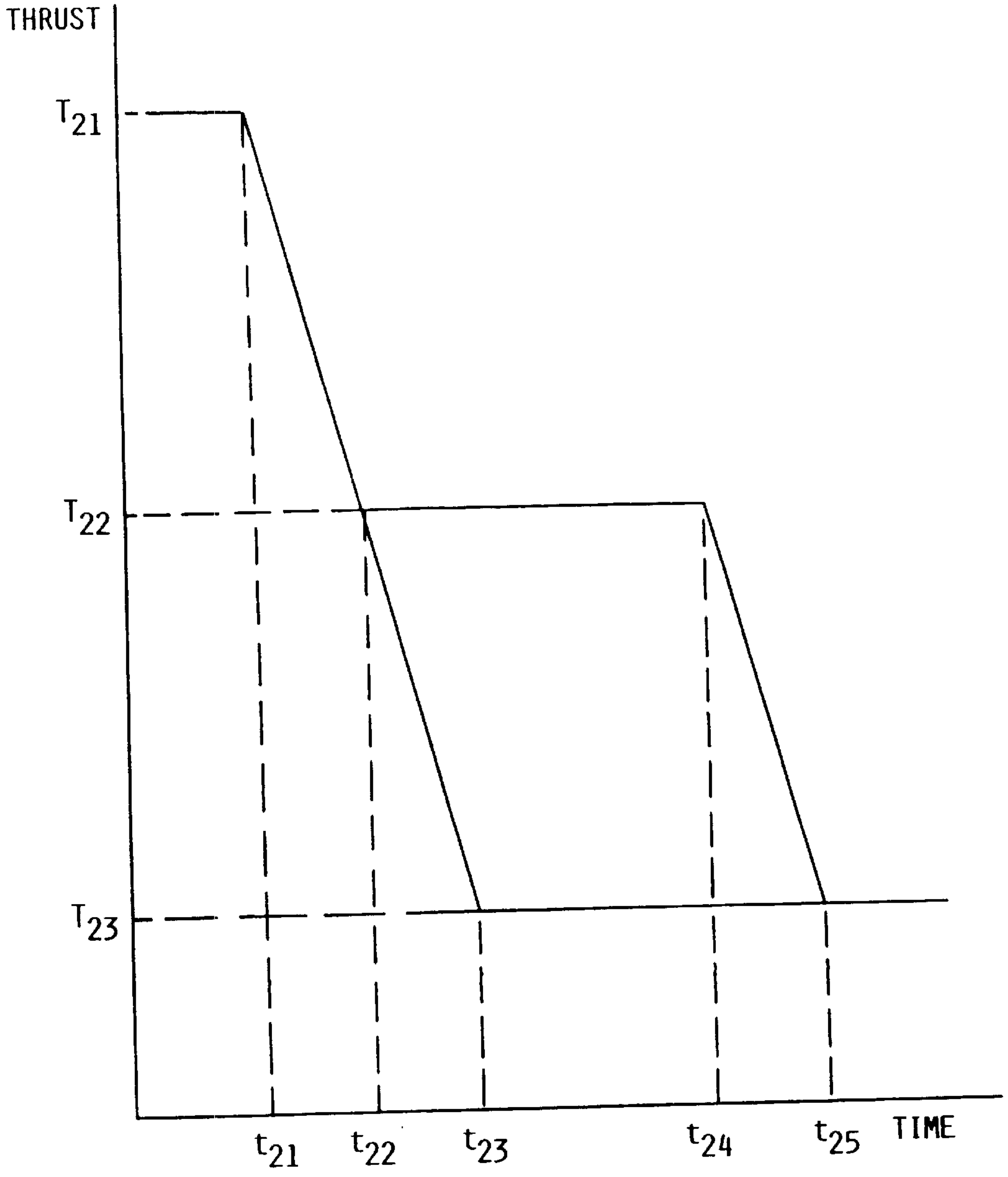
FIG. 15 is a diagram showing the effect of the controlled thrust steering system in accordance to the fifth embodiment should the rider turn the steering handle a sufficient amount prior to releasing the throttle lever.

FIG. 15 diagrams the effect of a controlled thrust steering system in accordance to the fifth embodiment should the rider turn the steering handle 16 a sufficient amount prior to releasing the throttle lever 34. Upon the rider releasing the throttle lever 34 with the thrust $T_{21}$ out of the steering nozzle, the thrust quickly drops from $T_{21}$ to a steerable thrust $T_{22}$ during a time period from $t_{21}$ to $t_{22}$. If the controlled thrust steering system was not present, the thrust will continue to drop from steerable thrust $T_{22}$ to idle thrust $T_{23}$ during a time period from $t_{22}$ to $t_{23}$. Since only idle thrust $T_{23}$ of water is exhausted out the steering nozzle, very little steering capability is provided to the rider at this thrust level. With the controlled thrust steering system in place, the thrust remains approximately constant at the steerable thrust $T_{22}$ during a given time period from $t_{22}$ to $t_{24}$.

Thereafter, the thrust drops from $T_{22}$ to idle thrust $T_{23}$ during a period from $t_{24}$ to $t_{25}$. Therefore, the controlled thrust steering system provides the rider with steering capability for an additional time of $(t_{24}-t_{23})$. This additional time $(t_{24}-t_{23})$ may provide the rider with the necessary time having adequate steering capability to steer around an obstacle directly in front of the watercraft.

Another possible sequence is for the rider to first release the throttle lever 34 to close the throttle closed switch 70. The rider then turns the steering handle 16 a sufficient amount to close the proximity switch 84. In such a sequence, the timer 72 is triggered only after the steering handle 16 is turned a sufficient amount thus closing the proximity switch 84. The thrust decreases and continues to decrease as soon as the rider releases the throttle lever 34 since only the throttle closed switch 70 is closed at this point. After the rider turns the steering handle 16 a sufficient amount, both the proximity switch 84 and the throttle closed switch 70 are closed. If the thrust drops below the steerable thrust at the time both the proximity switch 84 and the throttle closed switch 70 close, the timer 72 is triggered causing the off-throttle cable 76 to pull on the throttle cable and increase the thrust to the steerable thrust. Thereafter the thrust remains approximately constant for a given amount of time before continuing to decrease toward idle. If the thrust is above the steerable thrust at the time both the proximity switch 84 and the throttle closed switch 70 close, the effect would be identical to the sequence when the ride turns the steering handle 16 prior to releasing the throttle lever 34.

Figure 16:
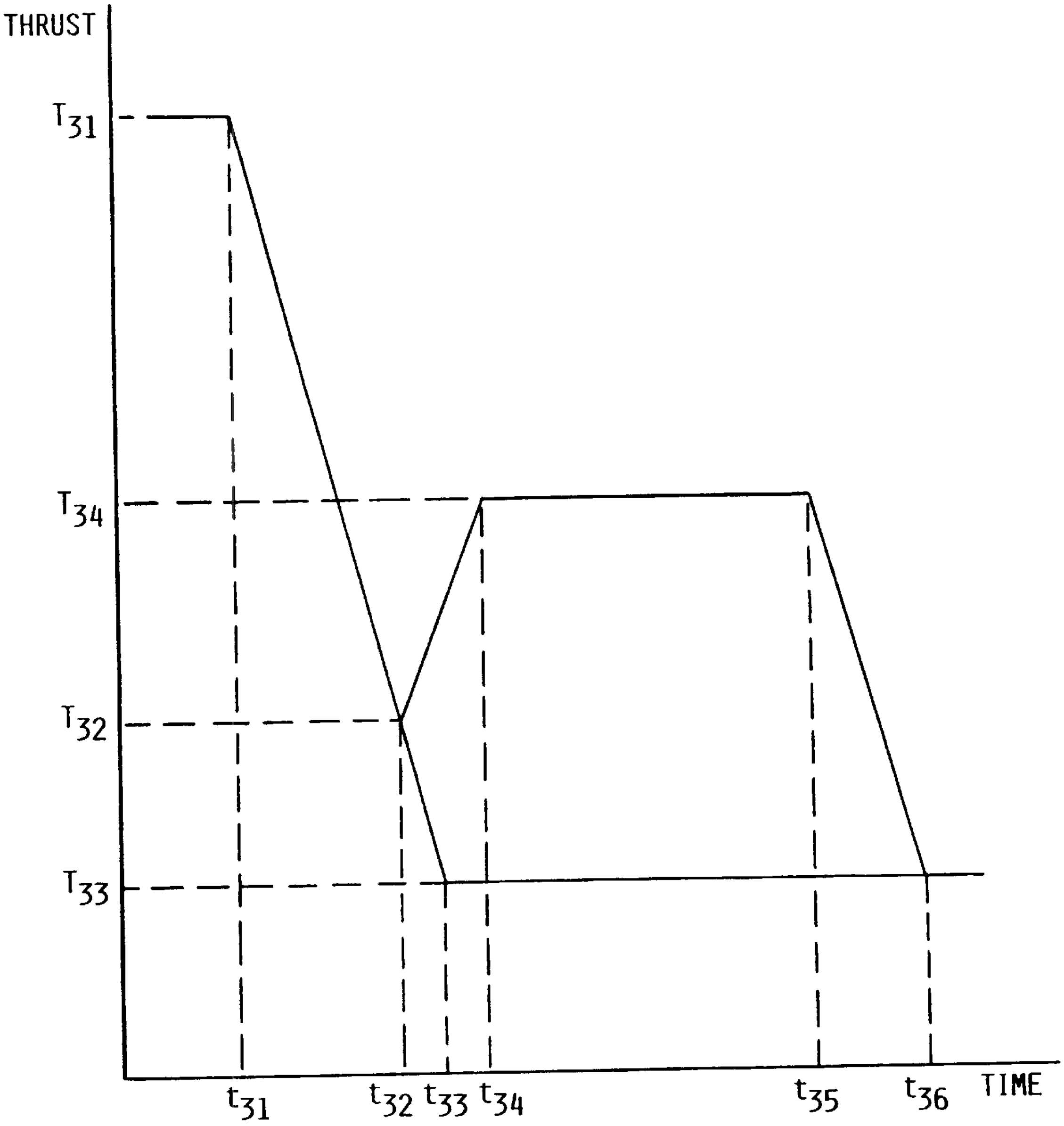
FIG. 16 is a diagram showing the effect of the controlled thrust steering system in accordance to the fifth embodiment should the rider release the throttle lever prior to turning the steering handle a sufficient amount and the thrust dropped below the steerable thrust.

FIG. 16 diagrams the effect of a controlled thrust steering system in accordance to the fifth embodiment should the rider release the throttle lever 34 prior to turning the steering handle 16 a sufficient amount and the thrust dropped below the steerable thrust. Upon the rider releasing the throttle lever with the thrust $T_{31}$ out of the steering nozzle, the thrust quickly drops from $T_{31}$ to a steerable thrust $T_{32}$ during a time period from $t_{31}$ to $t_{32}$. If the controlled thrust steering system was not present, the thrust will continue to drop from $T_{32}$ to idle thrust $T_{33}$ during a time period from $t_{32}$ to $t_{33}$. Since only idle thrust $T_{33}$ of water is exhausted out the steering nozzle, very little steering capability is provided to the rider at this thrust level. With the controlled thrust steering system in place, the thrust increases from thrust $T_{32}$ to thrust $T_{34}$ during a time period from $t_{32}$ to $t_{34}$ and remains approximately constant at $T_{32}$ during a given time period from $t_{34}$ to $t_{35}$. Thereafter, the thrust drops from $T_{34}$ to idle thrust $T_{33}$ during a period from $t_{35}$ to $t_{36}$. Therefore, the controlled thrust steering system provides the rider with steering capability for an additional time of $(t_{36}-t_{33})$ This additional time $(t_{36}-t_{33})$ may provide the rider with the necessary time having adequate steering capability to steer around an obstacle directly in front of the watercraft.

A third possible sequence is for the rider to release the throttle lever 34 for a long period time, such that the thrust out of the steering nozzle is at idle thrust. Thereafter, the rider turns the steering handle 16 a sufficient amount to close the proximity switch 70. Such a sequence may occur when the rider is attempting to dock the watercraft. As discussed earlier in "the field of the invention" section, the docking procedure usually occurs with the watercraft traveling at a low speed; therefore, the rider may release the throttle lever while attempting to dock the watercraft. Without a controlled thrust steering system, only idle thrust is provided to steer the watercraft.

The controlled thrust steering system in accordance to the fifth embodiment provides the rider with adequate steering capability after the rider has released the throttle lever for a long period time, such that the thrust out of the steering nozzle prior to the rider turning the steering handle is at idle thrust. In such a sequence, the timer 72 is triggered after the steering handle 16 is turned a sufficient amount, thus closing the proximity switch 84. Since the throttle closed switch 70 is already closed, after the rider turns the steering handle 16 a sufficient amount, both the proximity switch 84 and the throttle closed switch 70 are closed. Thereafter, the timer 72 is triggered causing the off-throttle cable 76 to pull on the throttle cable and increase the thrust to the steerable thrust. The thrust remains approximately constant at the steerable thrust for a given amount of time before decreasing toward the idle thrust. This increase in thrust to the steerable thrust for a given amount of time allows the rider to have adequate steering even after the rider has released the throttle lever for a long period of time.

Figure 17:
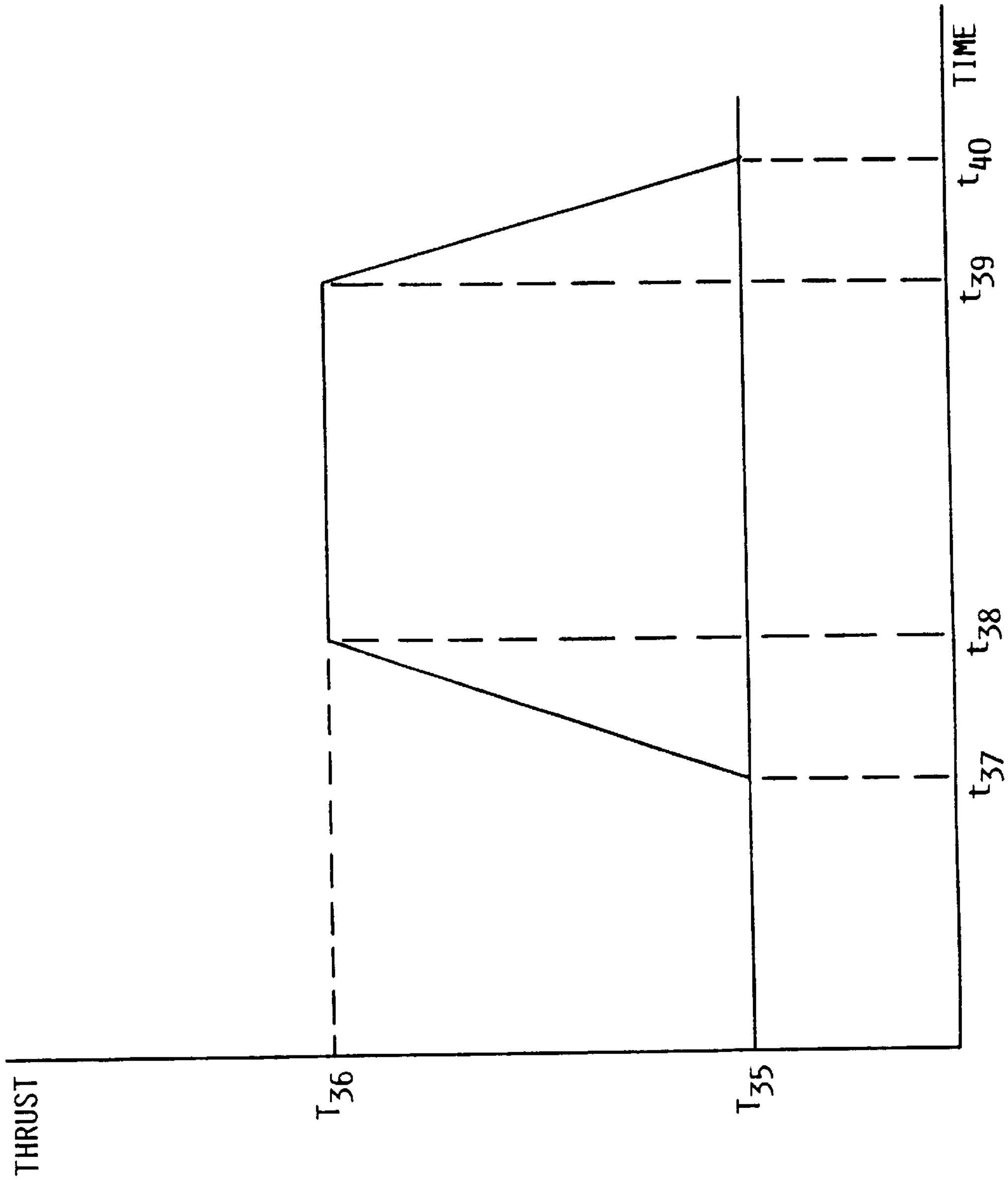
FIG. 17 is a diagram showing the effect of the controlled thrust steering system in accordance to the fifth embodiment should the rider release the throttle lever for a long period of time, such that the thrust out of the steering nozzle is at idle thrust, and thereafter turn the steering handle a sufficient amount.

FIG. 17 diagrams the effect of a controlled thrust steering system in accordance to the fifth embodiment should the rider release the throttle lever 34 for a long period of time, such that the thrust out of the steering nozzle is at the idle thrust $T_{35}$. Thereafter, the rider turns the steering handle 16 a sufficient amount. If the controlled thrust steering was not present, upon the rider turning the steering handle 16, the thrust will continue at the idle thrust $T_{35}$. Since only the idle that of water is exhausted out of the steering nozzle, very little steering capability is provided to the rider at this thrust level. With the controlled thrust steering system in place, the thrust increases from the idle thrust $T_{35}$ to a steerable thrust $T_{36}$ during a time period from $t_{37}$ to $t_{38}$ and remains approximately constant at the steerable thrust $T_{36}$ during a given time period from $t_{38}$ to $t_{39}$. Thereafter, the thrust drops from the steerable thrust $T_{36}$ to the idle thrust $T_{35}$ during a time period from $t_{39}$ to $t_{40}$. Therefore, the controlled thrust steering system provides the rider with adequate steering capability for at least a time period of ($t_{38}$–$t_{39}$) to to maneuver the watercraft for docking.

The fourth and the fifth embodiments disclose the throttle closed switch closing upon the throttle lever at a position upon steerable thrust is exhausted out the steering nozzle. Hence, the four and the fifth embodiments disclose the thrust corresponding to the throttle closed switch closing is the same as the thrust at which the thrust remains constant for a given amount of time. It should be noted that the thrusts being the same is for illustrative purpose only. According the preset invention, the thrust corresponding to the throttle closed switch closing can be different from the thrust at which the thrust at which the thrust remains approximately constant for a given amount. For instance, to compensate for the time delay between the when the throttle closed switch closes and when the trust remains approximately constant at the steerable thrust, it may be desirable to have thrust corresponding to the throttle closed switch to be higher than the thrust at which the thrust remains approximately constant.

The sixth embodiment of the present invention includes a controlled thrust steering system mechanically linking the steering post 90 to the throttle regulator 46. The controlled thrust steering system is attached to the throttle regulator 46 to increase the thrust upon the rider rotating the steering handle 16 from a straight-ahead position, thus providing the rider with adequate steering capability even if the rider releases the throttle lever 34. For the purpose of this application, a straight-ahead position is the position of the steering handle 16 and the steering post 90 when the watercraft 10 is traveling in a straight-ahead direction.

Figure 18:
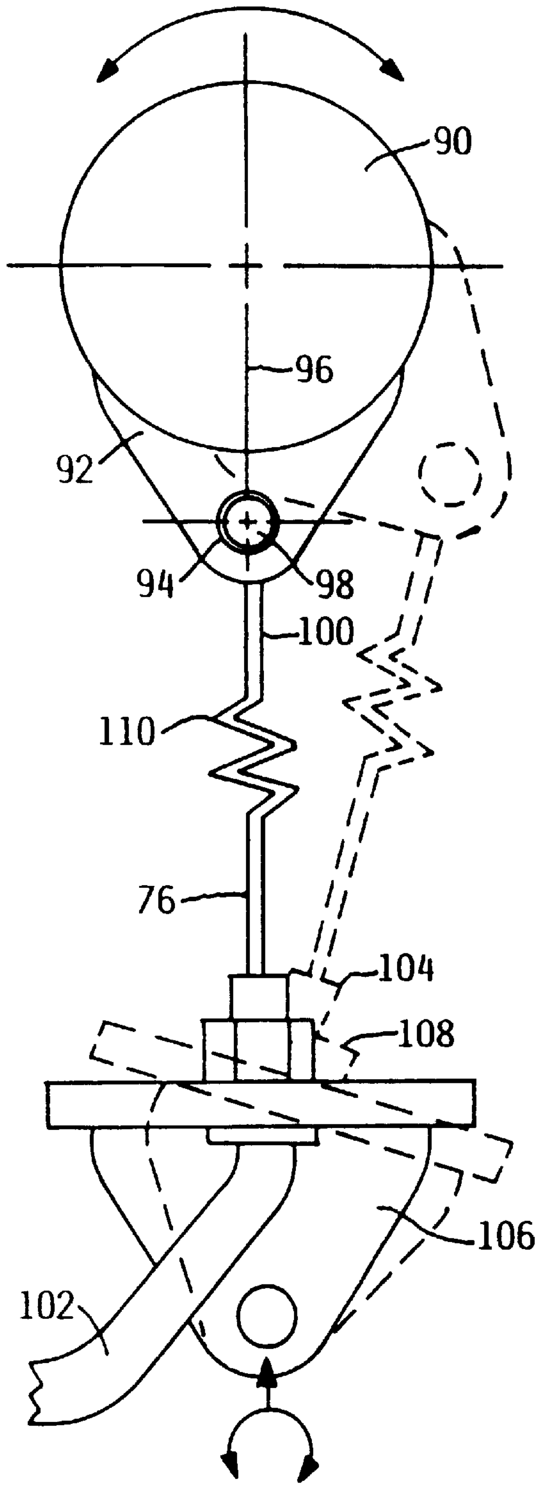
FIG. 18 is a top plan view of a steering post with a lever arm showing a sixth embodiment of a controlled thrust steering system.

As illustrated in FIG. 18, a lever arm 92 is formed on the outer circumferential surface of the steering post 90. The lever arm 92 has a circular aperture 94 defined near the terminal end of the lever arm 92. The lever arm 92 defines a center-line 96 extending from the center of the steering post 90 to the center of the aperture 94. A pin 98, attached to one end of the wire portion 100 of the off-throttle cable 76, is pivotably retained within the aperture 94. The terminal end of the conduit portion 102 of the off-throttle cable 76 is attached to an externally threaded sleeve 104. The sleeve 104 is inserted through an aperture formed in a cable bracket 106. Thread ably attached to the sleeve 104 is a nut 108 having mating internal threads. This externally threaded sleeve and nut arrangement allows for adjustability to the tension of the off-throttle cable 76. The cable bracket 106 is pivotably attached to a solid portion of the watercraft located a given distance from the steering post 90 and aligned with the center-line 96 of the lever arm in a straight-ahead position.

An overload spring 110 is located along a spliced portion of the throttle cable 44 to be in series with the remainder of the throttle cable 44. The spring rate of the overload spring should be high enough such that the overload spring will not stretch when the off-throttle cable pulls on the throttle cable 44 to rotate the throttle plate 47. However, the spring rate of the overload spring 110 should be low enough to allow the rider to stretch the overload spring by the turning the steering handle 16 when the throttle plate 47 is at the wide-open throttle position. As illustrates in FIG. 8, the other end of the wire portion 100 of the off-throttle cable 76 is attached the throttle cable 44.

The sixth embodiment functions as follows. Upon the rider turning the steering handle 16 and the associated steering post 90 from a straight-ahead position, the lever arm 92 pivots with the steering post 90. Since the aperture of the cable bracket, through which the off-throttle cable 76 is inserted, is aligned with the center-line 96 of the lever arm 92; the pivoting movement of the lever arm 92 pulls on the wire portion 100 of the off-throttle cable which in turn pulls the throttle cable 44 axially outwardly to open the throttle plate 47 further than if the controlled thrust steering system was not present. The increased opening of the throttle plate 47 increases as the amount of rotation of the steering post 90 from the straight-ahead position is increased. Therefore, with the throttle below the wide-open throttle position, the more the rider turns the steering handle 16, the more increased thrust is provided for steering the watercraft.

When the throttle lever 34 is at the wider throttle position, the throttle plate 47 abuts a stop (not shown) preventing the throttle plate 47 from further rotation. With the throttle plate 47 prevented from further rotation, the throttle cable 44 is also prevented from further axial movement. Therefore, with the throttle plate 47 abutting the stop, any rotational movement by the steering post 90 and hence a pulling action by the off-throttle cable 76 can not pull the throttle cable 44 any further. In such a situation, as the rider turns the steering handle 16, the overload spring 110 stretches allowing the rider to turn the steering handle 16 without breaking or cause excessive tension on the off-throttle cable 76.

Figure 19:
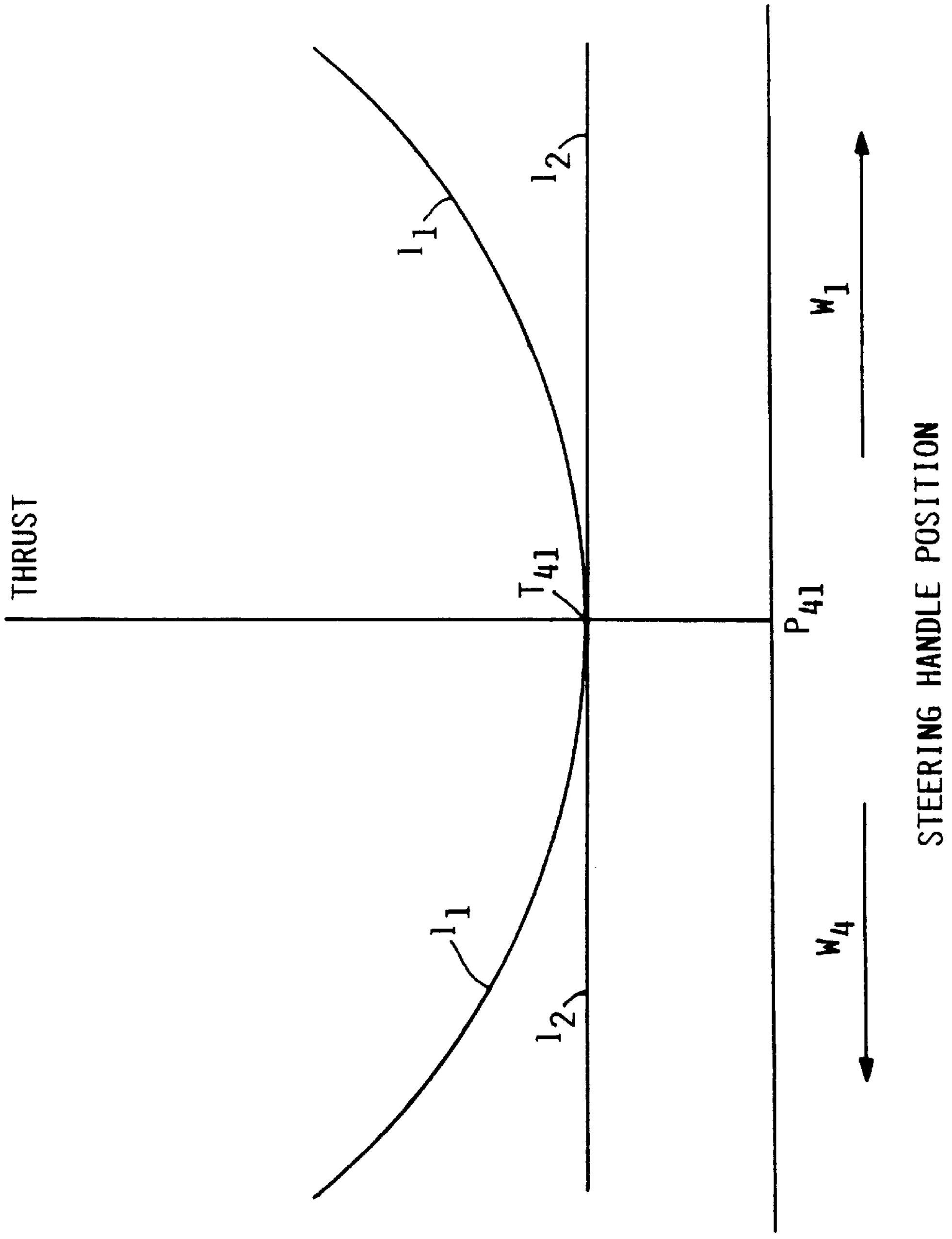
FIG. 19 is a diagram showing the effect of the controlled thrust steering system in accordance to the sixth embodiment.

FIG. 19 diagrams the effect of a controlled thrust steering system in accordance to the sixth embodiment. A thrust $T_{41}$ is exhausted out of the steering nozzle while the steering handle and the associated steering post are in the straight-ahead position $P_{41}$. The thrust $T_{51}$, can be the idle thrust or any thrust above idle thrust but below the thrust exhausted at wide open throttle. Line $1_1$ represents the effect of steering handle position on thrust with the controlled thrust steering system present. Upon the rider turning the steering handle either in the clockwise direction $W_1$ or in the counter-clockwise direction $W_4$, the thrust increases exponentially. This increase in thrust continues as the steering handle is turned further, thus providing the rider with adequate steering capability. Line $1_2$ represents the effect of steering handle position on thrust without the controlled thrust steering system present. Upon the rider turning the steering handle either in the clockwise direction $W_1$ or in the counter-clockwise direction $W_4$, the thurst remains the same.

The seventh embodiment of the present invention includes a controlled thrust steering system mechanically linking the steering post 90 to the throttle regulator 46. The controlled thrust steering system is attached to the throttle regulator 46 to increase the thrust upon the rider rotating the steering handle 16 sufficiently from a straight-ahead position, thus providing the rider with adequate steering capability even if the rider releases the throttle lever 34.

Figure 20:
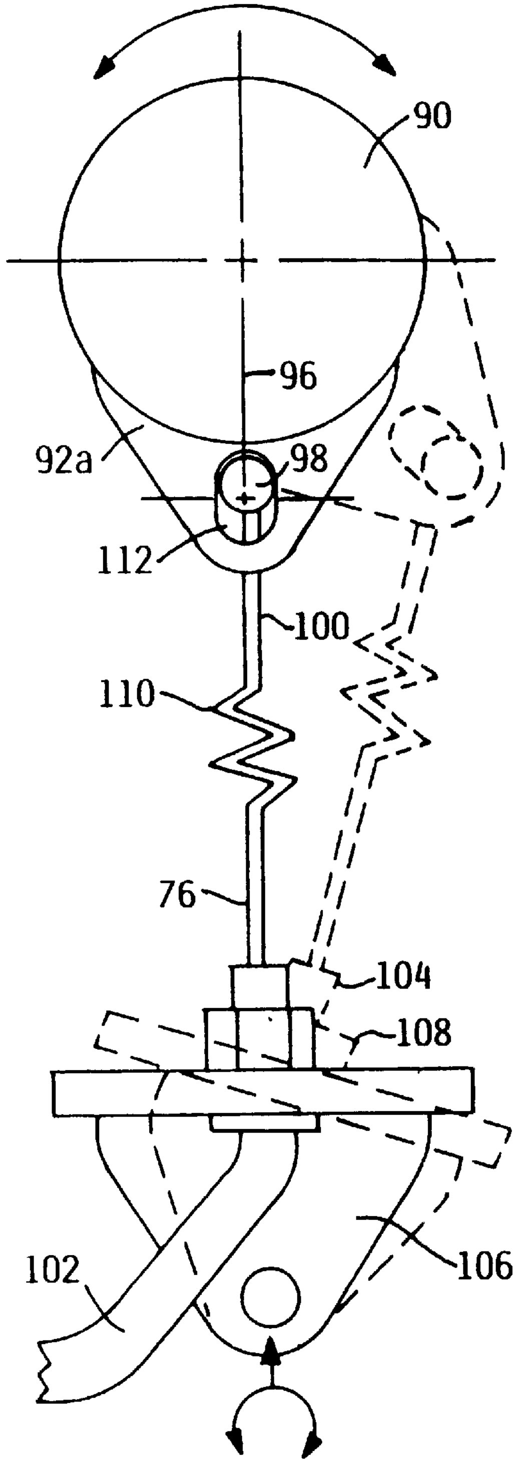
FIG. 20 is a top plan view of a steering post with an axial slot in a lever arm showing a seventh embodiment of a controlled thrust steering system.
Figure 21:
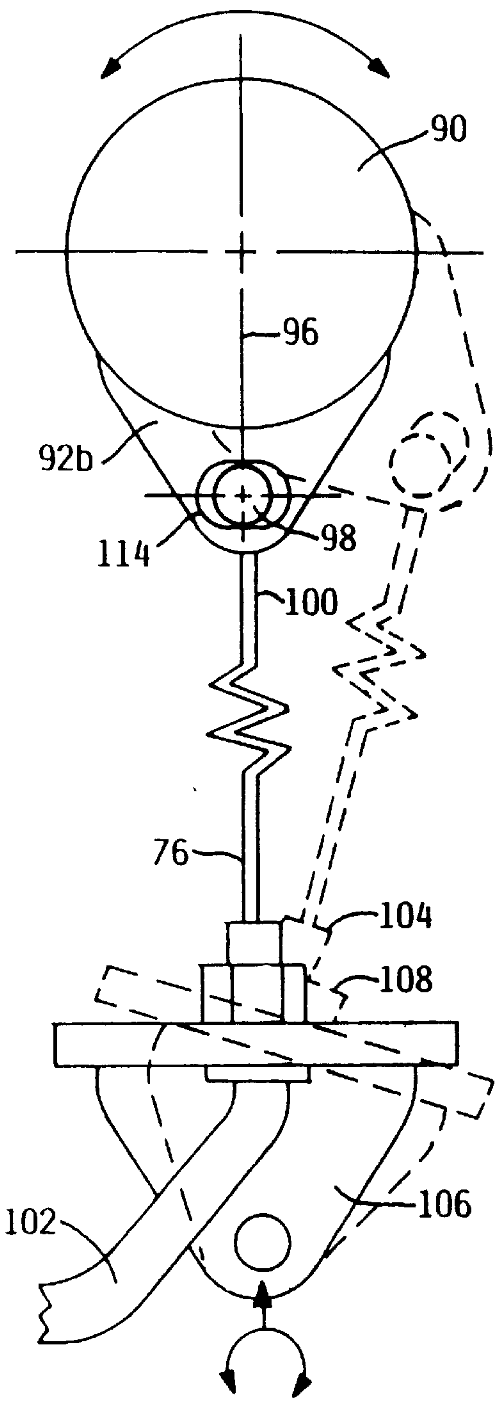
FIG. 21 is a top plan view of a steering post with a circumferential slot in a lever arm showing a seventh embodiment of a controlled thrust steering system.

As illustrated in FIGS. 20 and 21, a lever arm 92*a* similar to the lever arm 92 of the sixth embodiment is formed on the outer circumferential surface of the steering post 90. However, rather than having a circular aperture defined near the terminal end of the lever arm, a slot is defined near the terminal end of the lever arm. FIG. 20 illustrates a slot 112 formed in the lever arm 92*a* and extending axially long the length of the lever arm 92*a*. FIG. 21 illustrates a slot 114 formed in the lever arm 92*b* and extending circumferentially at a given distance from the center of the steering post 90. The lever arm 92 defines a center-line 96 extending from the center of the steering post 90 to the center of the slot 112 or 114. A pin 98, attached to one end of the wire portion 100 of an off-throttle cable 76, is pivotably and slidably retained within the slot 112 or 114. Thus, the axial slot 112 and the circumferential slot 114 allow the lever arm 92 to rotate a given degree before the pin 98 engages one of the terminal ends of the slot 112 or 114. The terminal end of the conduit portion 102 of the off-throttle cable 76 is attached to an externally threaded sleeve 104. The sleeve 104 is inserted through an aperture formed in a cable bracket 106. Thread ably attached to the sleeve 104 is a nut 108 having mating internal threads. This externally threaded sleeve and nut arrangement allows for adjustability to the tension of the off-throttle cable. The cable bracket 106 is attached to a solid portion of the watercraft located a given distance from the steering post 90 and aligned with the center-line 96 of the lever arm in a straight-ahead position.

An overload spring 110 is located along a spliced portion of the throttle cable 44 to be in series with the remainder of the throttle cable 44. The spring rate of the overload spring should be high enough such that the overload spring will not stretch when the off-throttle cable pulls on the throttle cable 44 to rotate the throttle plate 47. However, the spring rate of the overload spring 110 should be low enough to allow the rider to stretch the overload spring by the turning the steering handle 16 when the throttle plate 47 is at the wide open throttle position. As illustrated in FIG. 8, the other end of the wire portion 100 of the off-throttle cable 76 is attached the throttle cable 44.

The seventh embodiment functions as follows. Upon the rider turning the steering handle 16 and the associated steering post 90 from a straight-ahead position, the lever arm 92 pivots with the steering post 90. Since the aperture of the cable bracket through which the off-throttle cable is inserted is aligned with the center-line 98 of the lever arm 92, the pivoting movement of the lever arm 92 pivots and slides the pin 98 along the slot 112 or 114 until the pin 98 contacts one of the terminal ends. The lever arm 92 then pulls on the wire portion 100 of the off-throttle cable 76 which in turn pulls the throttle cable 44 axially outwardly to open the throttle plate 47 further than if the controlled thrust steering system was not present. The increased opening of the throttle plate 47 increases as the amount of rotation of the steering post 90 from the straight-ahead position is increased. Therefore, with the throttle below the wide-open throttle position, once the steering handle 16 has been rotated a given amount (to the point where the pin 98 contacts one of the terminal ends of the slot 112 or 114) the more the rider turns the steering handle 16, the more increased thrust is provided for steering the watercraft.

When the throttle lever 34 is at the wide-open throttle position, the throttle plate 47 abuts a stop (not shown) preventing the throttle plate 47 from further rotation. With the throttle plate 47 prevented from further rotation, the throttle cable 44 is also prevented from further axial movement. Therefore, with the throttle plate 47 abutting the stop, any rotational movement by the steering post 90 and hence a pulling action by the off-throttle cable 76 can not pull the throttle cable 44 any further. In such a situation, as the rider turns the steering handle 16, the overload spring 110 stretches allowing the rider to turn the steering handle 16 without breaking or cause excessive tension on the off-throttle cable 76.

Figure 22:
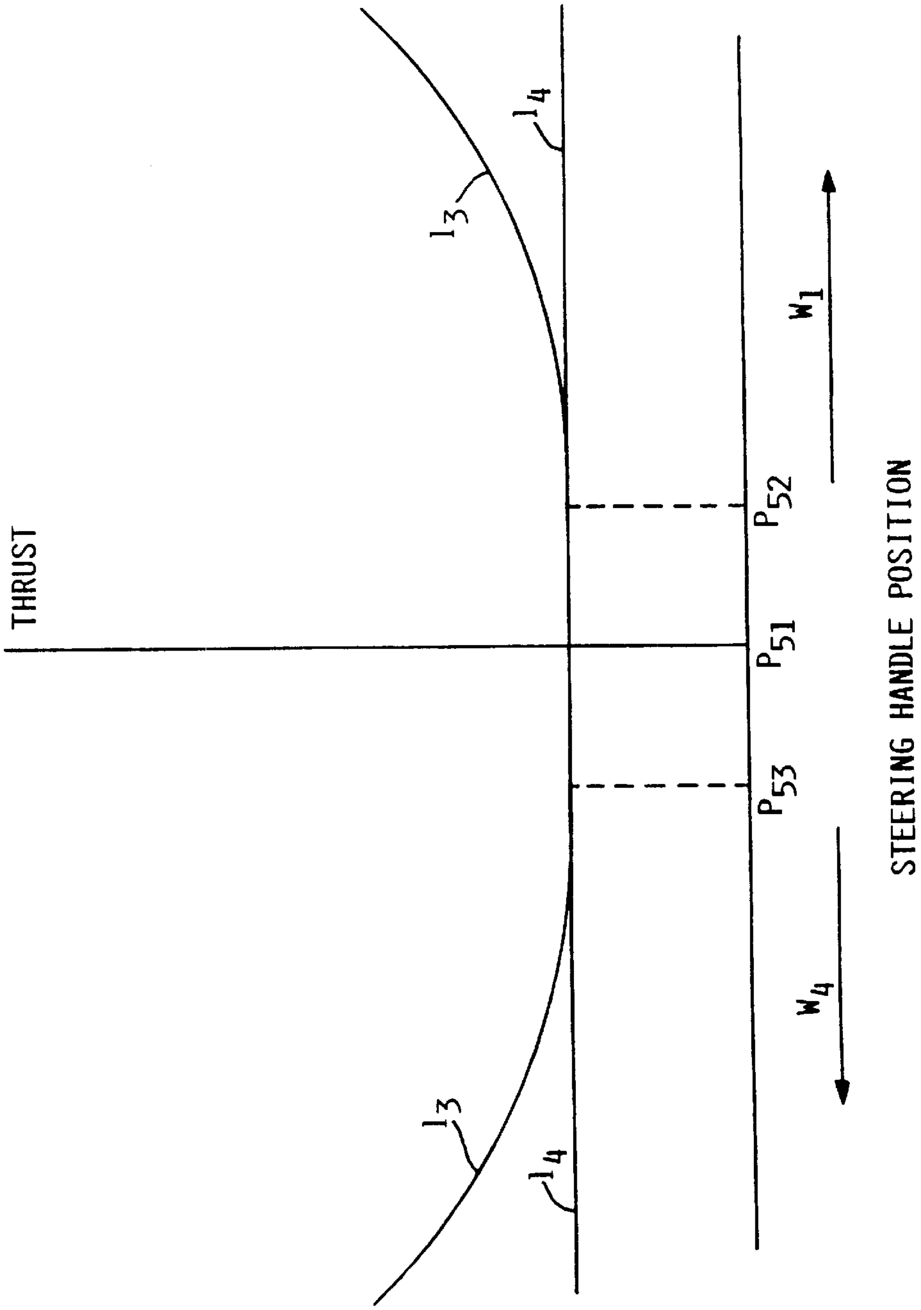
FIG. 22 is a diagram showing the effect of the controlled thrust steering system in accordance to the seventh embodiment.

FIG. 22 diagrams the effect of a controlled thrust steering system in accordance to the seventh embodiment. A thrust $T_{51}$ is exhausted out the steering nozzle while the steering handle and the associated steering post are in the straight-ahead position $P_{51}$. The thrust $T_{51}$ can be the idle thrust or any thrust above idle thrust but below the thrust exhausted at wide-open throttle. Line $\mathbf{1_3}$ represents the effect of steering handle position on thrust with the controlled thrust steering system present. Upon the rider turning the steering handle either in the clockwise direction or in the counter-clockwise direction, the thrust remains constant until the steering handle 16 has been turned sufficiently to steering position $P_{52}$ or $P_{53}$ wherein the pin 98 contacts one of the terminal surfaces of slot 112 or 114. Thereafter, further turning of the steering handle increases the thrust exponentially. This increase in thrust as the steering handle is turned provides the rider with adequate steering capability. Line $\mathbf{1_4}$ represents the effect of steering handle position on thrust without the controlled thrust steering system present. Upon the rider turning the steering handle either in the clockwise direction or in the counter-clockwise direction, the thrust remains the same.

The eighth embodiment includes a controlled thrust steering system mechanically linking the steering post 90 to the throttle regulator 46. The controlled thrust steering system is attached to the throttle regulator 46 to increase the thrust upon the rider rotating the steering handle 16 sufficiently from a straight-ahead position, thus providing the rider with adequate steering capability even if the rider releases the throttle lever 34.

Figure 23:
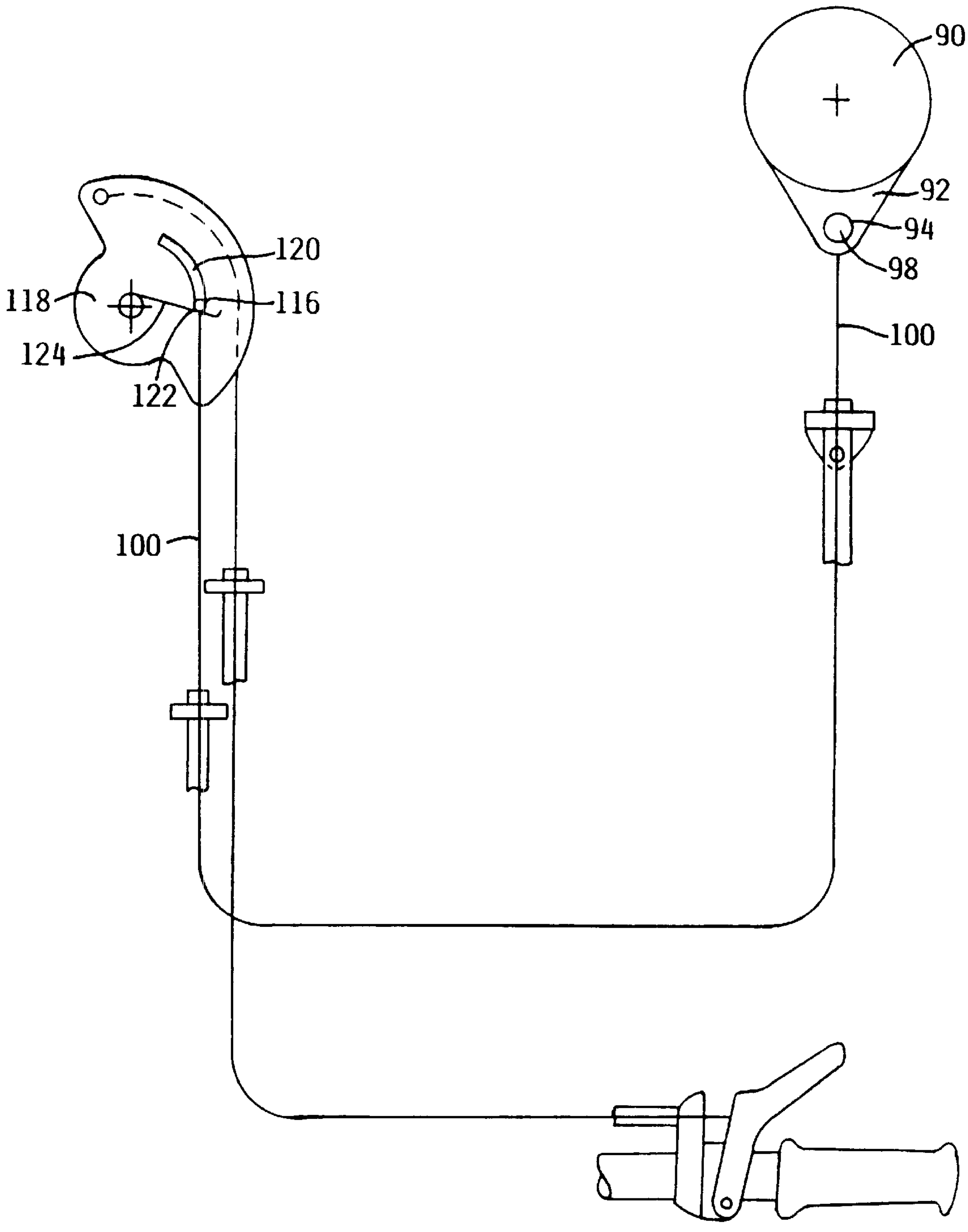
FIG. 23 is a schematic of the mechanical connection between a steering post, a throttle lever and a throttle control pulley showing an eighth embodiment of a controlled thrust steering system.

As illustrated in FIG. 23, a lever arm 92 identical to the lever arm 92 of the sixth embodiment and as illustrated in FIG. 7 is formed on the outer circumferential surface of the steering post 90. The lever arm 92 has a circular aperture 94 defined near the terminal end of the lever arm 92. The lever arm 92 defines a center-line 96 extending from the center of the steering post 90 to the center of the aperture 94. A pin 98, attached to one end of the wire portion 100 of the off-throttle cable 76, is pivotably retained within the aperture 94. The cable bracket and associated hardware of the eighth embodiment is the same as the cable bracket and associated hardware as shown in FIG. 7. The terminal end of the conduit portion 102 of the off-throttle cable 76 is attached to an externally threaded sleeve 104. The sleeve 104 is inserted through an aperture formed in a cable bracket 106. Thread ably attached to the sleeve 104 is a nut 108 having mating internal threads. This externally threaded sleeve and nut arrangement allows for adjustability to the tension of the off-throttle cable 76. The cable bracket 106 is pivotably attached to a solid portion of the watercraft located a given distance from the steering post 90 and aligned with the center-line 96 of the lever arm when the steering post is in the straight-ahead position.

The other end of wire portion 100 of the off-throttle cable 76 is attached to a pin 116 slidably and pivotably mounted in a circumferential slot 120 formed in a throttle control pulley 118 fixably attached to the throttle plate 47. The circumferential slot 120 is positioned such that the pin 116 abuts the clockwise most surface 122 of the circumferential slot when the throttle plate 47 is at the idle position and the steering post is at the straight-ahead position. A torsion spring 124 biases the pin 116 counter-clockwise.

The eighth embodiment functions as follows. Upon the rider pressing down on the throttle lever 34 toward the wide open throttle position, the throttle lever 34 pulls on the throttle cable 44 and rotates the throttle control pulley 48 and the throttle plate 47 from the idle position toward the wide open throttle position. The bias created by the torsion spring 124 causes the pin 116 to slide along the circumferential slot 120 counter-clockwise. Should the rider turn the steering handle 16 and the associated steering post 90 from a straight-ahead position with the throttle lever at a position well above the idle throttle, the lever arm 92 pivots with the steering post 90. Since the aperture of the cable bracket, through which the off-throttle cable 76 is inserted, is aligned with the center-line of the lever arm 92, the pivoting movement of the lever arm 92 pulls on the wire portion of the off-throttle cable. The axially outwardly movement of the wire portion 100 of the off-throttle cable 76 slides the pin 116 clockwise along the circumferential slot 120. Therefore, with the throttle lever 34 at a position well above idle throttle, turning the steering handle 16 will not affect the position of the throttle plate 47.

Should the rider turn the steering handle 16 and the associated steering post 90 from a straight-ahead position with the throttle lever 34 at the idle position, the lever arm 92 pivots with the steering post 90 and pulls on the wire portion 100 of the off-throttle cable 76. Since the pin 116 abuts the counter-clockwise most surface 122 of the slot 120, the axially outwardly movement of the wire portion 100 of the off-throttle cable 76 rotates the throttle control pulley 118 and opens the throttle plate 47 further than if the controlled thrust steering system was not present. Therefore, with the throttle lever 34 at or near idle throttle position, turning the steeling handle 116 will open the throttle plate 47 and increase the thrust for steering the watercraft.

Figure 24:
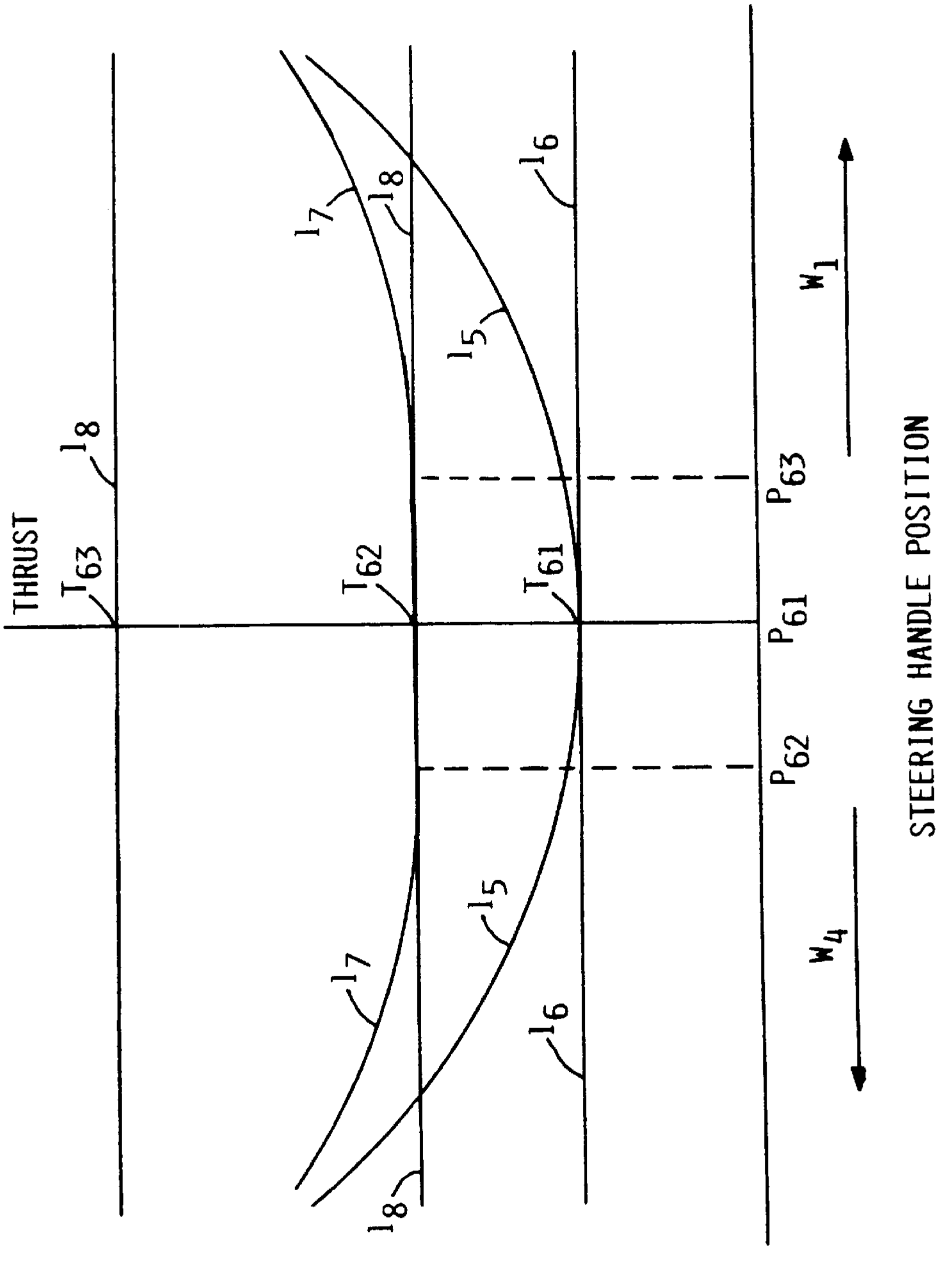
FIG. 24 is a diagram showing the effect of the controlled thrust steering system in accordance to the eighth embodiment.

FIG. 24 diagrams the effect of a controlled thrust steering system as identified in the eighth embodiment. Line $1_5$ represents the effect of spring handle position on thrust with idle thrust $T_{61}$ being exhausted out of the steering nozzle and the controlled thrust steering system present. Upon the rider tuning the steering handle either in the clockwise direction $W_1$ or in the counter-clockwise direction $W_4$, the thrust increases exponentially. This increase in thrust continues as the steering handle is turned further, this providing the rider with adequate steering capability. Line $1_6$ represents the effect of steering handle position on thrust with idle thrust $T_{61}$, being exhausted out of the steering nozzle and without the controlled thrust steering system present. Upon the rider turning the steering handle either in clockwise direction $W_1$ or in the counter-clockwise direction $W_4$, the thrust remains the same.

Line $1_7$ represents the effect of steering handle position on thrust with a thrust $T_{62}$ slightly above idle thrust being exhausted out of the steering nozzle and the controlled thrust steering system present. Upon the rider turning the steering handle either in the clockwise direction $W_1$ or in the counter-clockwise direction $W_4$, the thrust remains constant until the steering handle 16 has been turned sufficiently to steering position $P_{62}$ or $P_{63}$ wherein the pin 116 contacts the counter-clockwise most surface 122 of the circumferential slot. Thereafter, further turning of the steering handle increases the thrust exponentially. Line $1_8$ represents the effect of steering handle position on thrust with a thrust $T_{62}$ slightly above idle thrust being exhausted out of the steering nozzle without the controlled thrust steering system present. Upon the rider turning the steering handle either in the clockwise direction or in the counter-clockwise direction, the thrust remains the same.

Line $1_9$ represents the effect of steering handle position on thrust with a thrust $T_{63}$ well above idle thrust being exhausted out of the steering nozzle regardless of whether the controlled thrust steering system is present. With the controlled thrust system present or not present, upon the rider turning the steering handle either in the clockwise direction $W_1$ or in the counter-clockwise direction $W_4$, the thrust remains the same.

The ninth of the present invention includes a controlled thrust steering system mechanically linking the steering post 90 to the throttle regulator 46. The controlled thrust steering system is attached to the throttle regulator 46 to increase the thrust upon the rider rotating the steering handle 16 from a straight-ahead position, thus providing the rider with adequate steering capability even if the rider releases the throttle lever 34.

Figure 25:
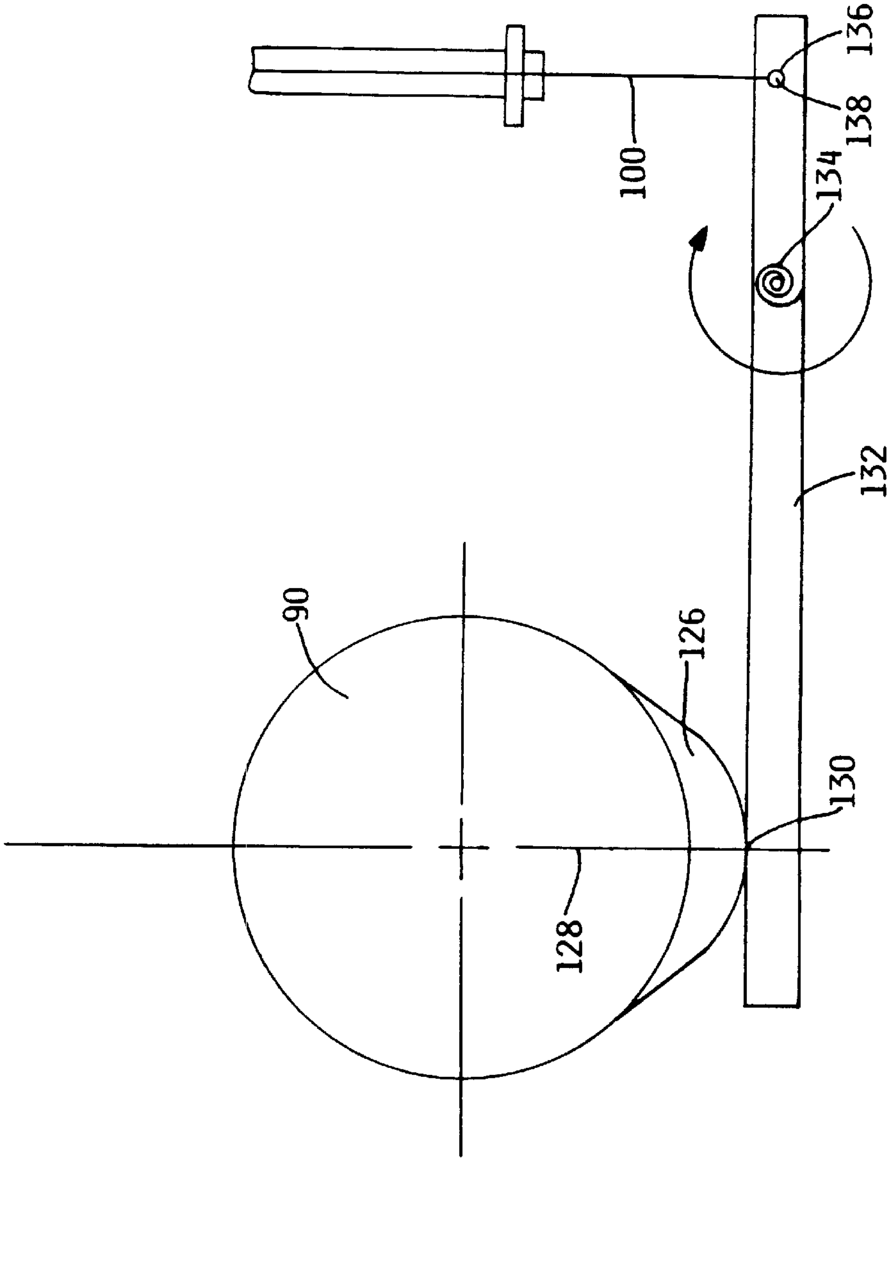
FIG. 25 is a top plan view of a steering post with a cam showing a ninth embodiment of a controlled thrust steering system.

As illustrated in FIG. 25, a symmetrical cam 126 is formed on the outer circumferential surface of the steering post 90. The cam 126 defines a center-line 128 extending from the center of the steering post 90 to the apex 130 of the cam 126. One side of the cam 126 from the center-line 128 is a mirror image of the other side of the cam 126 from the center-line 128. A lever bar 132 is pivotably attached to a solid portion of the watercraft such that the lever bar 132 abuts the apex 130 of the cam when the steeling post 90 is in a straight-ahead position. A torsion spring 134 is located at the axis of pivot of the lever bar 132 biasing the lever toward the cam 126. The spring rate of the torsion spring 134 should be high enough to overcome the bias caused by the throttle return spring 49, but low enough that should be the lever bar 132 disengages from the cam 126, the torsion spring 134 will not break or stretch the off-throttle cable 76. An aperture 136 is formed near the terminal end of the lever bar 132 axially opposite the abutment with the cam 126. A pin 138, attached to one end of the wire portion 100 of an off-throttle cable 76, is pivotably retained within the aperture 94. As illustrated in FIG. 8, the other end of the wire portion of the off-throttle cable is attached to the throttle cable 44.

The ninth embodiment functions as follows. Upon the rider turning the steering handle 16 and the associated steering post 90 from a straight-ahead position, the contact surface between the can 126 and lever bar 132 moves from the apex 130 of the cam 126 to a point on the cam 126 having a smaller radius. As the radius of the contact point of the cam 126 decreases, the bias by the torsion spring 134 causes the lever bar 132 to pivot clockwise toward the center of the steering post 90 and pulls on the wire portion 100 of the off-throttle cable 76 which in turn pulls the throttle cable 44 axially outwardly to open the throttle plate 47 further than if the controlled thrust steering system was not present. The increased opening of the throttle plate 47 increases as the amount of rotation of the steering post 90 from the straight-ahead position is increased. Therefore, with the throttle below the wide-open throttle position, the more the rider turns the string handle 16, the more increase increased thrust is provided for steering the watercraft.

When the throttle lever 34 is at the wide-open throttle position, the throttle plate 47 abuts a stop (not shown) preventing the throttle plate 47 from further rotation. With the throttle plate 47 prevented from further rotation, the throttle cable 44 is also prevented from further axial movement. Therefore, with the throttle plate 47 abutting the stop, any rotational movement by the steering post 90 disengages the cam 126 from the lever bar 132.

Figure 26:
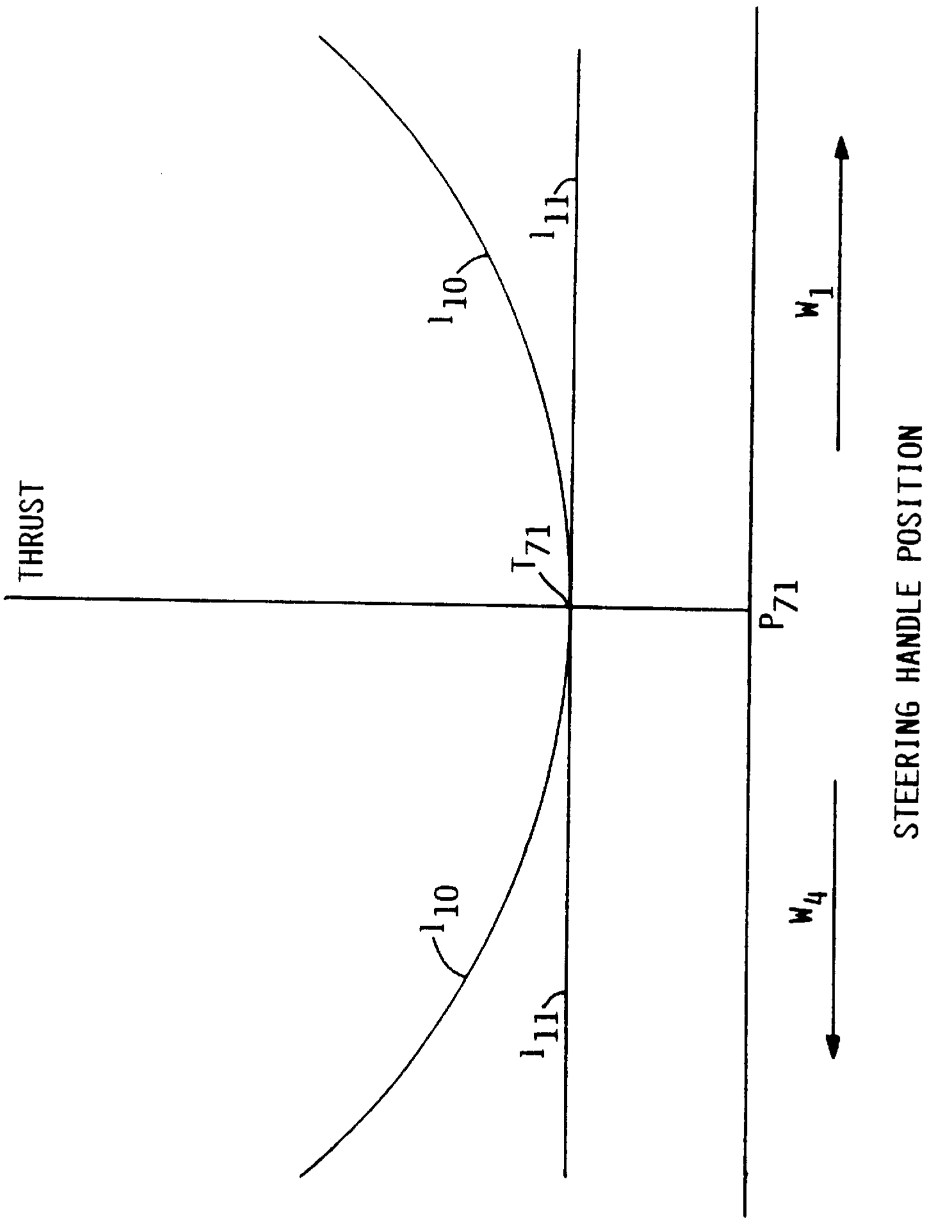
FIG. 26 is a diagram showing the effect of the controlled thrust steering system in accordance to the ninth embodiment.

FIG. 26 diagrams the effect of a controlled thrust steering system in accordance to the ninth embodiment. A thrust $T_{71}$, is exhausted out of the steering nozzle while the steering handle and the associated steering post are in the straight-ahead position $P_{71}$. The thrust $T_{71}$ can be the idle thrust or any thrust above idle thrust but below the thrust exhausted at wide-open throttle. Line $\mathbf{1}_{10}$ represents the effect of steering handle position on thrust with the controlled thrust steering system present. Upon the rider turning the steering handle either in the clockwise direction $W_1$ or in the counter-clockwise direction $W_4$, the thrust increases exponentially. This increase in thrust continues as the steering handle is turned further, thus providing the rider with adequate steering capability. Line $\mathbf{1}_{11}$ represents the effect of steering handle position on thrust without the controlled thrust steering system present. Upon the rider turning the steering handle either in the clockwise direction or in the counter-clockwise direction, the thrust remains the same.

The tenth embodiment of the present invention includes a controlled thrust steering system with inputs provided by the throttle position and the steering position. The controlled thrust steering system is attached to the throttle regulator to increase the time period for the thrust to decrease upon the rider releasing the throttle lever, thus providing the rider with a longer time period of steering capability to steer the watercraft.

The controlled thrust steering system of the tenth embodiment comprises a throttle closed switch 70, a proximity switch 84, a proximity switch triggering mechanism 86, a timer 72, a solenoid 74, a relay contractor 140 and an off-throttle cable 76. The throttle closed switch 70 of the tenth embodiment is identical to the throttle closed switch 70 identified in the fourth embodiment and as illustrated in FIG. 8. The throttle closed switch 70 is located between the back of the throttle lever 34 and the abutment surface 50 upon which the throttle lever abuts when the throttle lever is at the idle position.

Figure 34:
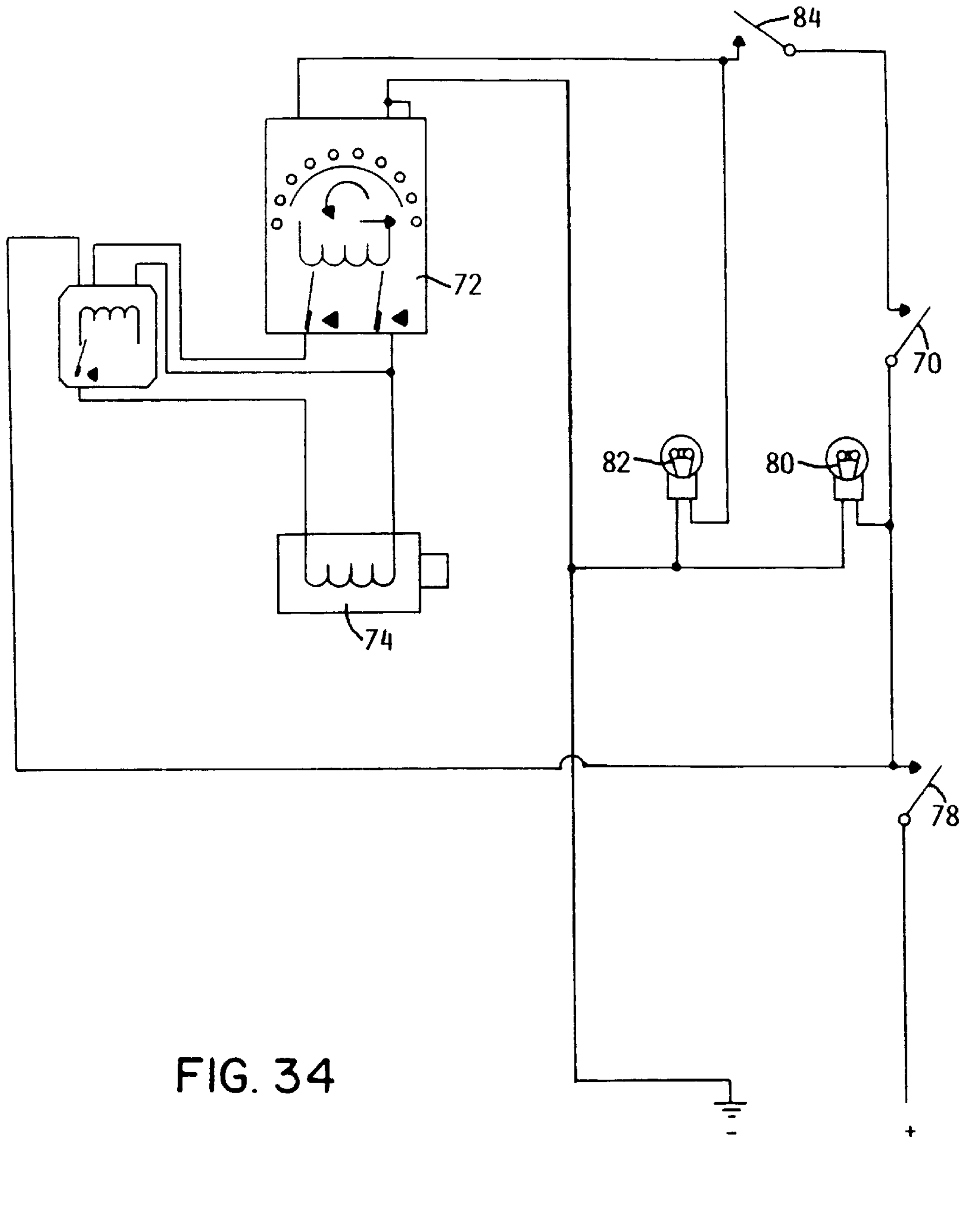
FIG. 34 is a circuit diagram of the tenth embodiment.

As illustrated in circuit diagram FIG. 34, the proximity switch 84 is in series with the throttle closed switch 70. Therefore both the proximity switch 84 and the throttle closed switch 70 must be closed to trigger the timer 72. The proximity switch 84 of the tenth embodiment is identical to the proximity switch identified in the fifth embodiment and as illustrated in FIGS. 12 and 13. The proximity switch 84 is mounted on a bracket located near a steering post 90 of the watercraft. Two magnets 86 and 87 acting as proximity triggering mechanism are mounted on the steering post 90. The magnets 86 and 87 are mounted on the steering post 90 such that the proximity switch 84 is located at the circumferential center of the two magnets 86 and 87 when the position of the steering post 90 causes the watercraft to travel in a straight direction. In another word, when the watercraft is traveling in a straight direction the angle $W_{10}$ between the proximity switch 84 with one of the magnets 86 is approximately equal to the angle $W_{11}$ between the proximity switch 84 with the other magnet 87. The proximity switch 84 has a circuit which defaults to the open position. Once the proximity switch 84 is at a given trigger angular position $P_1$ or $P_2$, the proximity switch is sufficiently close to one of the magnets 86 and 87 to close the proximity switch. Thus after the back of the throttle lever 34 contacts the throttle closed switch 70 and the proximity switch 84 surpasses the trigger position $P_1$ or $P_2$, the tuner 72 located in the hull 12 of the watercraft is triggered to route the current from the battery to the solenoid 74 for a given amount of time. The solenoid 74 is connected to the throttle regulator 142. The throttle regulator 142 can be a carburetor for a carbureted internal combustion engine or a throttle body for a fuel injected internal combustion engine.

Figure 27:
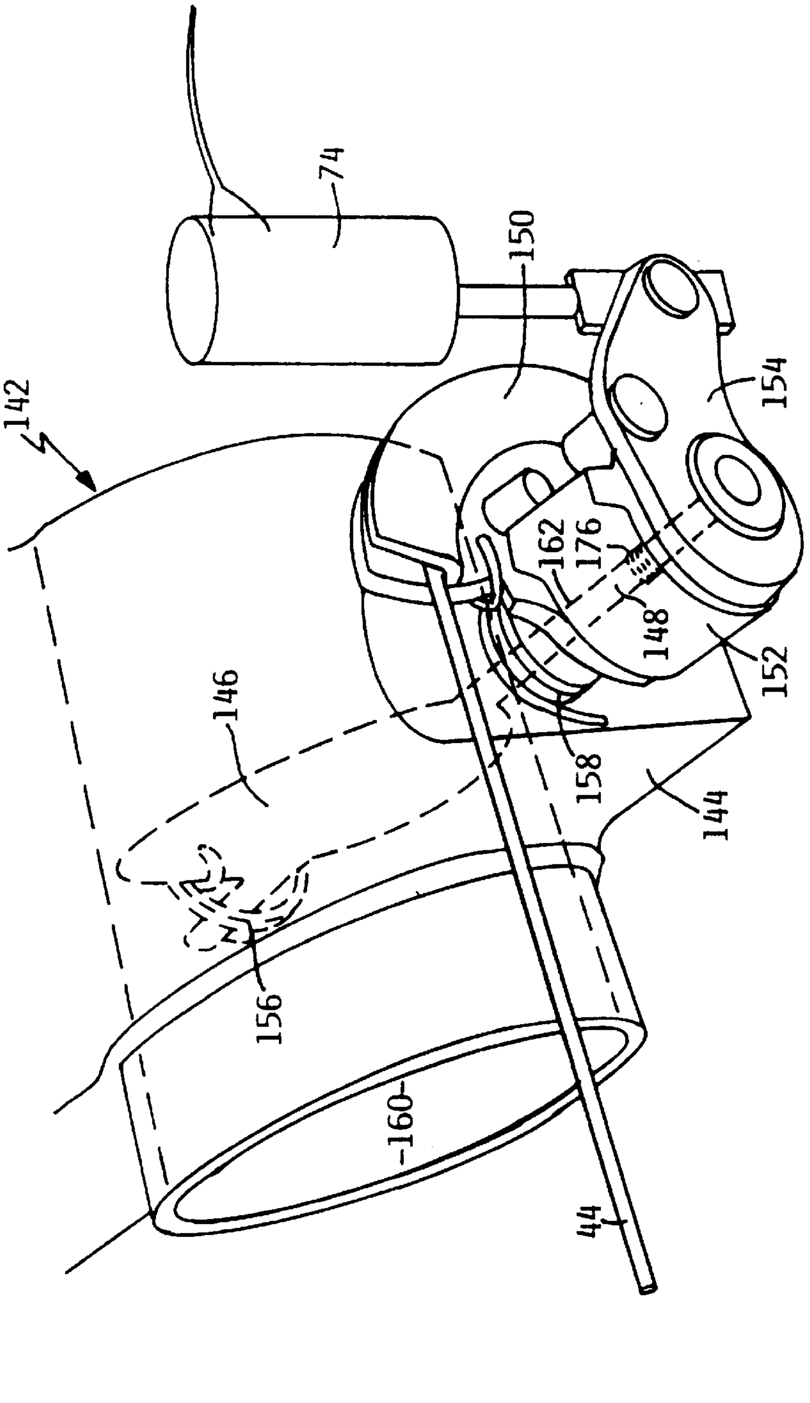
FIG. 27 is a perspective view of a throttle regulator of a tenth embodiment of a controlled thrust steering system.

The throttle regulator 142 of the tenth embodiment is illustrated in detail in FIG. 27. The throttle regulator 142 comprises a throttle housing 144, a throttle plate 146, a throttle shaft 148, a throttle control pulley 150, a throttle sleeve 152, an off-throttle lever 154, a throttle pulley return spring 156 and a throttle plate return spring 158. The throttle housing 144 has an intake opening 160 extending through the housing 144 and a bore 162 extending from the intake opening 160 and perpendicular to the intake opening 160. The throttle plate 146 is situated in the intake opening 160 of the throttle housing 144 and is fixed to the throttle shaft 148 such that the throttle plate 146 rotates with the throttle shaft 148. The throttle plate return spring 158 is attached to the throttle plate 146 biasing the throttle plate 146 toward the idle position. The other end of the throttle shaft 148 extends through the bore 162 of the throttle housing.

Figure 28:
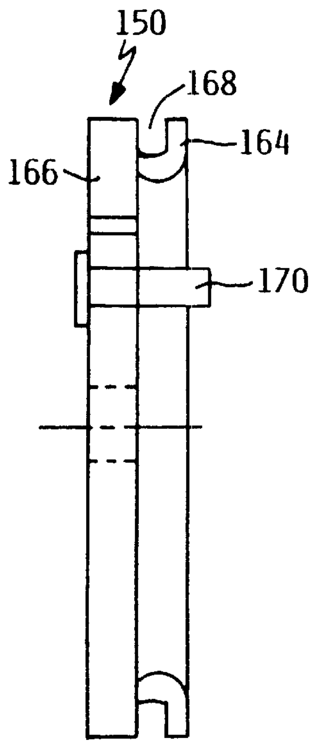
FIG. 28 is a side view of the throttle pulley of FIG. 27.
Figure 29:
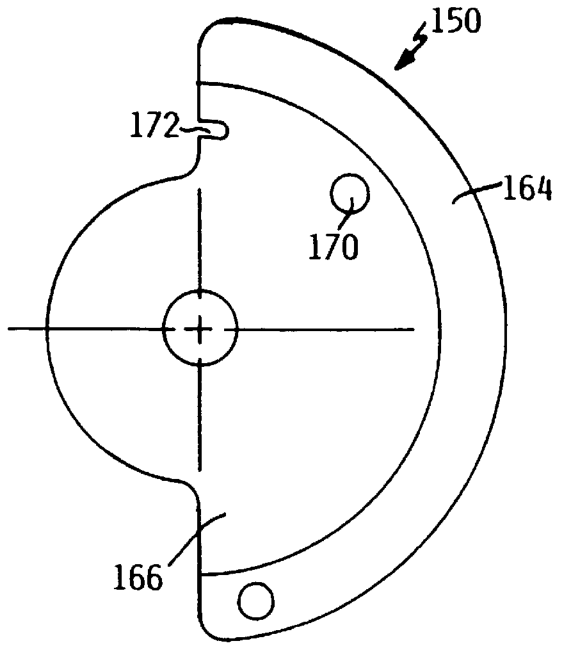
FIG. 29 is a front view of the throttle pulley of FIG. 27.

Axially outwardly of the throttle housing 144 is the throttle control pulley 150 pivotably attached to the throttle shaft 148 allowing the throttle control pulley 150 to rotate independently from the throttle shaft 148. As shown in detail in FIGS. 28 and 29, the throttle control pulley 150 comprises a circumferential band 164 attached to one side of a main body portion 166. A groove 168 is defined between the circumferential band 164 and the main body portion 166. The throttle cable 44 is retained within the groove 168. Radially inwardly of the circumferential band is a throttle pulley pin 170 extending axially outwardly from one side of the main body portion 166. A spring retention notch 172 is formed on one edge of the main body portion 166 to retain the throttle pulley return spring 156 to the throttle control pulley 150. The throttle pulley return spring 156 is positioned between the throttle housing 144 and the throttle control pulley 150. The throttle pulley return spring 156 biases the throttle control pulley 150 toward the idle position.

Figure 30:
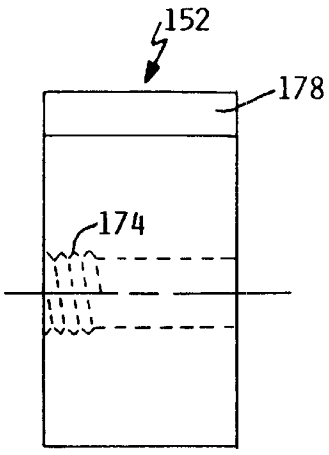
FIG. 30 is a side view of the throttle sleeve of FIG. 27.
Figure 31:
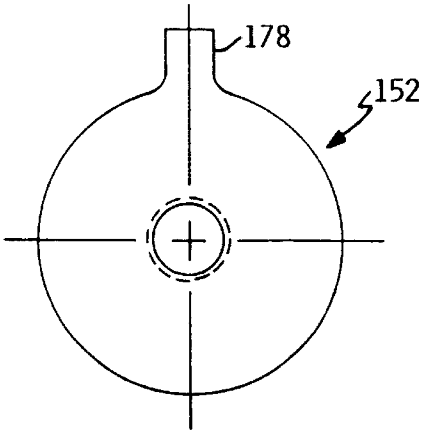
FIG. 31 is a front view of the throttle sleeve of FIG. 27.

Axially outwardly of the throttle control pulley 150 is the throttle sleeve 152 fixed to throttle shaft 148 such that the throttle shaft 148 rotates with the throttle sleeve 152. The throttle sleeve 152 is fixed onto the throttle shaft 148 by mean of a threaded surface 174 formed on a portion of a bore extending through the center of the throttle sleeve 152 as illustrated in detail in FIGS. 30 and 31. A mating threaded surface 176 is formed on the throttle shaft 148. An axially extending bar 178 protrudes from the circumferential outer surface of the throttle sleeve 152.

Figure 32:
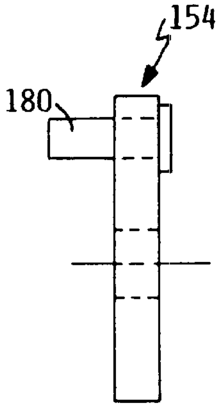
FIG. 32 is a side view of the off-throttle lever of FIG. 27.
Figure 33:
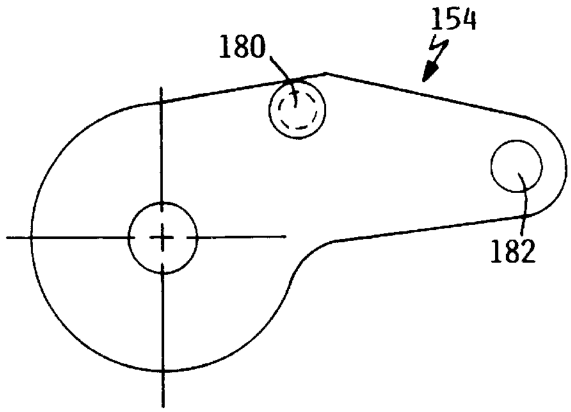
FIG. 33 is a front view of the off-throttle lever of FIG. 27.

Axially outwardly of the throttle sleeve 152 is the off-throttle lever 154 pivotably mounted to the throttle shaft 148 allowing the off-throttle lever 152 to rotate independently from the throttle shaft 148. As illustrated in detail in FIGS. 32 and 33, the off-throttle lever 154 has an off-throttle pin 180 extending axially inwardly from one surface of the off-throttle lever 154. An aperture 182 is formed near the terminal end of the off-throttle lever 154 for connection with the solenoid 74.

FIG. 34 is a circuit diagram of the tenth embodiment. The tenth embodiment functions as follows. Upon the rider releasing the throttle lever 34, the bias by the throttle pulley return spring 156 causes the throttle lever 34 to pivot toward the idle position until the back of the throttle lever 34 contacts the throttle closed switch 70. Once the back of the throttle lever 34 contacts the throttle closed switch 70, further bias by the throttle pulley return spring 156 causes the previously open circuit within the throttle closed switch 70 to close.

Likewise, upon the rider turning the steering handle 16 and the associated steering post 90 to surpasses the trigger position $P_1$ or $P_2$, the previously open circuit within the proximity switch closes.

Once both the throttle closed switch 70 closes and the proximity switch 84 closes, the timer 72 is triggered. It should be noted that the timer 72 of the tenth embodiment is triggered only after both the throttle closed switch 70 and the proximity switch 84 are closed. Therefore, should the throttle closed switch 70 closes without the proximity switch 84 closed, the timer 72 is not triggered. Hence, the timer 72 is not triggered if the rider releases the throttle lever 34 without turning the steeling handle 16 a sufficient amount.

Upon the timer 72 being triggered, the timer 72 triggers the relay contractor 140 to route the current from the battery of the watercraft to the solenoid 74 to activate the solenoid 74 for a given amount of time. Therefore, unlike the circuit for the fifth embodiment in which the current to activate the solenoid 74 passes through the throttle closed switch 70 and the proximity switch 84, the circuit of the tenth embodiment activates the solenoid 74 with the current directly from the battery. The given amount of time should provide the rider with sufficient time to steer the watercraft clear of the obstacle without over-steering the watercraft. The optimal given amount of time is between 0.5 to 3.0 seconds.

Thereafter, the solenoid 74 pulls on the off-throttle lever 154. The off-throttle pin 80 abuts the bar 178 of the throttle sleeve and rotates the throttle sleeve 152 and the throttle plate 146 toward the wide open position. Without the solenoid 74 in place or activated, upon the rider releasing the throttle lever 34, the bias by the throttle plate return spring 158 causes the throttle plate 146 to pivot toward the idle position. With the solenoid 74 activated, upon the rider releasing the throttle lever 34, the solenoid 74 pulls on off-throttle lever 154 and retains the throttle plate 146 at a steerable thrust position.

The solenoid 74 is activated for a given amount of time; thereafter, the timer 72 deactivates the solenoid 74. Once the solenoid 74 is deactivated, the solenoid pushes on the off-throttle lever 154 allowing the throttle plate 146 to pivot toward the idle position.

As further diagramed in FIG. 34, These additional features include a power on/off switch 78, a power on indicator light 80 and a controlled thrust indicator light 82. These additional features are provided for the convenience of the rider and are not necessary for the function of the controlled thrust steering system. The power on/off switch 78 can be provided to allow the rider to switch the controlled thrust steering system on or off. The power on indicator light 80 can be provided to indicate to the rider that the controlled thrust steering system has been turned on. The controlled thrust indicator light 82 can be provided to indicate to the rider that the controlled thrust steering system has been activated.

The sequence of the throttle closed switch 70 closing and the proximity switch 84 closing can occur in a variety of manners. One possible sequence is for the rider to first turn the steering handle 16 a sufficient amount to close the proximity switch 84. The rider then releases the throttle lever 34 to close the throttle closed switch 70. In such a sequence, the timer 72 is triggered as soon as the back of throttle lever 34 contacts and closes the throttle closed switch 70. The thrust decreases as soon as the rider releases the throttle lever 34 since only the proximity switch 84 is closed at this point. As soon as the back of the throttle lever 34 contacts the throttle closed switch 70, both the proximity switch 84 and the throttle closed switch 70 are closed. Thereafter, the timer 72 is triggered causing the thrust to remain approximately constant at the steerable thrust for a given amount of time before continuing to decrease toward idle.

Figure 35:
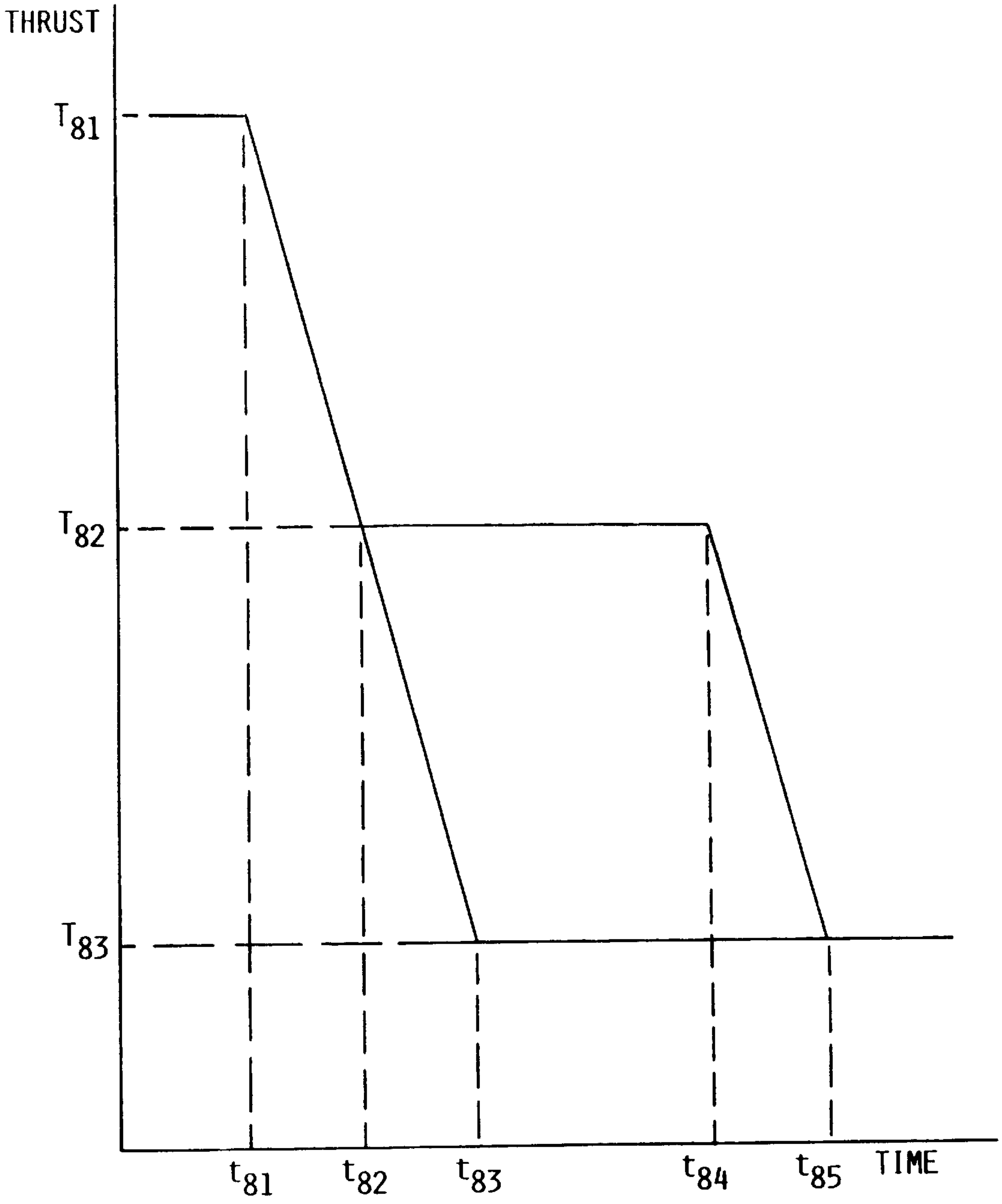
FIG. 35 is a diagram showing the effect of the controlled thrust steering system in accordance to the tenth embodiment should the rider turn the steering handle a sufficient amount prior to releasing the throttle lever.

FIG. 35 diagrams the effect of a controlled thrust steering system in accordance to the tenth embodiment should the rider turn the steering handle 16 a sufficient amount prior to releasing the throttle lever 34. Upon the rider releasing the throttle lever 34 with the thrust $T_{81}$ out of the steering nozzle, the thrust quickly drops from $T_{81}$ to a steerable thrust $T_{82}$ during a time period from $t_{81}$ to $t_{82}$. If the controlled thrust steering system was not present, the thrust will continue to drop from steerable thrust $T_{82}$ to idle thrust $T_{83}$ during a time period from $t_{82}$ to $t_{83}$. Since only idle thrust $T_{83}$ of water is exhausted out the steering nozzle, very little steering capability is provided to the rider at this thrust level. With the controlled thrust steering system in place, the thrust remains approximately constant at the steerable thrust $T_{82}$ during a given time period from $t_{82}$ to $t_{84}$.

Thereafter, the thrust will drop from $T_{82}$ to idle thrust $T_{83}$ during a period from $t_{84}$ to $t_{85}$. Therefore, the controlled thrust steering system provides the rider with a steering capability for an additional time of $(t_{84}-t_{83})$. This additional time $(t_{84}-t_{83})$ may provide the rider with the necessary time having adequate steering capability to steer around an obstacle directly in front of the watercraft.

Another possible sequence is for the rider to first release the throttle lever 34 to close the throttle closed switch 70. The rider the turns the steering handle 16 a sufficient amount to close the proximity switch 84. In such a sequence, the timer 72 is triggered only after the steering handle 16 is turned a sufficient amount thus closing the proximity switch 84. The thrust decreases and continues to decrease as soon as the rider releases the throttle lever 34 since only the throttle closed switch 70 is closed at this point. After the rider turns the steering handle 16 a sufficient amount, both the proximity switch 84 and the throttle closed switch 70 are closed. If the thrust drops below the steerable thrust at the time both the proximity switch 84 and the throttle closed switch 70 close, the timer 72 is triggered causing the solenoid 74 to pull on the off-throttle lever 154 and increase the thrust to the steerable thrust. Thereafter the thrust remains approximately constant for a given amount of time before continuing to decrease toward idle. If the thrust is above the steerable thrust at the time both the proximity switch 84 and the throttle closed switch 70 close, the effect would be identical to the sequence when the rider turns the steering handle 16 prior to releasing the throttle lever 34.

Figure 36:
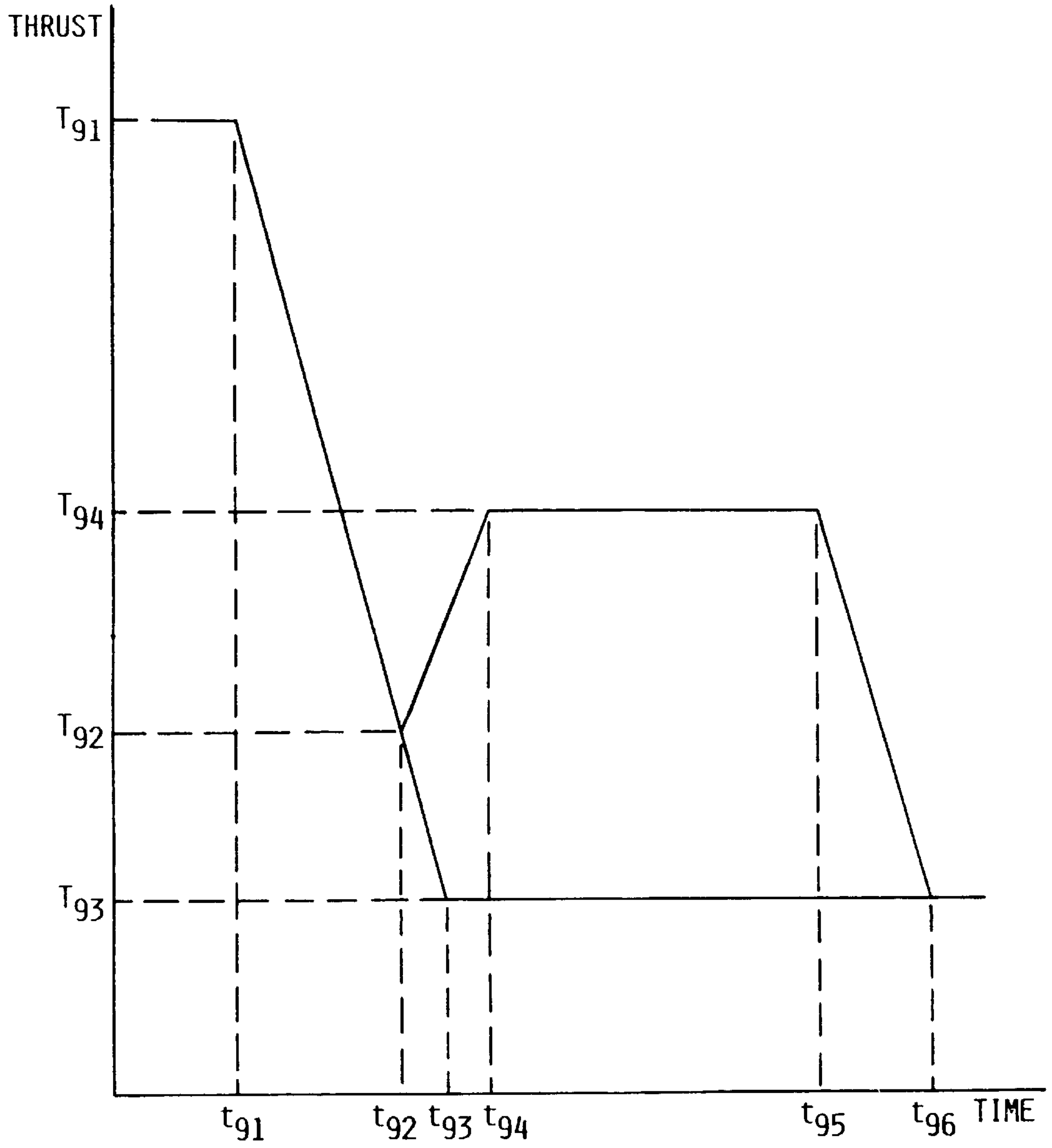
FIG. 36 is a diagram showing the effect of the controlled thrust steering system in accordance to the tenth embodiment should the rider release the throttle lever prior to turning steering handle a sufficient amount and the thrust dropped below the steerable thrust.

FIG. 36 diagrams the effect of a controlled thrust steering system in accordance to the tenth embodiment should the rider release the throttle lever 34 prior to turning the steering handle 16 a sufficient amount and the thrust dropped below the steerable thrust. Upon the rider releasing the throttle lever with the thrust $T_{91}$ out of the steering nozzle, the thrust quickly drops from $T_{91}$ to a steerable thrust $T_{92}$ during a time period from $t_{91}$ to $t_{92}$. If the controlled thrust steering system was not present, the thrust will continue to drop from $T_{92}$ to idle thrust $T_{93}$ during a time period from $t_{92}$ to $t_{93}$. Since only idle thrust $T_{93}$ of water is exhausted out the steering nozzle, very little steering capability is provided to the rider at this thrust level. With the controlled thrust steering system in place, the thrust increases from thrust $T_{92}$ to thrust $T_{94}$ during a time period from $t_{92}$ to $t_{94}$ and remains approximately constant at $T_{92}$ during a given time period from $t_{94}$ to $t_{95}$. For the purpose of this application, the thrust remaining approximately constant is defined as the thrust not decreasing as quickly if the controlled thrust steering system was not in place. Thereafter, the thrust will drop from $T_{94}$ to idle thrust $T_{93}$ during a period from $t_{95}$ to $t_{96}$. Therefore, the controlled thrust steering system provides the rider with a steering capability for an additional time of ($t_{96}$–$t_{93}$). This additional time ($t_{96}$–$t_{93}$) may provide the rider with the necessary tie having adequate steering capability to steer around an obstacle directly in front of the watercraft.

A third possible sequence is for the rider to release the throttle lever 34 for a long period of time, such that the thrust out of the steering nozzle is at idle thrust. Thereafter, the rider turns the steering handle 16 a sufficient amount to close the proximity switch 70. Such a sequence may occur when the rider is attempting to dock the watercraft. As discussed earlier in "the field of the invention" section, the docking procedure usually occurs with the watercraft traveling at a low speed; therefore, the rider may release the throttle lever while attempting to dock the watercraft. Without a controlled thrust steering system, only idle thrust is provided to steer the watercraft.

The controlled thrust steering system in accordance to the tenth embodiment provides the rider with adequate steering capability after the rider has released the throttle lever for a long period time, such that the thrust out of the steering nozzle prior to the rider turning the steering handle is at idle thrust. In such a sequence, the timer 72 is triggered after the steering handle 16 is turned a sufficient amount, thus closing the proximity switch 84. Since the throttle closed switch 70 is already closed, after the rider turns the steering handle 16 a sufficient amount, both the proximity switch 84 and the throttle closed switch 70 are closed. Thereafter, the timer 72 is triggered causing the solenoid 74 to pull on the off-throttle lever 154 and increase the thrust to the steerable thrust. The thrust remains approximately constant at the steerable thrust for a given amount of time before decreasing toward the idle thrust. This increase in thrust to the steerable thrust for a given amount of time allows the rider to have adequate steering even after the rider has released the throttle lever for a long period of time.

Figure 37:
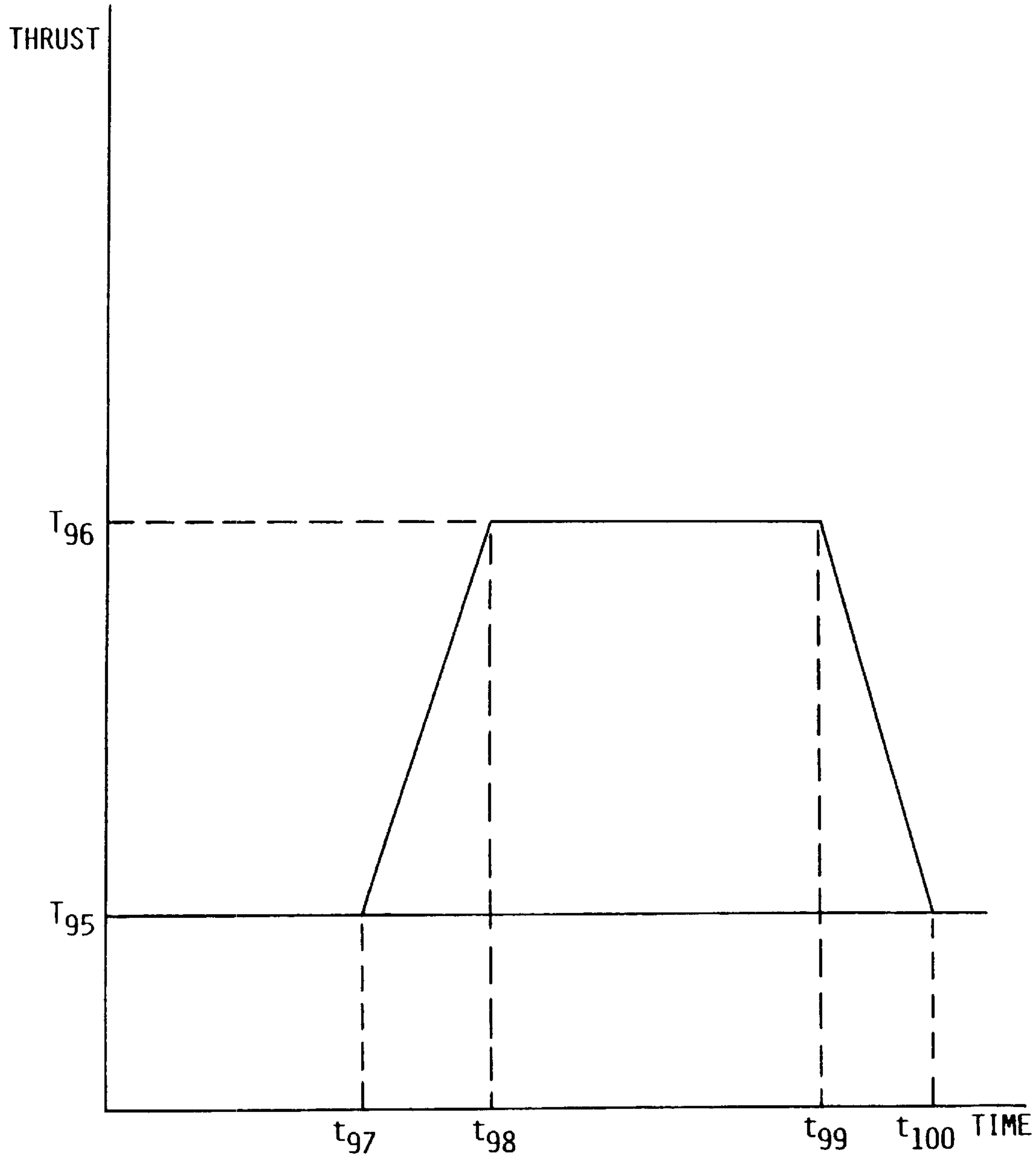
FIG. 37 is a diagram showing the effect of the controlled thrust steering system in accordance to the tenth embodiment should the rider release the throttle lever for a long period of time, such that the thrust out of the steering nozzle is at idle thrust, and thereafter turn the steering handle a sufficient amount

FIG. 37 diagrams the effect of a controlled thrust steering system in accordance to the tenth embodiment should the rider release the throttle lever 34 for a long period of time, such that the thrust out of the steering nozzle is at the idle thrust $T_{95}$. Thereafter, the rider turns the steering handle 16 a sufficient amount. If the controlled thrust steering was not present, upon the rider turning the steering handle 16, the thrust will continue at the idle thrust $T_{95}$. Since only the idle thrust of water is exhausted out of the steering nozzle, very little steering capability is provided to the rider at this thrust level. With the controlled thrust steering system in place, the thrust increases from the idle thrust $T_{95}$ to a steerable thrust $T_{96}$ during a time period from $t_{97}$ to $t_{98}$ and remains approximately constant at the steerable thrust $T_{96}$ during a given time period from $t_{98}$ to $t_{99}$. Thereafter, the thrust drops from the steerable thrust $T_{96}$ to the idle thrust $T_{95}$ during a time period from $t_{99}$ to $t_{100}$. Therefore, the controlled thrust steering system provides the rider with adequate steering capability for at least a time period of ($t_{98}$–$t_{99}$) to maneuver the watercraft for docking.

The tenth embodiment discloses the throttle closed switch closing upon the throttle lever at a position upon steerable thrust is exhausted out the steering nozzle. Hence, the tenth embodiment discloses the thrust corresponding to the throttle closed switch closing is the same as the thrust at which the thrust remains constant for a given amount of time. It should be noted that the thrusts being the same is for illustrative purpose only. According the present invention, the thrust corresponding to the throttle closed switch closing can be different from the thrust at which the thrust at which the thrust remains constant for a given amount. For instance, to compensate for the time delay between the when the throttle closed switch closes and when the thrust remains constant at the steerable thrust, it may be desirable to have thrust corresponding to the throttle closed switch to be higher than the thrust at which the thrust remains constant.

The eleventh embodiment includes a controlled thrust string system mechanically linking the steering post 90 to the throttle regulator 46. The controlled thrust steering system is attached to the throttle regulator 46 to increase the thrust upon the rider rotating the steering handle 16 sufficiently from a straight-ahead position, thus providing the rider with adequate steering capability even if the rider releases the throttle lever 34.

Figure 38:
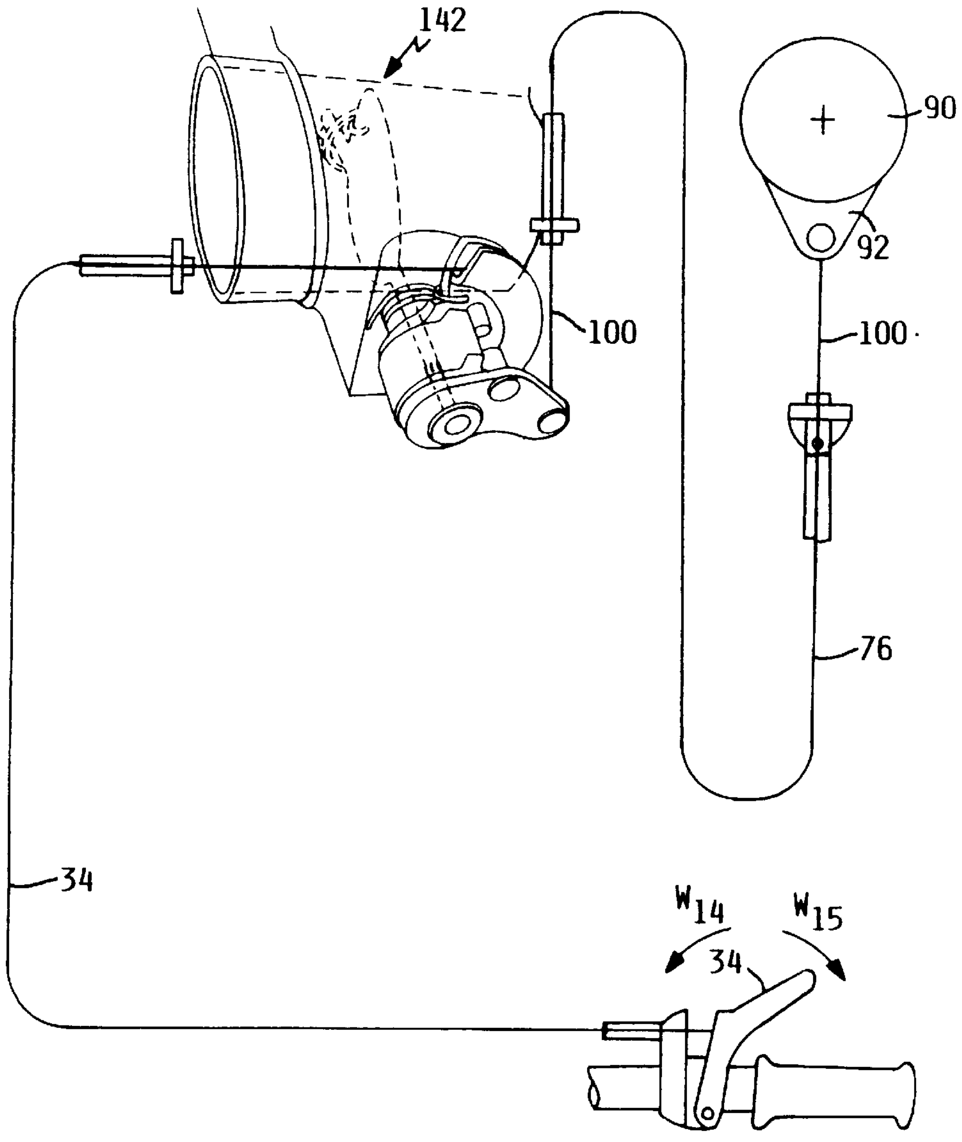
FIG. 38 is a schematic of the mechanical connection between a steering post, a throttle lever and a throttle regulator showing an eleventh embodiment of a controlled thrust steering system.

As illustrated in FIG. 38, a lever arm 92 identical to the lever arm 92 of the sixth embodiment is formed on the outer circumferential surface of the steering post 90. The lever arm 92 has a circular aperture 94 defined near the terminal end of the lever arm 92. The lever arm 92 defines a center-line 96 extending from the center of the steering post 90 to the center of the aperture 94. A pin 98, attached to one end of the wire portion 100 of the off-throttle cable 76, is pivotably retained within the aperture 94. The cable bracket and associated hardware of the eleventh embodiment are the same as the cable bracket and associated hardware as shown in FIG. 7. The terminal end of the conduit portion 102 of the off-throttle cable 76 is attached to an externally threaded sleeve 104. The sleeve 104 is inserted through an aperture formed in a cable bracket 106. Thread ably attached to the sleeve 104 is a nut 108 having mating internal threads. This externally threaded sleeve and nut arrangement allows for adjustability to the tension of the off-throttle cable 76. The cable bracket 106 is pivotably attached to a solid portion of the watercraft located a given distance from the steering post 90 and aligned with the center-line 96 of the lever arm when the steering post is in the straight-ahead position.

The other end of the off-throttle cable 76 is connected to the throttle regulator 142. The throttle regulator 142 can be a carburetor for a carbureted internal combustion engine or a throttle body for a fuel injected internal combustion engine.

The throttle regulator 142 of the eleventh embodiment is identical to the throttle regulator 142 of the teeth embodiment and as illustrated in detail in FIG. 27 with the exception of the off-throttle cable 72 connected to the throttle regulator rather than a solenoid connected to the throttle regular. The throttle regulator 142 comprises a throttle housing 144, a throttle plate 146, a throttle shaft 148, a throttle control pulley 150, a throttle sleeve 152, an off-throttle lever 154, a throttle pulley return spring 156 and a throttle plate return spring 158. The throttle housing 144 has an intake opening 160 extending through the housing 144 and a bore 162 extending from the intake opening 160 and perpendicular to the intake opening 160. The throttle plate 146 is situated in the intake opening 160 of the throttle housing 144 and is fixed to the throttle shaft 148 such that the throttle plate 146 rotates with the throttle shaft 148. The throttle plate return spring 158 is attached to the throttle plate 146 biasing the throttle plate 146 toward the idle position. The other end of the throttle shaft 148 extends through the bore 162 of the throttle housing. Axially outwardly of the throttle housing 144 is the throttle control pulley 150 pivotably mounted to the throttle shaft 148 allowing the throttle control pulley 150 to rotate independently from the throttle shaft 148. The throttle control pulley 150 comprises a groove 168 to retain the throttle cable 44, a throttle pulley pin 170 extending axially outwardly and a spring retention notch 172 to retain the throttle pulley return spring 156 to the throttle control pulley 150. The throttle pulley return spring 156 is positioned between the throttle housing 144 and the throttle control pulley 150. The throttle pulley return spring 156 biases the throttle control pulley 150 toward the idle position.

Axially outwardly of the throttle control pulley 150 is the throttle sleeve 152 fixed to throttle shaft 148 such that the throttle shaft 148 pivots with the throttle sleeve 152. An axially extending bar 178 protrudes from the circumferential outer surface of the throttle sleeve 152. Axially outwardly of the throttle sleeve 152 is the off-throttle lever 154 pivotably mounted to the throttle shaft 148 allowing the off-throttle lever 154 to rotate independently from the throttle shaft 148. The off-throttle lever 154 has an off-throttle pin 180 extending axially inwardly from one surface of the off-throttle lever 154. An aperture 182 is formed near the terminal end of the off-throttle lever 182 for connection with the off-throttle cable 76.

The eleventh embodiment functions as follows. Upon the rider pressing down on the throttle lever 34 toward the wide open throttle position $W_{15}$, the throttle lever 34 pulls on the throttle cable 44 and rotates the throttle control pulley 48 clockwise. The throttle pulley pin 170 of the throttle control pulley 150 abuts and rotates the bar 178 of the throttle sleeve 152 clockwise. Since the throttle sleeve 152 is fixably attached to throttle shaft 148, the throttle shaft 148 and throttle plate 146 likewise rotates clockwise from the idle position toward the wide open throttle position. Should the rider turn the steering handle 16 and the associated steering post 90 from a straight-ahead position with the throttle lever at a position well above the idle throttle, the lever arm 92 pivots with the steering post 90. Since the aperture of the cable bracket, through which the off-throttle cable 76 is inserted, is aligned with the center-line of the lever arm 92, the pivoting movement of the lever arm 92 pulls on the wire portion of the off-throttle cable. The axially outwardly movement of the wire portion 100 of the off-throttle cable 76 pulls the off-throttle lever clockwise. Should the bar of the throttle sleeve be rotated more than the rotation of the off-throttle lever, the rotation of the off-throttle lever will not affect the rotational position of the throttle sleeve. Therefore, with the throttle lever 34 at a position well above idle throttle, turning the steering handle 16 will not affect the position of the throttle plate 47.

Should the rider turn the steering handle 16 and the associated steering post 90 from a straight-ahead position with the throttle lever 34 at the idle position, the lever arm 92 pivots with the steering post 90 and pulls on the wire portion 100 of the off-throttle cable 76. The off-throttle cable pulls on the off-throttle lever and rotates the off-throttle lever clockwise. The off-throttle pin of the off-throttle lever abuts and rotates the bar of the throttle sleeve clockwise. Since the throttle sleeve is fixably attached to throttle bar, the throttle bar and throttle plate likewise rotates clockwise from the idle position toward the wide open throttle position. Therefore, with the throttle lever 34 at or near idle throttle position, turning the steering handle 116 will open the throttle plate 47 and increase the thrust for steering the watercraft.

Figure 39:
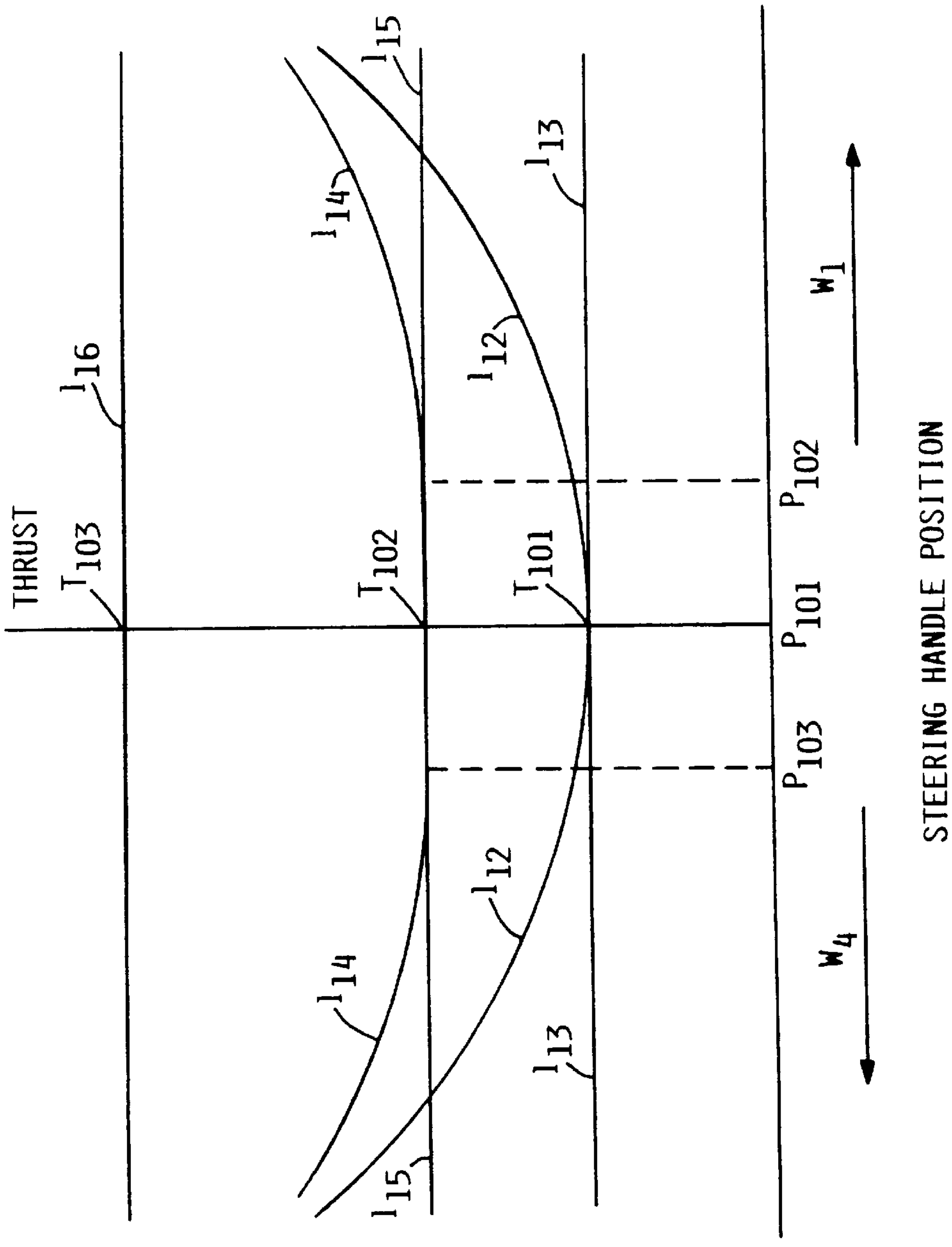
FIG. 39 is a diagram showing the effect of the controlled thrust steering system in accordance to the eleventh embodiment.

FIG. 39 diagrams the effect of a controlled thrust steering system in accordance to the eleventh embodiment. Line $\mathbf{1}_{12}$ represents the effect of steering handle position on thrust with idle thrust $T_{101}$ being exhausted out of the steering nozzle and the controlled thrust steering system present. Upon the rider turning the steering handle either in the clockwise direction $W_1$ or in the counter-clockwise direction $W_4$, the thrust increases exponentially. This increase in thrust continues as the steering handle is turned further, this providing the rider with adequate steering capability. Line $\mathbf{1}_{13}$ represents the effect of steering handle position on thrust with idle thrust $T_{102}$ being exhausted out of the steering nozzle and without the controlled thrust steering system present. Upon the rider turning the steering handle either in clockwise direction $W_1$ or in the counter-clockwise direction $W_4$, the thrust remains the same.

Line $\mathbf{1}_{14}$ represents the effect of steering handle position on thrust with a thrust $T_{102}$ slightly above idle thrust being exhausted out of the steering nozzle and the controlled thrust steering system present. Upon the rider turing the steering handle either in the clockwise direction $W_1$ or in the counter-clockwise direction $W_4$, the thrust remains constant until the steering handle 16 has been turned sufficiently to steering position $P_{102}$ or $P_{103}$ wherein the pin 116 contacts the counter-clockwise most surface 122 of the circumferential slot. Thereafter, further turning of the steering handle increases the thrust exponentially. Line $\mathbf{1}_{15}$ represents the effect of steering handle position on thrust with a thrust $T_{102}$ slightly above idle thrust being exhausted out of the steering nozzle without the controlled thrust steering system present. Upon the rider turning the steering handle either in the clockwise direction or in the counter-clockwise direction, the thrust remains the same.

Line $\mathbf{1}_{16}$ represents the effect of steering handle position on thrust with a thrust $T_{103}$ well above idle thrust being exhausted out of the steering nozzle regardless of whether the controlled thrust steering system is present. With the controlled thrust system present or not present, upon the rider turning the steering handle either in the clockwise direction $W_1$ or in the counter-clockwise direction $W_4$, the thrust remains the same.

The twelfth embodiment of the present invention is similar to the controlled thrust steering system of the tenth embodiment with the exception of the timer having a straight-ahead steering over-ride feature.

The controlled thrust steering system of the twelfth embodiment comprises a throttle closed switch 70, a proximity switch 84, a proximity triggering mechanism 86, a timer 72*a*, a solenoid and a relay contractor 140. The throttle closed switch 70 of the twelfth embodiment is identical to the throttle closed switch identified in the tenth embodiment and as illustrated in FIG. 8. The proximity switch 84 and the proximity switch triggering mechanism 86 are identical to the proximity switch and proximity switch mechanism as identified in the tenth embodiment and as illustrated in FIGS. 12 and 13.

Figure 40:
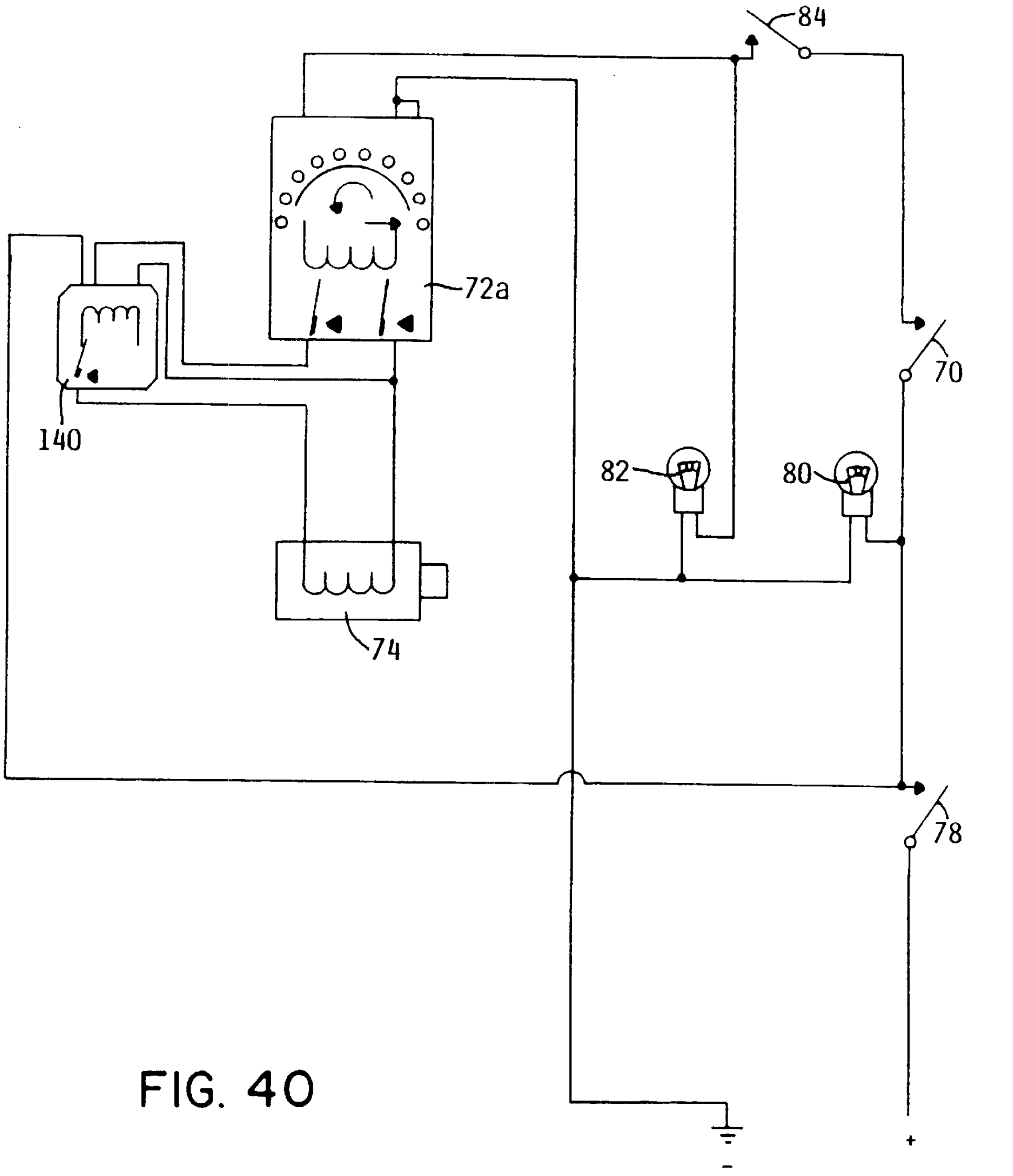
FIG. 40 is a circuit diagram of a twelfth embodiment.

As illustrated in circuit diagram FIG. 40, the proximity switch 84 is in series with the throttle closed switch 70. Therefore, both the proximity switch 84 and the throttle closed switch 70 must be closed to activate the timer 72*a*. The timer of the twelfth embodiment is activated to trigger the relay contractor 140 to route the current from the battery to the solenoid 74 for a given amount of time upon the back of the throttle lever contacting the throttle closed switch to close the throttle closed switch 70 and the proximity switch surpassing the trigger position $P_1$ or $P_2$ to close the proximity switch 84. Once the timer 72*a* is activated, the timer 72*a* triggers the relay contractor 140 to route the current from the battery to the solenoid 74 for a given amount of time as long as the proximity switch 84 remains closed by being at a position that continues to surpass the trigger position $P_1$ or $P_2$. The given amount of time should provide the rider with sufficient time to steer the watercraft without over-steering the watercraft. The optimal given amount of time is between 0.5 to 3.0 seconds. The solenoid 74 is connected to the throttle regulator 142. The throttle regulator 142 of the twelfth embodiment is identical to the throttle regulator of tenth embodiment as illustrated in FIGS. 27–33.

The timer 72*a* of the twelfth embodiment also has a straight-ahead steering over-ride feature which disconnects the current from the battery to the solenoid should the rider turn the steering handle 16 toward the straight-ahead position such that proximity switch 84 opens by being at a position which no longer surpasses the trigger position $P_1$ or $P_2$. Upon the rider turning the steering handle 16 a sufficient amount to close the proximity switch 84, thus routing the current from the battery to the solenoid 74 for a given amount of time, and thereafter turns the steering handle 16 toward the straight-ahead position to open the proximity switch 84 before the given amount of time set for the timer 72*a* has expired, the straight-ahead steering feature of the timer 72*a* causes the relay contractor 140 to disconnect the current from the battery to the solenoid prior the entire given amount of time set for the timer 72*a* expiring. Therefore, the timer will cause the relay contractor 140 to route the current from the battery to the solenoid for the entire given amount of time set for the timer 72*a* only if the proximity switch remains at the a position that surpasses the trigger position $P_1$ or $P_2$ during the entire given amount of time set for the timer 72*a*.

The sequence of the throttle closed switch 70 closing and the proximity switch 84 closing can occur in a variety of manners. One possible sequence is for the rider to first turn the steering handle 16 a sufficient amount to close the proximity switch 84. The rider then releases the throttle lever 34 to close the throttle closed switch 70 with the steering handle 16 remain turned a sufficient amount to keep the proximity switch 84 closed during the entire given amount of time set for the timer 72*a*. In such a sequence, the effect would be same as the effect of the controlled thrust steering system in accordance to the tenth embodiment should the rider turn the steering handle a sufficient amount prior to releasing the throttle lever and as illustrated in FIG. 35.

Another possible sequence is for the rider to first release the throttle lever 34 to close the throttle closed switch 70 allowing the thrust to drop below the steerable thrust. The rider then turns the steering handle 16 a sufficient amount to close the proximity switch 84 and thereafter the steering handle 16 is remain turned a sufficient amount to keep the proximity switch 84 closed during the entire given amount of time set for the timer 72*a*. In such a sequence, the effect would be the same as the effect of the controlled thrust steering system in accordance to the tenth embodiment should the rider release the throttle lever allowing the thrust to drop below the steerable thrust prior to turning the steering handle a sufficient amount and as illustrated in FIG. 36.

A third possible sequence is for the rider to release the throttle lever 34 for a long period of time, such that the thrust out of the steering nozzle is at idle thrust. The rider then turns the steering handle 16 a sufficient amount to close the proximity switch 70 and thereafter the steering handle remains turned a sufficient amount to keep the proximity switch 84 closed during the entire given amount of time set for the timer 72*a*. In such a sequence, the effect would be the same as the effect of the controlled thrust steering system in accordance to the tenth embodiment should the rider release the throttle lever for a long period of time, such that the thrust out of the steering nozzle is at idle thrust, and thereafter, the rider turns the steering handle a sufficient amount and as illustrated in FIG. 37.

A fourth possible sequence is for the rider to first turn the steering handle 16 a sufficient amount to close the proximity switch 84. The rider then releases the throttle lever 34 to close the throttle closed switch 70. Thereafter, the rider turns the steering handle 16 toward the straight-ahead position and opens the proximity switch 84 prior to the expiration of the given amount time set for the timer 72*a*. In such a sequence, the thrust decreases as soon as the rider releases the throttle lever 34 since only the proximity switch 84 is closed at this point. As soon as the back of the throttle lever 34 contacts the throttle closed switch, both the proximity switch 84 and the throttle closed switch 70 are closed. Thereafter, the timer 72*a* is set for a given amount of time for which the thrust is to remain constant at the steerable thrust. Prior to the expiration of the given amount of time set for the timer 72*a* for which the thrust is to remain constant, the rider turns the steering handle 16 toward the straight-ahead position to open the proximity switch 84. The straight-ahead steering over-ride feature of the timer causes the thrust to decrease to idle thrust prior to the expiration of the given amount of time set for the timer 72*a*.

Figure 41:
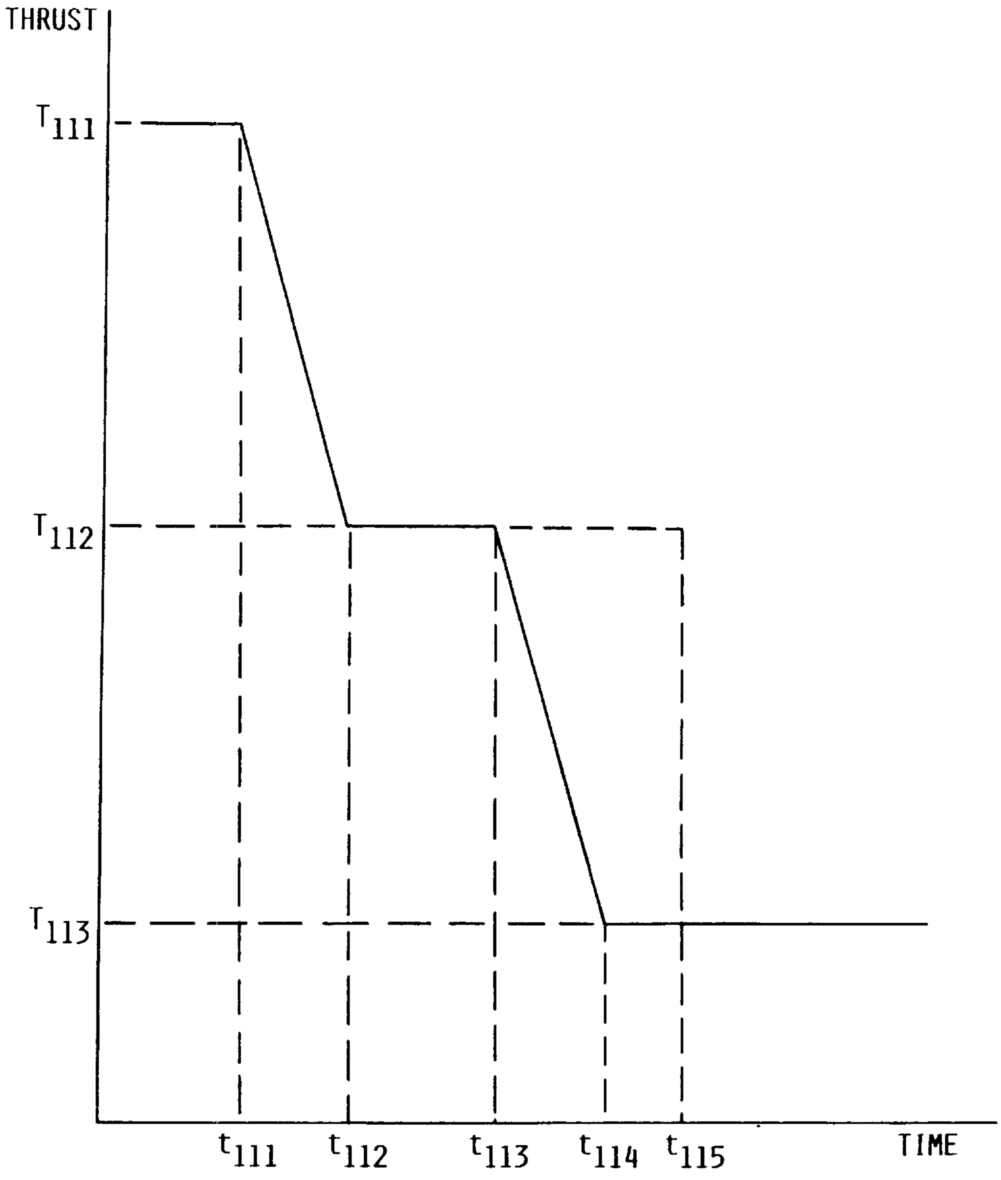
FIG. 41 is a diagram showing the effect of the controlled thrust steering system in accordance to the twelfth embodiment should the rider turn the steering handle a sufficient amount prior to releasing the throttle lever and thereafter turn the steering handle toward the straight-ahead steering position prior to the expiration of the given amount of time the thrust is to remain constant.

FIG. 41 diagrams the effect of a controlled thrust steering system in accordance to the twelfth embodiment should the rider turn the steering handle 16 a sufficient amount to close the proximity switch 84 prior to releasing the throttle lever 34 to close the throttle closed switch 70 and thereafter turns the steering handle 16 toward the straight-ahead steering position to open the proximity switch 84 prior to the expiration of the given amount of time set for the timer 72*a* for which the thrust is to remain constant. Upon the rider releasing the throttle lever 34 with the thrust $T_{111}$ out of the steering nozzle, the thrust quickly drops from $T_{111}$ to a steerable thrust $T_{112}$ during a time period from $t_{111}$ to $t_{112}$. Since the rider turns the steering handle toward the straight-ahead steering position at a time $t_{113}$ prior to the expiration time $t_{115}$ of the given amount of time set by the timer for which the thrust is to remain constant, the thrust drops from the steerable thrust $T_{112}$ to the idle thrust $T_{113}$ during a period from $t_{113}$ to $t_{114}$.

A fifth possible sequence is for the rider to first release the throttle lever 34 to close the throttle closed switch 70 allowing the thrust to drop below the steerable thrust. The rider then turns the steering handle 16 a sufficient amount to close the proximity switch 84. Thereafter, the rider turns the steering handle 16 toward the straight-ahead position to open the proximity switch 84 prior to the expiration of the given amount time set for the timer 72*a* for which the thrust is to remain constant. In such a sequence, the time 72*a* is activated after the steering handle 16 is turned a sufficient amount thus closing the proximity switch 84. The thrust decreases and continues to decrease as soon as the rider releases the throttle lever 34 since only the throttle closed switch 70 is closed at this point. After the rider turns the steering handle 16 a sufficient amount to close the proximity switch 84, both the proximity switch 84 and the throttle closed switch 70 are closed. Since the thrust dropped below the steerable thrust at the time both the proximity and the throttle closed switch close, the timer 72*a* is activated to cause the solenoid to pull on the off-throttle lever 34 and increase the thrust to the steerable thrust. The timer 72*a* is also set for a given amount of time the thrust is to remain constant at the steerable thrust. Prior to the expiration of the given amount of time set for the timer 72*a* for which the thrust is to remain constant, the rider turns the steering handle toward the straight-ahead position and opens the proximity switch 84. The straight-ahead steering over-ride feature of the timer 72*a* causes the thrust to decrease to idle thrust prior to the expiration of the given amount of time set for the timer 72*a*.

Figure 42:
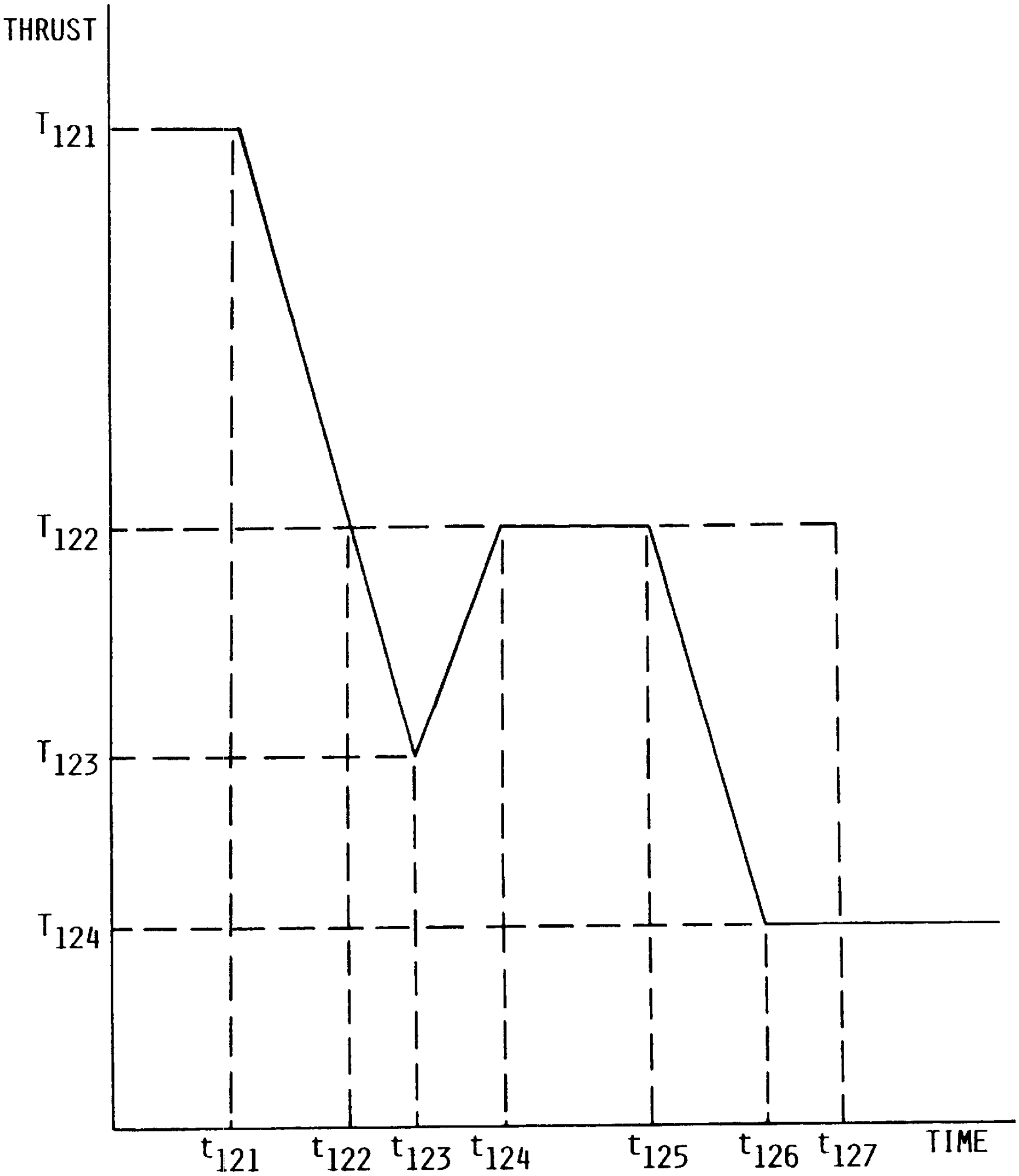
FIG. 42 is a diagram showing the effect of the controlled thrust steering system in accordance to the twelfth embodiment should the rider release the throttle lever allowing the thrust to drop below the steerable thrust prior to turning the steering handle a sufficient amount and thereafter turn the steering handle toward the straight-ahead steering position prior to the expiration of the given amount of time the thrust is to remain constant.

FIG. 42 diagrams the effect of a controlled thrust steering system in accordance to the twelfth embodiment should the rider release the throttle lever 34 to close the throttle closed switch 70 allowing the thrust to drop below the steerable thrust prior to turning the steering handle 16 a sufficient amount to close the proximity switch 84 and thereafter turns the steering handle 16 toward the straight-ahead steering position to open the proximity switch 84 prior to the expiration of the given amount of time set for the timer 72*a* for which the thrust is to remain constant. Upon the rider releasing the throttle lever with the thrust $T_{121}$ out of the steering nozzle, the thrust quickly drops from $T_{121}$ to a steerable thrust $T_{122}$ during a time period from $t_{121}$ to $t_{122}$. Thereafter, the thrust continues to drop to a thrust $T_{123}$ below the steerable thrust until the rider turns the steering handle a sufficient amount at $t_{123}$. The thrust then increases from thrust $T_{123}$ to the steerable thrust $T_{122}$ during a time period from $t_{123}$ to $t_{124}$. Since the rider turns the steering handle toward the straight-ahead steering position at a time $t_{125}$ prior to the expiration time $t_{127}$ of the given amount of time set for the timer 72*a* for which the thrust is to remain constant, the thrust drops from the steerable thrust $T_{122}$ to the idle thrust $T_{124}$ during a time period from $t_{125}$ to $t_{126}$.

A sixth possible sequence is for the rider to release the throttle lever 34 to close the throttle closed switch 70 for a long period of time, such that the thrust out of the steering nozzle is at idle thrust. The rider then turns the steering handle 16 a sufficient amount to close the proximity switch 84. Thereafter, the rider turns the steering handle 16 toward the straight-ahead steering position to open the proximity switch 84 prior to the expiration of the given amount of time set for the timer 72*a* for which the thrust is remain constant. In such a sequence, the timer 72*a* is triggered after the steering handle 16 is turned a sufficient amount, thus closing the proximity switch 84. Since the throttle closed switch 70 is already closed, after the rider turns the steering handle 16 a sufficient amount, both the proximity switch 84 and the throttle closed switch 70 are closed. Thereafter, the timer 72*a* is activated to cause the solenoid 74 to pull on the off-throttle lever 154 and increase the thrust to the steerable thrust. The timer 72*a* is also set for a given amount of time the thrust is to remain constant at the steerable thrust. Prior to the expiration of the given amount of time set for the timer 72*a* for which the thrust is to remain constant, the rider turns the steering handle 16 toward the straight-ahead position to open the proximity switch 84. The straight-ahead steering over-ride feature of the timer 72*a* causes the thrust to decrease to idle prior to the expiration of the given amount of time set for the timer 72*a* for which the thrust is to remain constant.

Figure 43:
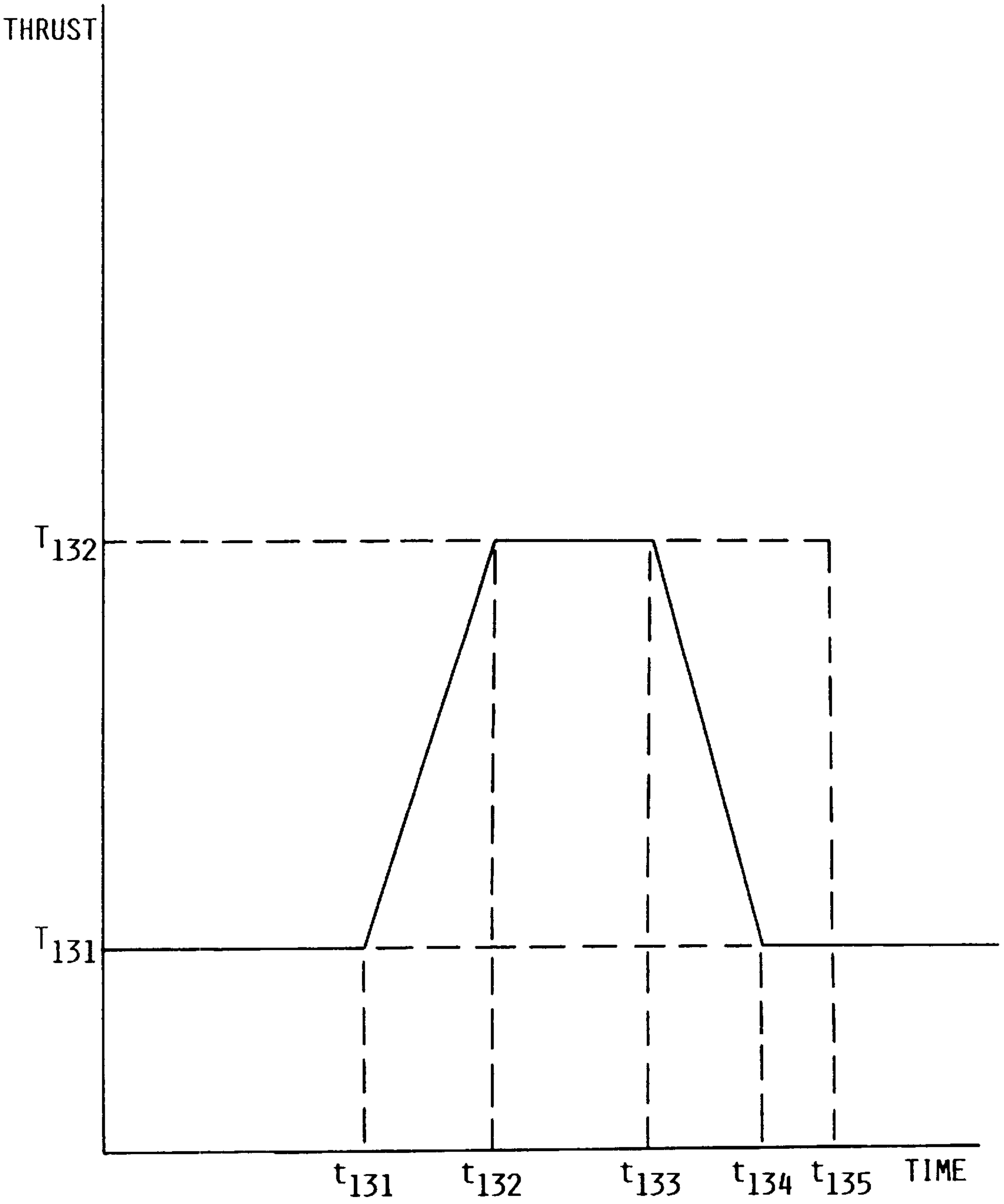
FIG. 43 is a diagram showing the effect of the controlled thrust steering system in accordance to the twelfth embodiment should the rider release the throttle lever for a long period of time, such that that the thrust out of the steering nozzle is at the idle thrust, prior to turning the steering handle a sufficient amount and thereafter turn the steering handle toward the straight-ahead steering position prior to the expiration of the given amount of time the thrust is to remain constant.

FIG. 43 diagrams the effect of a controlled thrust steering system in accordance to the twelfth embodiment should the rider first release the throttle lever 34 to close the throttle closed switch 70 for a long period of time, such that the thrust out the steering nozzle is at the idle thrust. The rider then turns the steering handle 16 a sufficient amount to close the proximity switch 84. Thereafter, the rider turns the steering handle 16 toward the straight-ahead steering position to open the proximity switch 84 prior to the expiration of the given amount of time set for the timer for which the thrust is to remain constant. Upon the rider turning the steering handle a sufficient amount at time $t_{131}$, the thrust increases form the idle thrust $T_{131}$ to a steerable thrust $T_{132}$ during a time period from $t_{131}$ to $t_{132}$ and remains approximately constant at the steerable thrust $T_{132}$. Since the rider turns the steering handle toward the straight-ahead steering position at a time $t_{133}$ prior to the expiration time $t_{135}$ of the given amount of time set for the timer 72*a* for which the thrust is to remain constant, the thrust drops from the steerable thrust $T_{132}$ to the idle thrust $T_{131}$, during a time period from $t_{133}$ to $t_{134}$.

The thirteenth embodiment of the present invention is similar to the controlled thrust steering system of the tenth embodiment with the exception of the timer deleted.

The controlled thrust steering system of the thirteenth embodiment comprises a throttle closed switch 70, a proximity switch 84, a proximity triggering mechanism 86, a solenoid 74 and a relay contactor 140. The throttle closed switch 70 of the thirteenth embodiment is identical to the throttle closed switch identified in the tenth embodiment and as illustrated in FIG. 8. The proximity switch 84 and the proximity switch triggering mechanism 86 are identical to the proximity switch and proximity switch mechanism as identified in the tenth embodiment and as illustrated in FIGS. 12 and 13.

Figure 44:
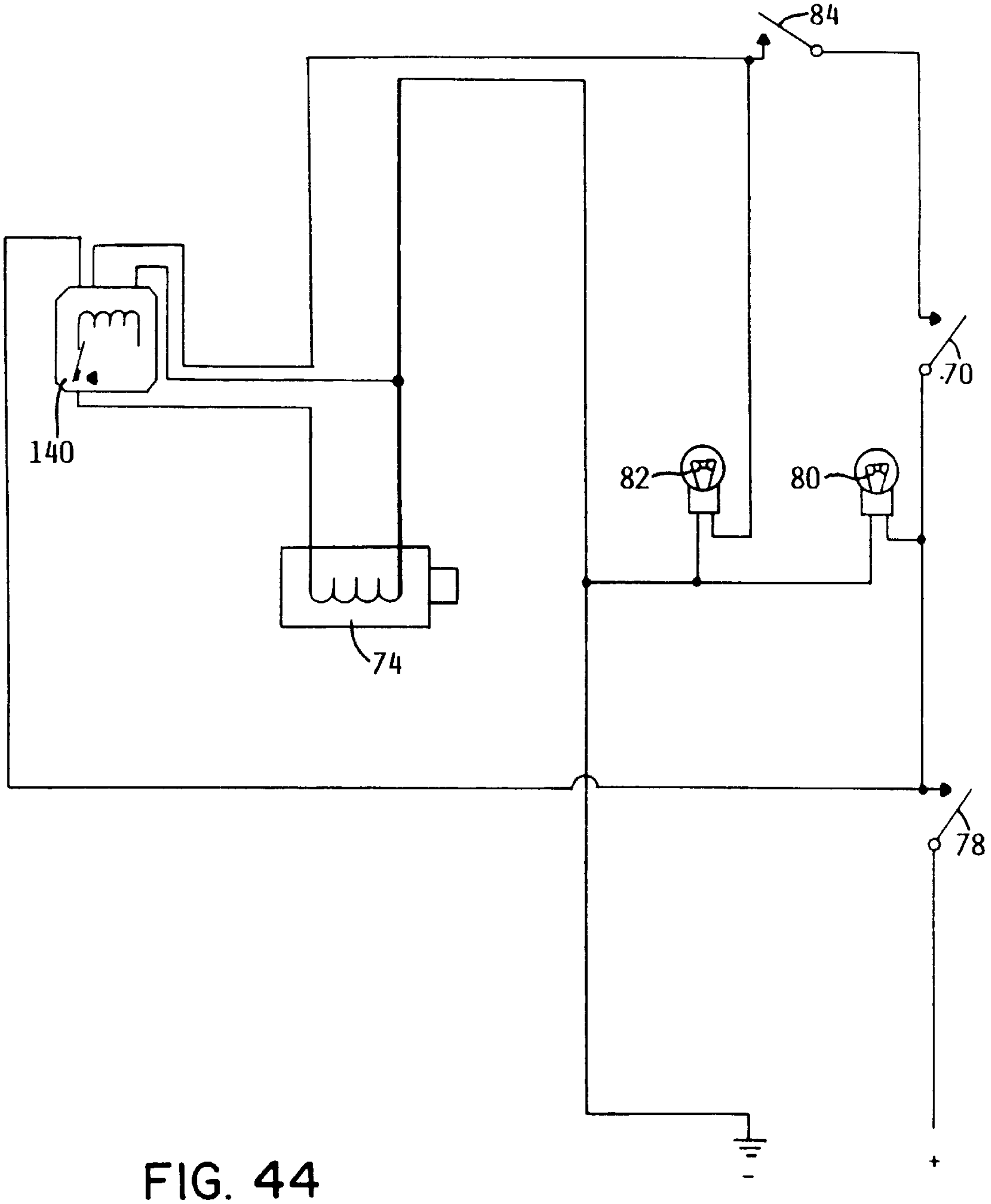
FIG. 44 is a circuit diagram of a thirteenth embodiment.

As illustrated in circuit diagram FIG. 44, the proximity switch 84 is in series with the throttle closed switch 70. Therefore, both the proximity switch 84 and the throttle closed switch 70 must be closed to trigger the relay contractor 140 to route the current from the battery to the solenoid 74 for a given amount of time upon the back of the throttle lever contacting the throttle closed switch to close the throttle closed switch 70 and the proximity switch surpasses the trigger position $P_1$ or $P_2$ to close the proximity switch 84. The solenoid 74 is connected to the throttle regulator 142. The throttle regulator 142 of the thirteenth embodiment is identical to the throttle regulator of tenth embodiment as illustrated in FIGS. 27–33.

Figure 45:
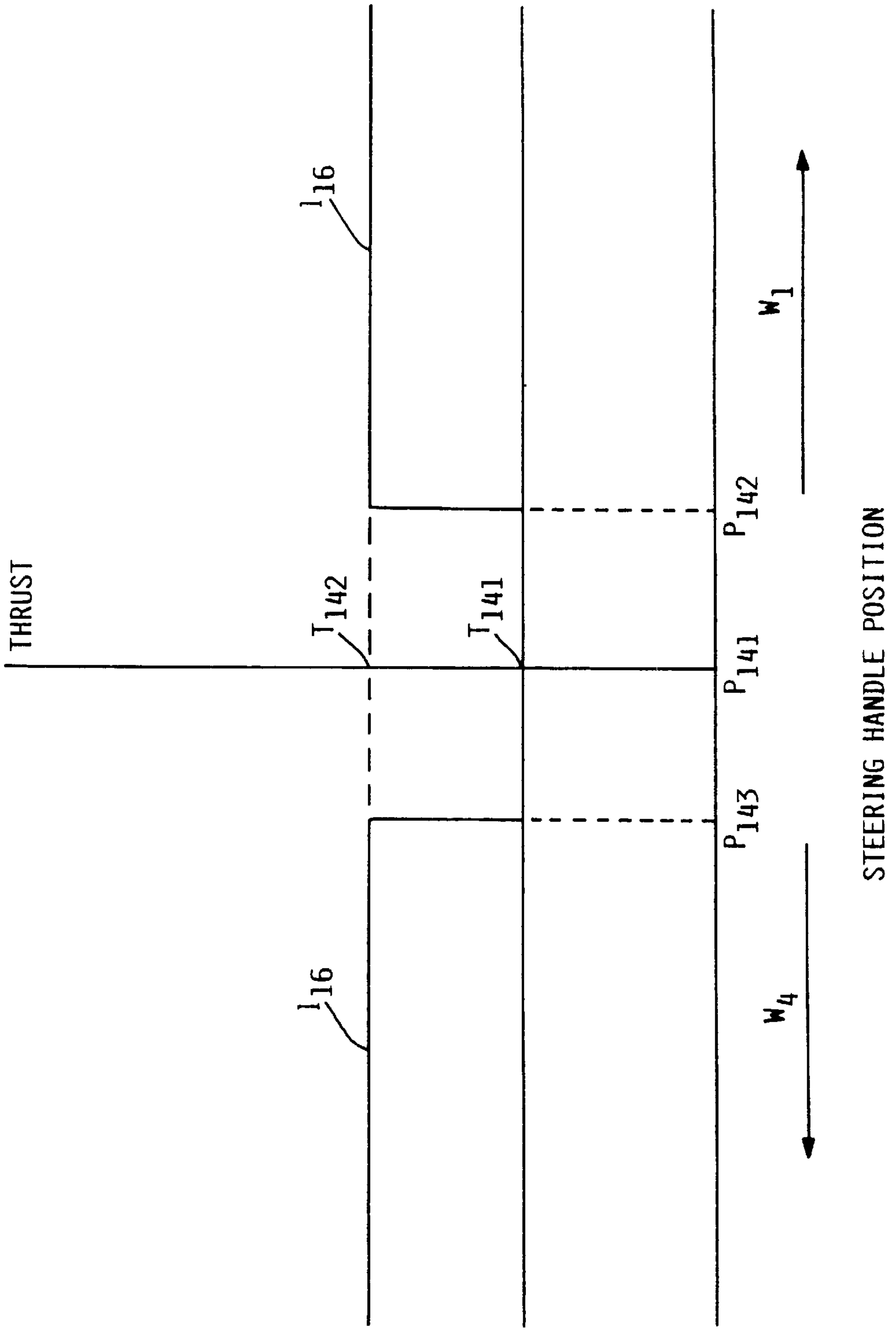
FIG. 45 is a diagram showing the effect of the controlled thrust steering system in accordance to the thirteenth embodiment should the rider release the throttle lever.

FIG. 45 diagrams the effect of a controlled thrust steering system in accordance to the thirteenth embodiment should the rider release the throttle lever 34. Idle thrust $T_{141}$ is exhausted out of the steering nozzle while the steering handle 16 and the associated steering post are in the straight-ahead position $P_{141}$. Line $1_{16}$ represents the effect of steering handle position on thrust with the controlled thrust steering system present. Upon the rider turning the steering handle 16 either in the clockwise direction $W_1$ or in the counter-clockwise direction $W_4$, the thrust remains constant at the idle thrust $T_{141}$ until the steering handle 16 has been turned sufficiently to steering position $P_{142}$ or $P_{143}$ wherein the proximity switch 84 surpasses the trigger position $P_1$ or $P_2$ to close the proximity switch 84. The thrust then increases from the idle thrust $T_{141}$ to the steerable thrust $T_{142}$. The thrust remains at the steerable thrust $T_{141}$ as long as the steering handle 16 remains turned sufficiently to surpass steering position $P_{142}$ or $P_{143}$. Once the rider turns the steering handle sufficiently toward the straight-ahead position, such that the steering position no longer surpasses steering position $P_{142}$ or $P_{143}$, the thrust then decreases from the steerable thrust $T_{142}$ to $T_{141}$.

Various features of the present invention have been described with reference to the embodiments shown and described. It should be understood, however, that modifications may be made without departing from the spirit.

What is claimed is:

1. A thrust system for a watercraft of a the jet propulsion type comprising:

a steering mechanism having a straight-ahead position, said steering mechanism able to rotate in a clockwise direction from said straight-ahead position and counter-clockwise direction from said straight-ahead position;

a throttle control mechanism mounted on a steering handle of said steering mechanism, said throttle control mechanism moves toward an idle position after the throttle control mechanism is released;

a thrust mechanism for providing jet propulsion thrust;

a controlled thrust steering system; and said controlled thrust steering system causes said thrust mechanism to increase thrust upon rotating said steering mechanism in one of said clockwise direction and said counter-clockwise direction from said straight-ahead position, said controlled thrust steering system causes said thrust mechanism to decrease thrust upon rotating said steering mechanism toward said straight-ahead position.

2. The thrust system as claimed in claim 1 further comprising a throttle regulator for regulating thrust provided by said thrust mechanism.

3. The thrust system as claimed in claim 1 wherein said controlled thrust steering system includes a magnet and a proximity switch rotationally independent of said magnet, wherein said controlled thrust steering system increases thrust upon said proximity switch at a given distance from said magnet.

4. The thrust system as claimed in claim 2 wherein said throttle regulator is a carburetor.

5. The thrust system as claimed in claim 2 wherein said throttle regulator is a throttle body of a fuel injection system.

6. The thrust system as claimed in claim 2 wherein said controlled thrust steering system includes a cable connecting said steer mechanism to said throttle regulator, wherein rotating said steering mechanism in one of said clockwise direction and counter-clock wise direction from said straight-ahead position pulls on said cable to cause said thrust mechanism to increase thrust.

7. The thrust system as claimed in claim 1 wherein said throttle control mechanism is a throttle lever.

8. A thrust system for a watercraft of a the jet propulsion type comprising:

a steering mechanism having a straight-ahead position, said steering mechanism able to rotate in a clockwise direction from said straight-ahead position and counter-clockwise direction from said straight-ahead position;

a throttle control mechanism mounted on a steering handle of said steering mechanism, said throttle control mechanism moves toward an idle position after the throttle control mechanism is released;

a thrust mechanism for providing jet propulsion thrust;

a controlled thrust steering system; and said controlled thrust steering system inhibits the thrust from decreasing below a steerable thrust upon rotating said steering mechanism in one of said clockwise direction and said counter-clockwise direction from said straight-ahead position, said controlled thrust steering system causes said thrust mechanism to decrease thrust upon rotating said steering mechanism toward said straight-ahead position.

9. The thrust system as claimed in claim 8 further comprising a throttle regulator for regulating thrust provided by said thrust mechanism.

10. The thrust system as claimed in claim 8 wherein said controlled thrust steering system includes a magnet and a proximity switch rotationally independent of said magnet, wherein said controlled thrust steering system inhibits the thrust from decreasing below a steerable thrust upon said proximity switch at a given distance from said magnet.

11. The thrust system as claimed in claim 9 wherein said throttle regulator is a carburetor.

12. The thrust system as claimed in claim 9 wherein said throttle regulator is a throttle body of a fuel injection system.

13. The thrust system as claimed in claim 9 wherein said controlled thrust steering system includes a cable connecting said steer mechanism to said throttle regulator, wherein rotating said steering mechanism in one of said clockwise direction and said counter-clock direction from said straight-ahead position pulls on said cable to inhibit the thrust from decreasing below a steerable thrust.

14. The thrust system as claimed in claim 8 wherein said throttle control mechanism is a throttle lever.

15. A thrust system for a watercraft of a the jet propulsion type comprising:

a steering mechanism having a generally straight-ahead position, said steering mechanism able to rotate in a clockwise direction from said generally straight-ahead position and counter-clockwise direction from said generally straight-ahead position;

a throttle control mechanism mounted on a steering handle of said steering mechanism, said throttle control mechanism moves toward an idle position after the throttle control mechanism is released;

a thrust mechanism for providing jet propulsion thrust;

a controlled thrust steering system; and said controlled thrust steering system causes said thrust mechanism to increase thrust upon said steering mechanism rotating from said generally straight-ahead position to one of said clockwise position and said counter-clockwise position, said controlled thrust steering system causes said thrust mechanism to decrease thrust upon said steering mechanism rotating from one of said clockwise position and counter-clockwise position to said generally straight-ahead position.

16. The thrust system as claimed in claim 15 further comprising a throttle regulator for regulating thrust provided by said thrust mechanism.

17. The thrust system as claimed in claim 15 wherein said controlled thrust steering system includes a magnet and a proximity switch rotationally independent of said magnet, wherein said thrust mechanism increases thrust upon said proximity switch at a given distance from said magnet.

18. The thrust system as claimed in claim 16 wherein said throttle regulator is a carburetor.

19. The thrust system as claimed in claim 16 wherein said throttle regulator is a throttle body of a fuel injection system.

20. The thrust system as claimed in claim 16 wherein said controlled thrust steering system includes a cable connecting said steer mechanism to said throttle regulator, wherein rotating said steering mechanism from said generally straight-ahead position pulls on said cable to cause said thrust mechanism to increase thrust.

21. The thrust system as claimed in claim 15 wherein said throttle control mechanism is a throttle lever.

22. A thrust system for a watercraft of a the jet propulsion type comprising:

a steering mechanism having a generally straight-ahead position, said steering mechanism able to rotate in a clockwise direction from said generally straight-ahead position to a clockwise position and counter-clockwise direction from said generally straight-ahead position to a counter-clockwise position;

a throttle control mechanism mounted on a steering handle of said steering mechanism, said throttle control mechanism moves toward an idle position after the throttle control mechanism is released;

a thrust mechanism for providing jet propulsion thrust;

a controlled thrust steering system; and said controlled thrust steering system inhibits the thrust from decreasing below a steerable thrust upon said steering mechanism rotating from said generally straight-ahead position to one of said clockwise position and said counter-clockwise position, said controlled thrust steering system causes said thrust mechanism to decrease thrust upon said steering mechanism rotating from one of said clockwise position and counter-clockwise position to said generally straight-ahead position.

23. The thrust system as claimed in claim 22 further comprising a throttle regulator for regulating thrust provided by said thrust mechanism.

24. The thrust system as claimed in claim 22 wherein said controlled thrust steering system includes a magnet and a proximity switch rotationally independent of said magnet, wherein said controlled thrust steering system inhibits the thrust from decreasing below a steerable thrust upon said proximity switch at a given distance from said magnet.

25. The thrust system as claimed in claim 23 wherein said throttle regulator is a carburetor.

26. The thrust system as claimed in claim 23 wherein said throttle regulator is a throttle body of a fuel injection system.

27. The thrust system as claimed in claim 23 wherein said controlled thrust steering system includes a cable connecting said steer mechanism to said throttle regulator, wherein rotating said steering mechanism from said straight-ahead position pulls on said cable to inhibit the thrust from decreasing below a steerable thrust.

28. The thrust system as claimed in claim 22 wherein said throttle control mechanism is a throttle lever.

29. A thrust system for a watercraft of a the jet propulsion type comprising:

a steering mechanism having a straight-ahead position, said steering mechanism able to rotate in a clockwise direction from said straight-ahead position and counter-clockwise direction from said straight-ahead position;

a throttle control mechanism mounted on a steering handle of said steering mechanism, said throttle control mechanism moves toward an idle position after the throttle control mechanism is released;

a thrust mechanism for providing jet propulsion thrust;

a controlled thrust steering system;

said controlled thrust steering system inhibits the thrust from decreasing below a steerable thrust upon rotating said steering mechanism in said clockwise direction from said straight-ahead position;

said controlled thrust steering system inhibits the thrust from decreasing below said steerable thrust upon rotating said steering mechanism in said counter-clockwise direction from said straight-ahead position;

said controlled thrust steering system causes said thrust mechanism to decrease upon rotating said steering mechanism toward said straight-ahead position.

30. The thrust system as claimed in claim 29 further comprising a throttle regulator for regulating thrust provided by said thrust mechanism.

31. The thrust system as claimed in claim 29 wherein said controlled thrust steering system includes a magnet and a proximity switch rotationally independent of said magnet, wherein said controlled thrust steering system inhibits the thrust from decreasing below a steerable thrust upon said proximity switch at a given distance from said magnet.

32. The thrust system as claimed in claim 30 wherein said throttle regulator is a carburetor.

33. The thrust system as claimed in claim 30 wherein said throttle regulator is a throttle body of a fuel injection system.

34. The thrust system as claimed in claim 30 wherein said controlled thrust steering system includes a cable connecting said steer mechanism to said throttle regulator, wherein rotating said steering mechanism in one of said clockwise direction and said counter-clockwise direction from said straight-ahead position pulls on said cable to inhibit the thrust from decreasing below a steerable thrust.

35. The thrust system as claimed in claim 29 wherein said throttle control mechanism is a throttle lever.

* * * * *